United States Patent [19]
Ackeret

[11] Patent Number: 4,993,179
[45] Date of Patent: *Feb. 19, 1991

[54] DEVICE FOR THE CYCLIC REARRANGEMENT OF A PILE OF RECTANGULAR OR SQUARE SHEETS

[75] Inventor: Peter Ackeret, Kusnacht, Switzerland

[73] Assignee: Licinvest AG, Chur, Switzerland

[*] Notice: The portion of the term of this patent subsequent to Nov. 29, 2005 has been disclaimed.

[21] Appl. No.: 252,874

[22] Filed: Sep. 30, 1988

Related U.S. Application Data

[63] Continuation of Ser. No. 890;023, Jul. 11, 1986, Pat. No. 4,787,162.

[30] Foreign Application Priority Data

Nov. 13, 1984 [DE] Fed. Rep. of Germany ..... 34414827

[51] Int. Cl.$^5$ ............................................. G09F 11/30
[52] U.S. Cl. ........................................ 40/513; 40/511
[58] Field of Search ................. 40/511, 513, 490, 508, 40/509, 375, 380, 381

[56] References Cited

U.S. PATENT DOCUMENTS

| | | |
|---|---|---|
| 3,495,345 | 2/1970 | Weggeland . |
| 3,783,540 | 1/1974 | Barclay . |
| 4,057,920 | 11/1977 | Weggeland . |
| 4,173,838 | 11/1979 | Antos . |
| 4,238,898 | 12/1980 | Ackeret . |
| 4,238,899 | 12/1980 | Ackeret . |
| 4,241,528 | 12/1980 | Ackeret . |
| 4,241,529 | 12/1980 | Baur . |
| 4,245,417 | 1/1981 | Ackeret . |
| 4,259,802 | 4/1981 | Ackeret . |
| 4,376,348 | 3/1983 | Ackeret . |
| 4,546,561 | 10/1985 | Ackeret . |
| 4,550,516 | 11/1985 | Ackeret . |
| 4,691,456 | 9/1987 | Ackeret . |
| 4,787,162 | 11/1988 | Ackeret ................................ 40/513 |

FOREIGN PATENT DOCUMENTS

| | | |
|---|---|---|
| 113057 | 7/1984 | European Pat. Off. . |
| 2212135 | 7/1973 | Fed. Rep. of Germany . |
| 2833464 | 2/1980 | Fed. Rep. of Germany . |
| 2912941 | 3/1980 | Fed. Rep. of Germany . |
| 3014394 | 10/1981 | Fed. Rep. of Germany . |
| 2403207 | 4/1979 | France . |

*Primary Examiner*—James R. Brittain
*Attorney, Agent, or Firm*—Robert R. Jackson

[57] ABSTRACT

The invention relates to a device for the cyclic rearrangement of a pile of rectangular or square sheets, especially a pile (182) of photographic prints, having a first (12) and a second (14) frame part which may be moved relative to one another and parallel to the main plane of the pile, and having means that, on movement of the frame parts backwards and forwards, remove an individual sheet from one end of the pile and add it to the other end of the pile again, these means comprising:
(a) a separating means (20, 68, 71) for separating the individual sheet from the pile,
(b) a feeding means (22) for feeding sheets to the separating means,
(c) retaining means (26, 28, 32, 80) for holding the individual sheet in the first frame part and the remainder of the pile in the other frame part, and
(d) a guide means (79) for guiding the separated individual sheet for the purpose of returning it to the other end of the remainder of the pile, wherein the feeding means (22) on the first frame part (12) has a contact face lying as a result of spring bias (24) adjacent the rear edge (viewed in the direction of movement) of the pile at the end from which a sheet is to be separated, by means of which contact face a force exerted from the pile, parallel to the plane of the pile on the contact face may be converted into a yielding movement transversely thereto against the spring bias.

129 Claims, 38 Drawing Sheets

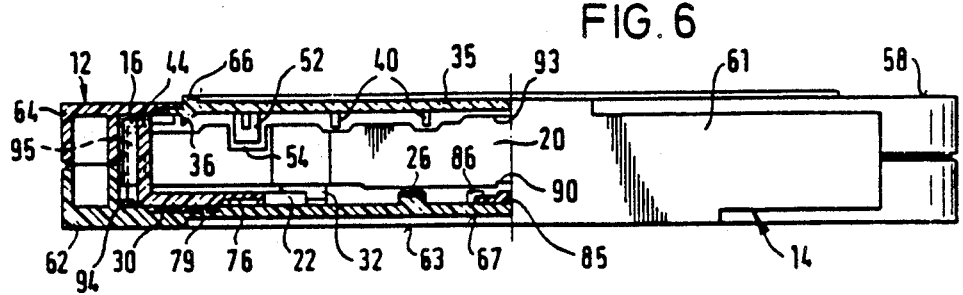
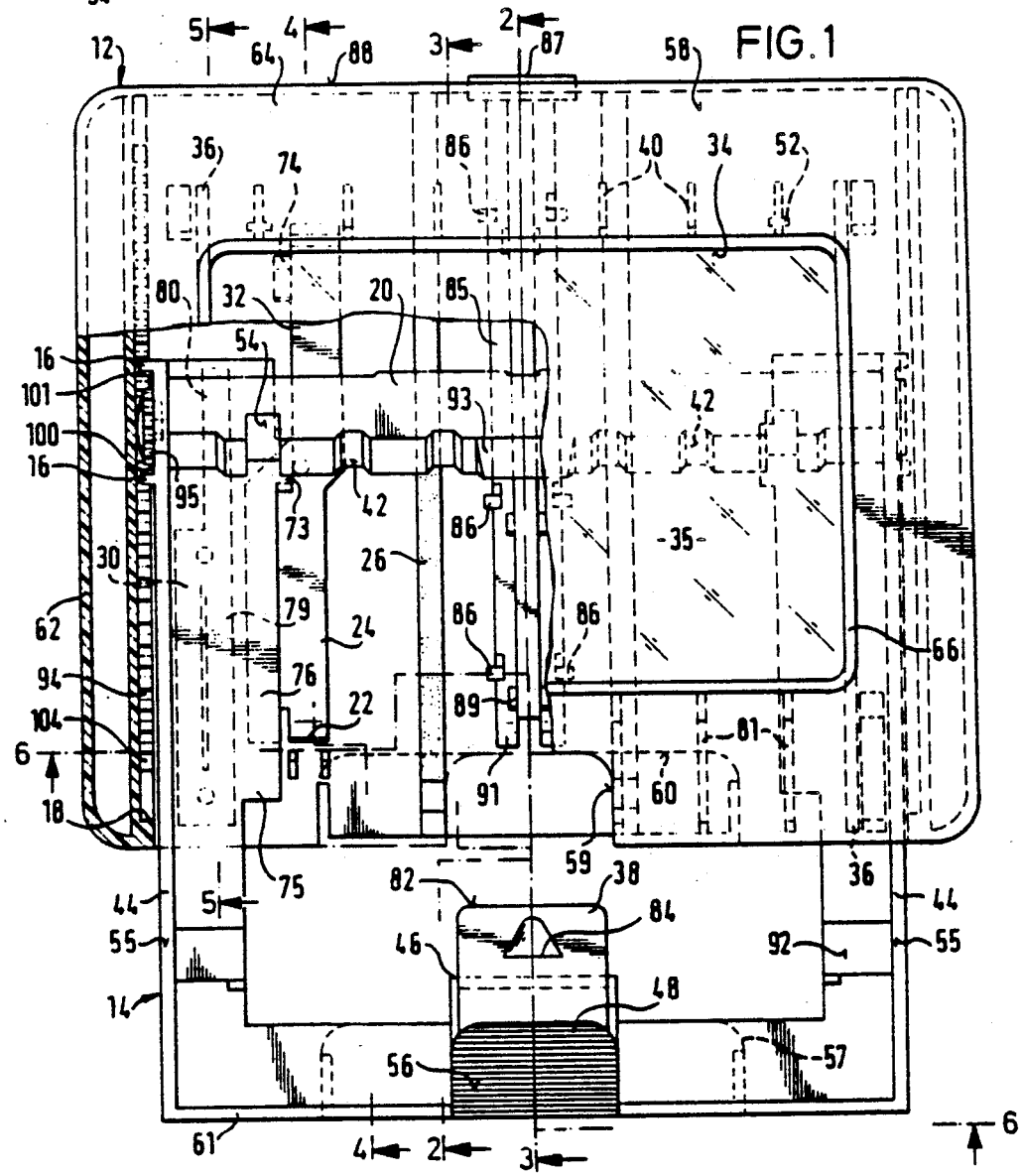

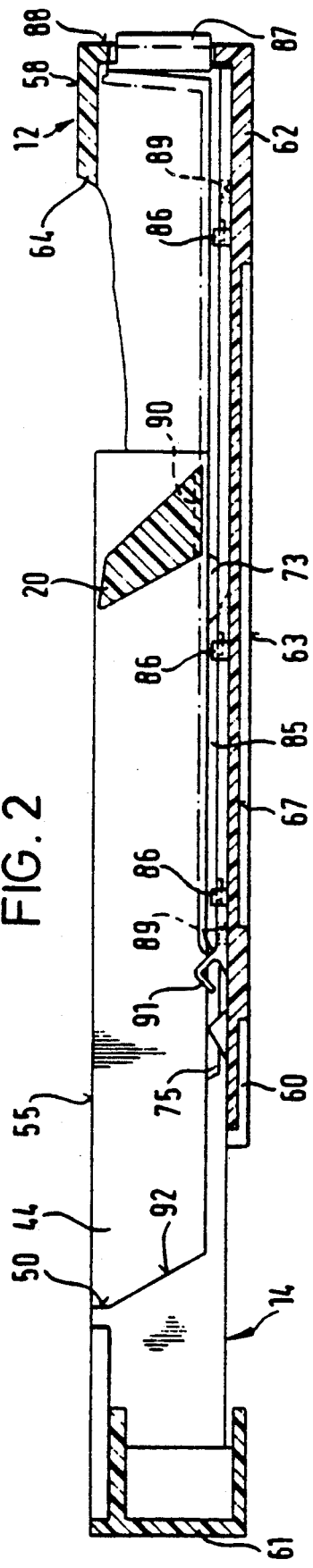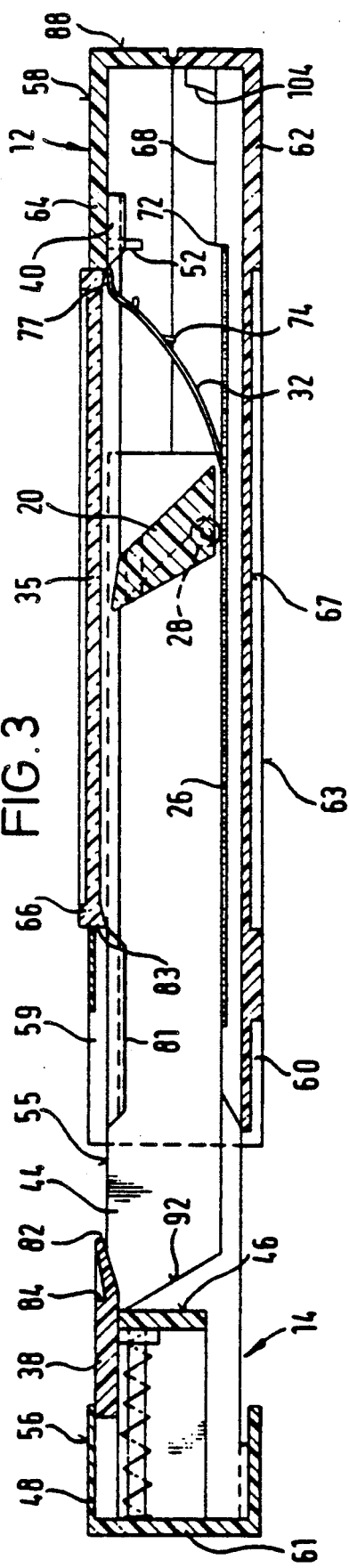

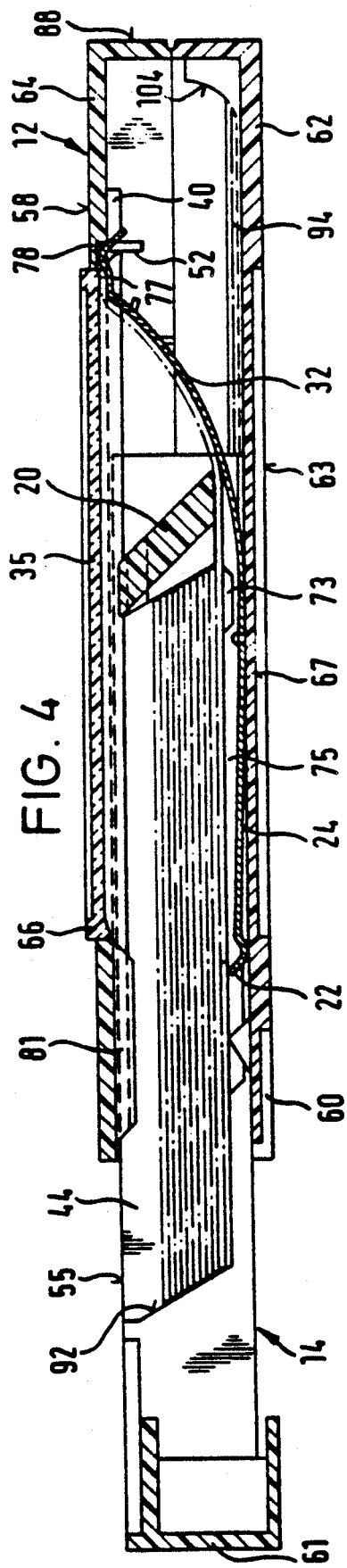
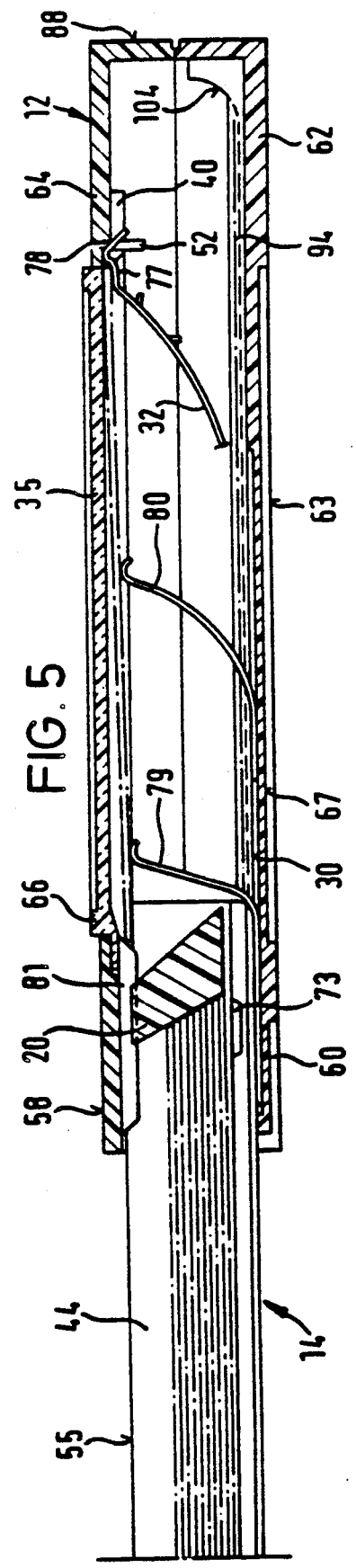

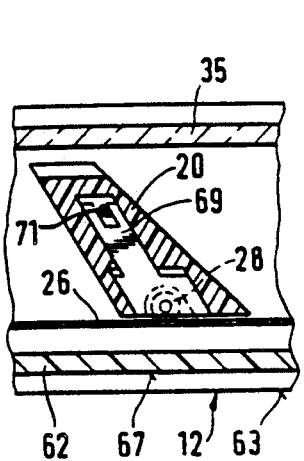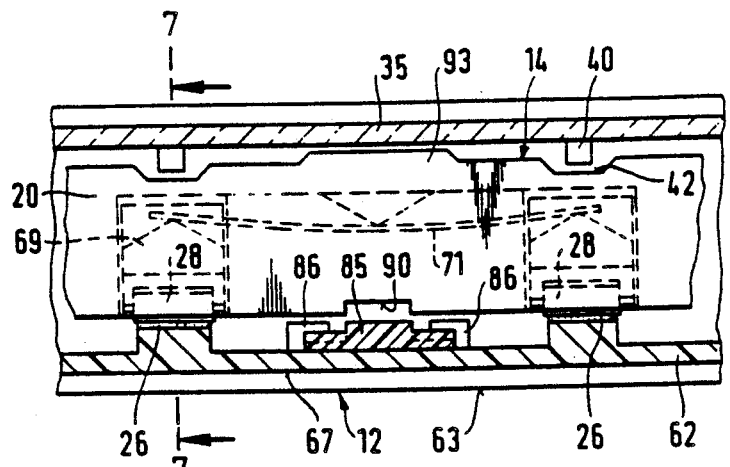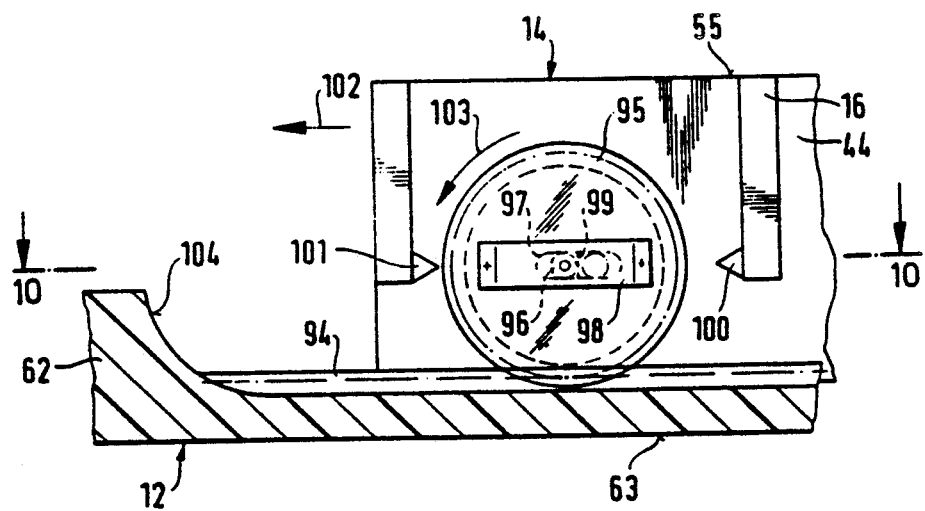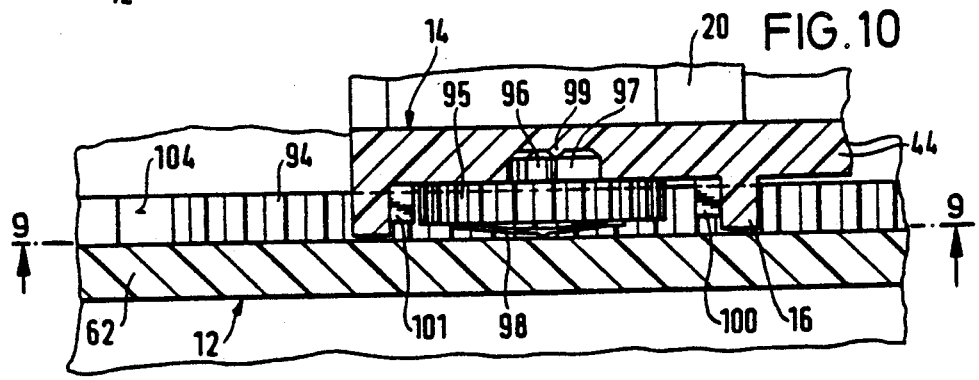

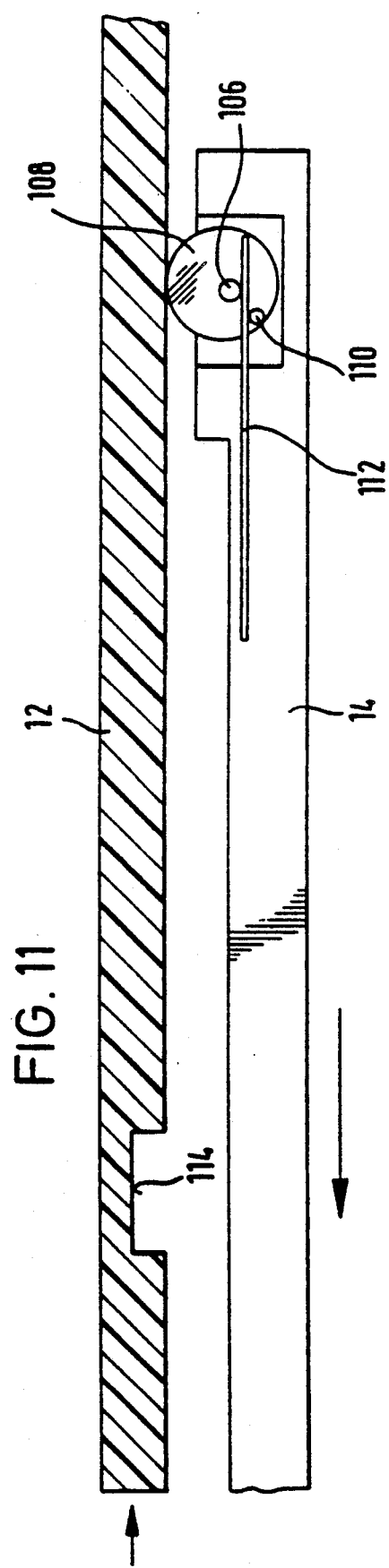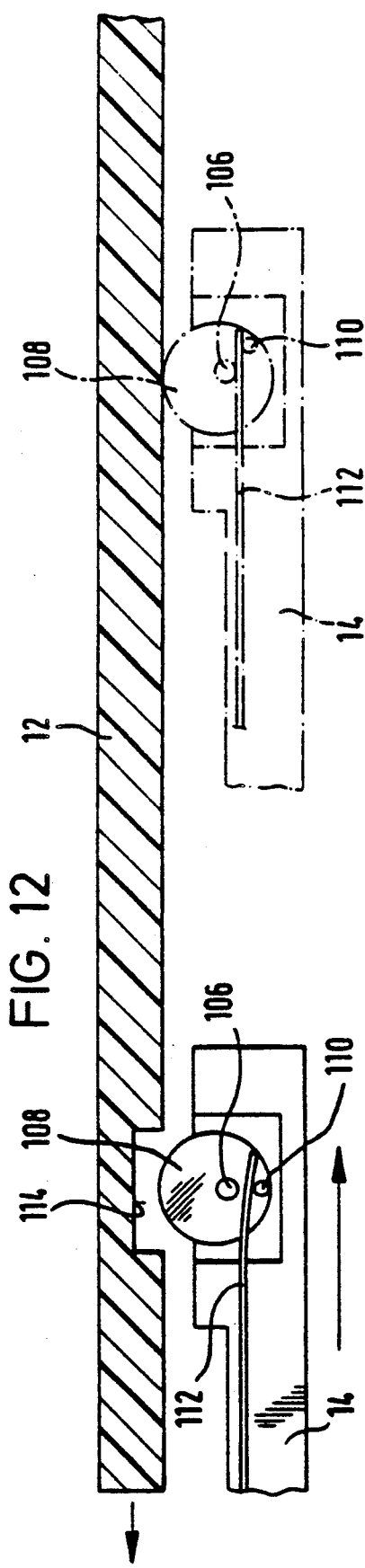

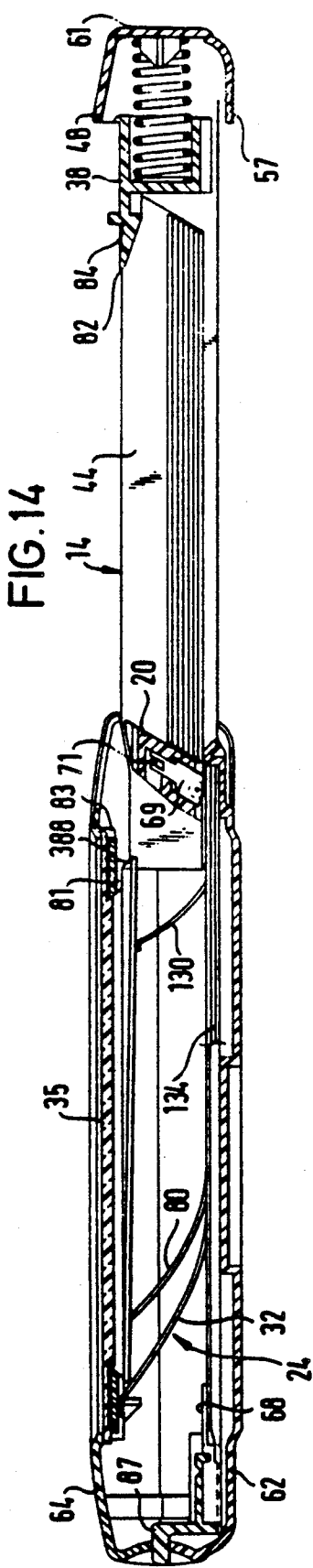
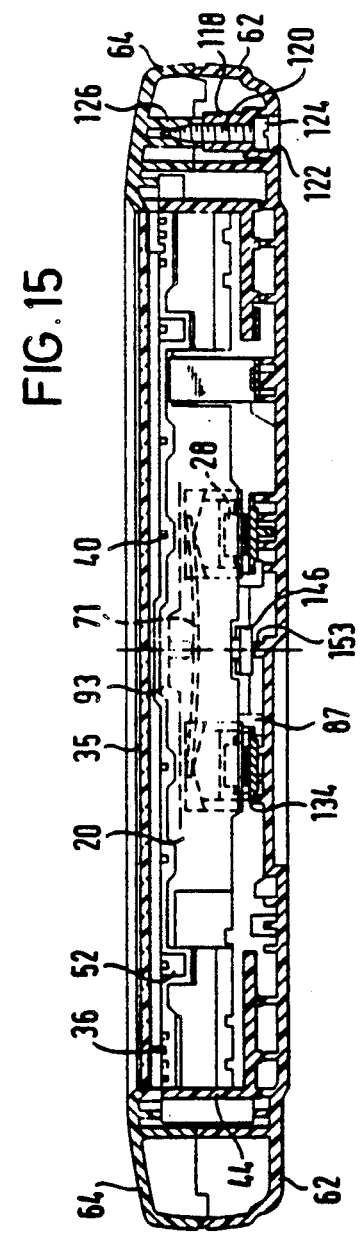
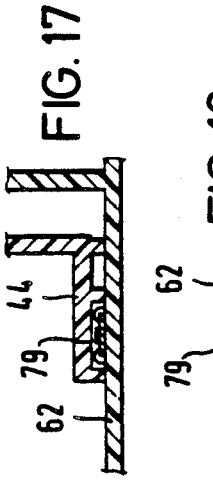
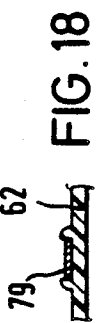
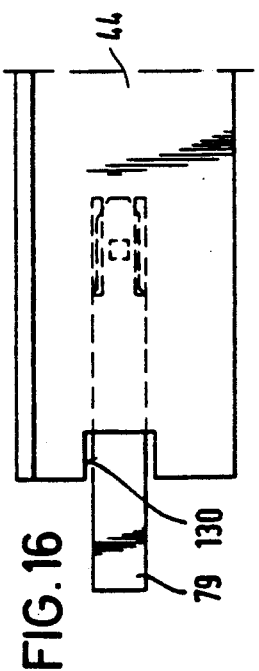

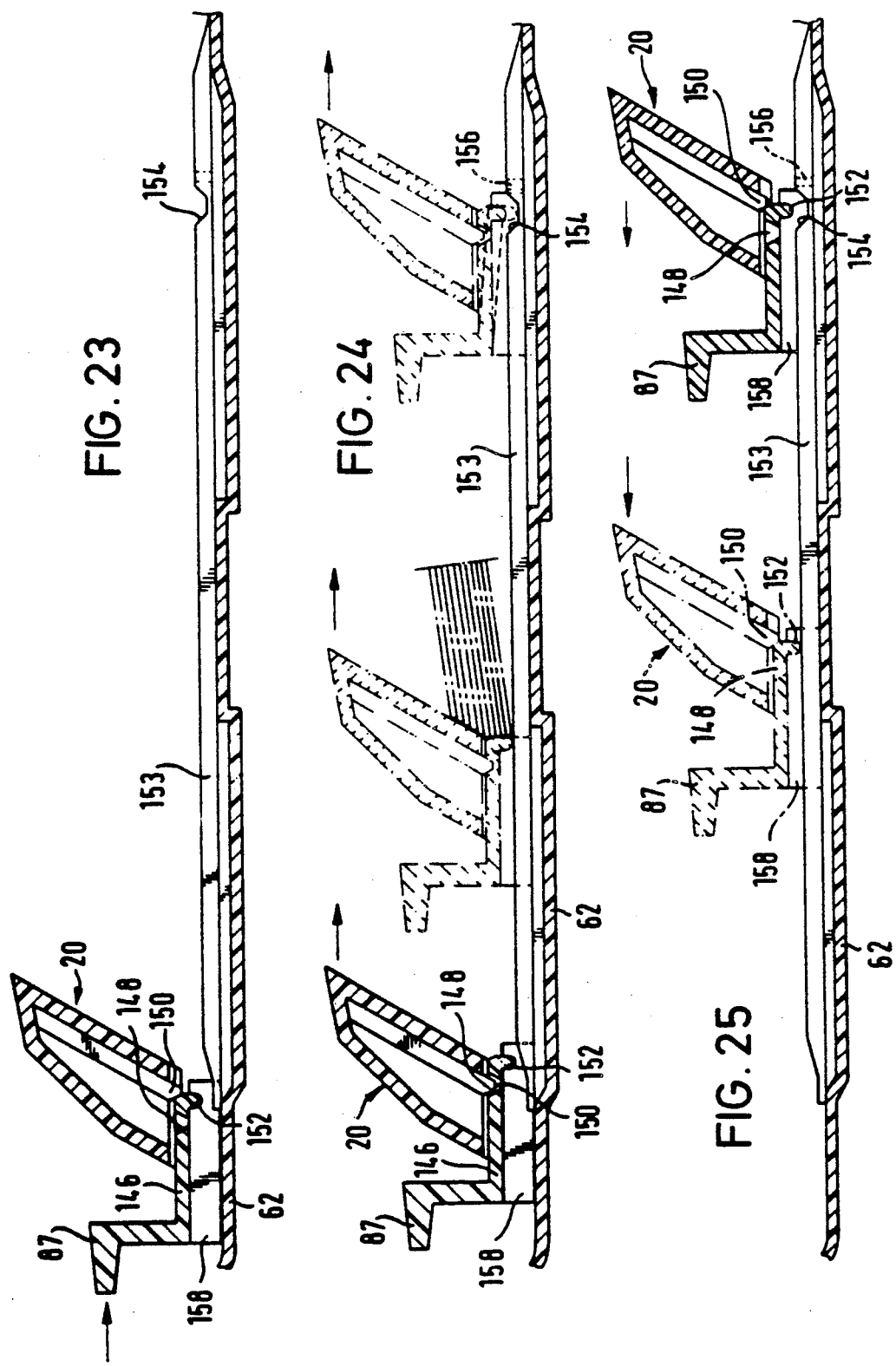

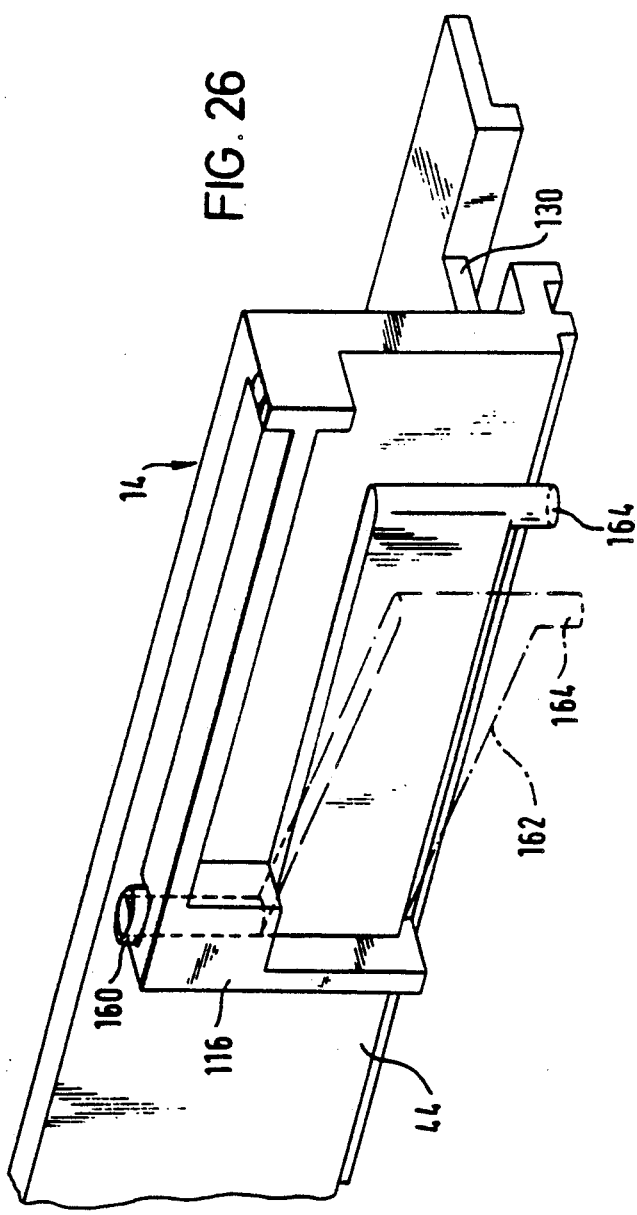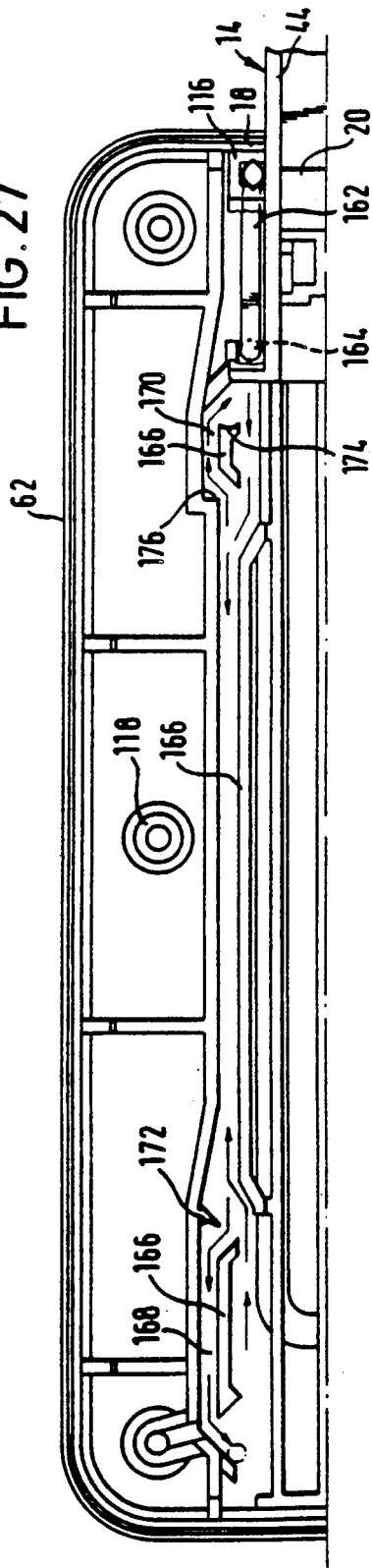

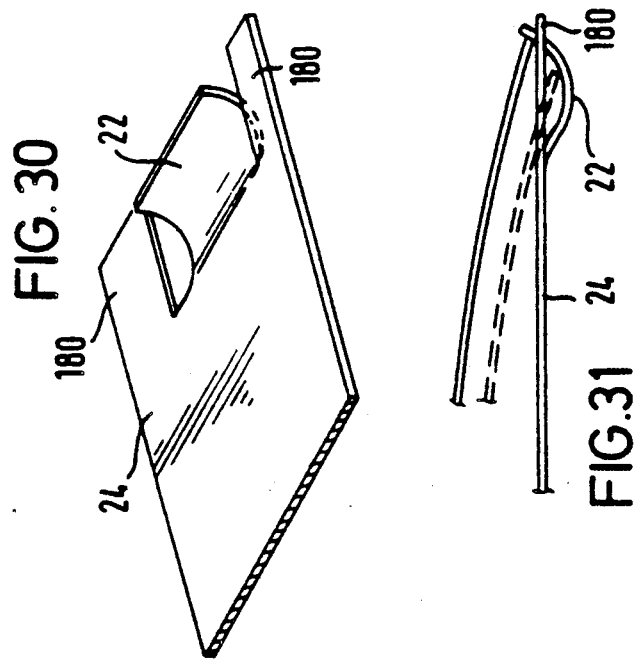
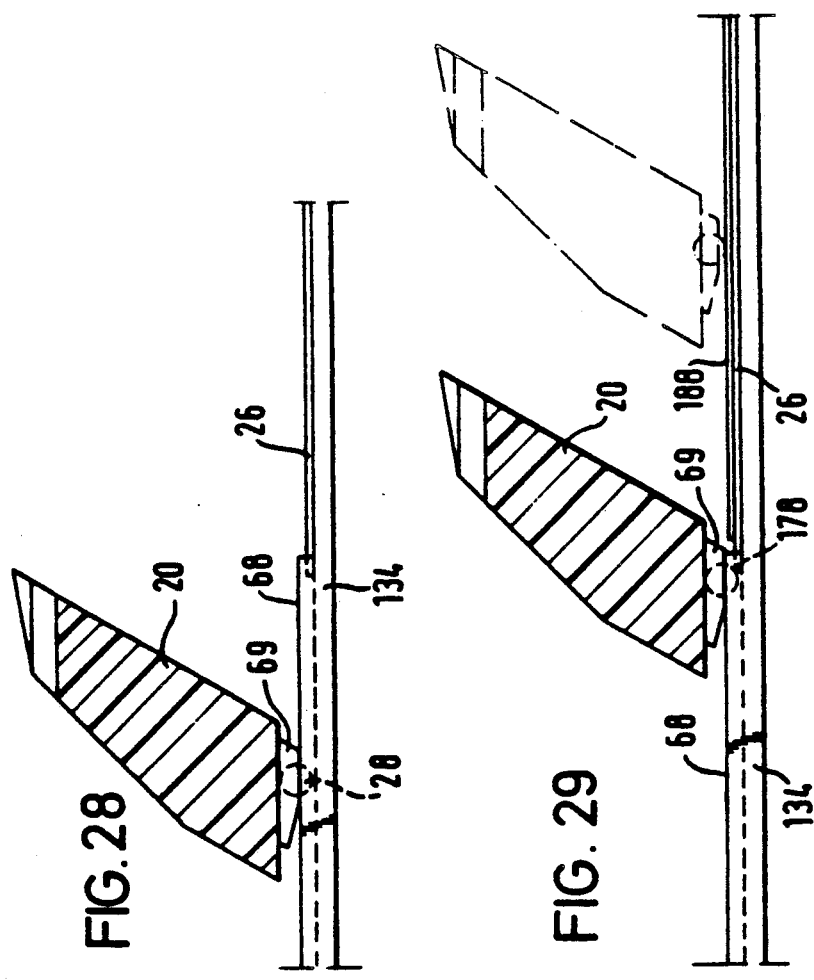

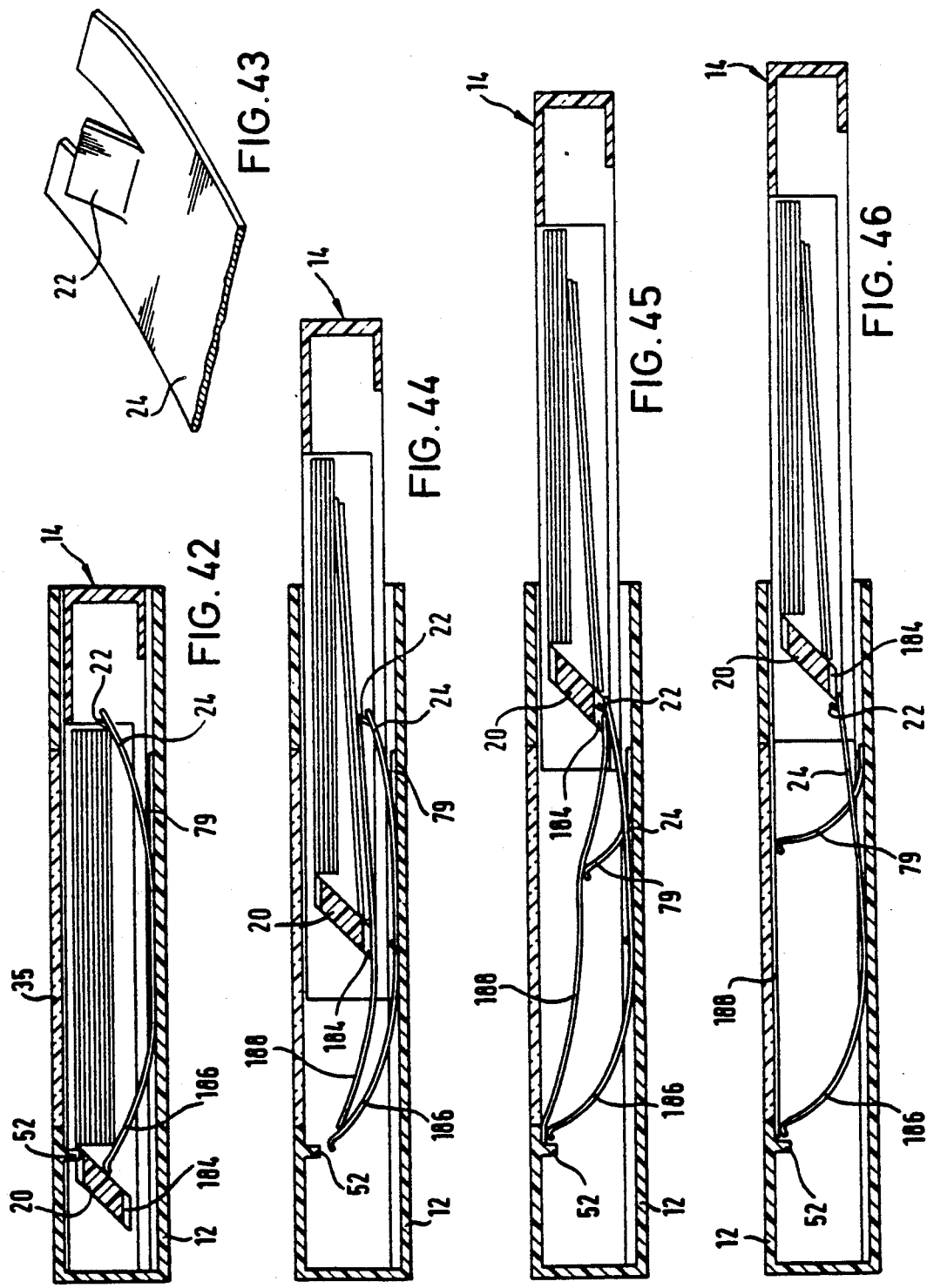

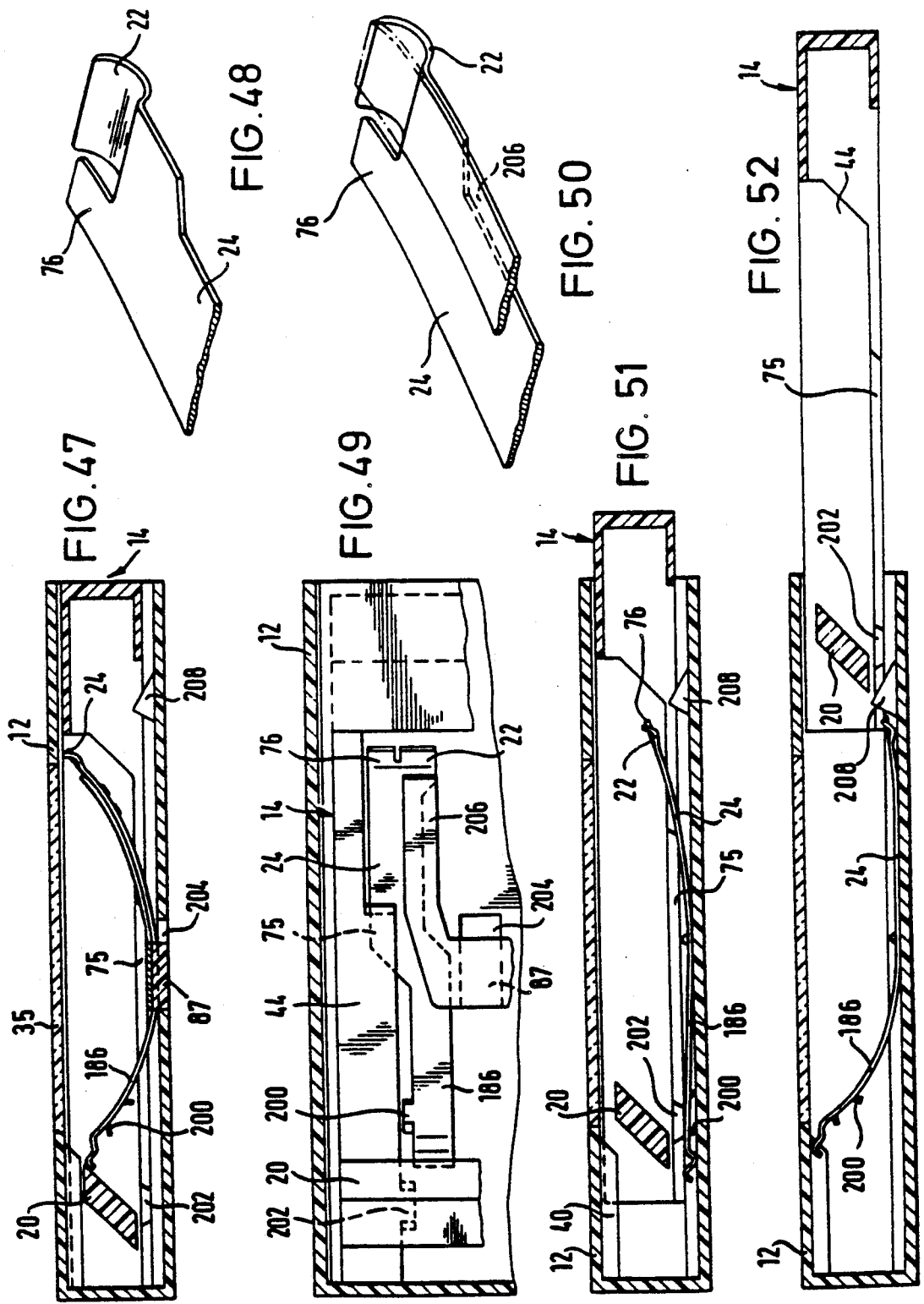

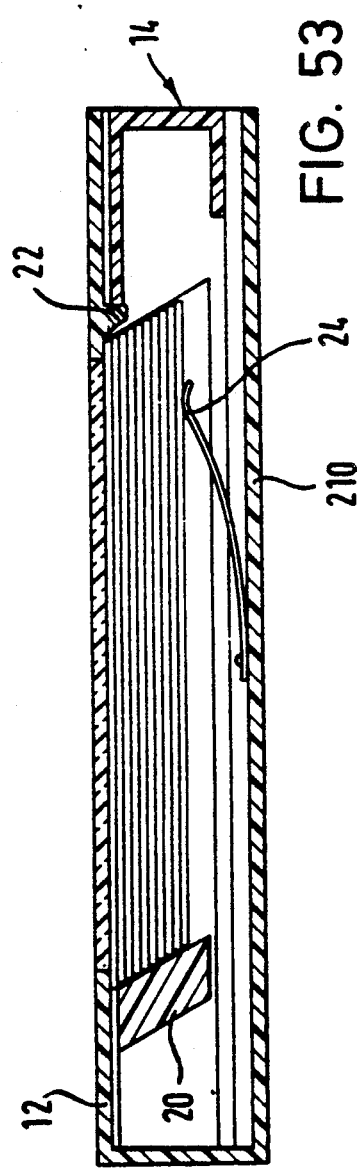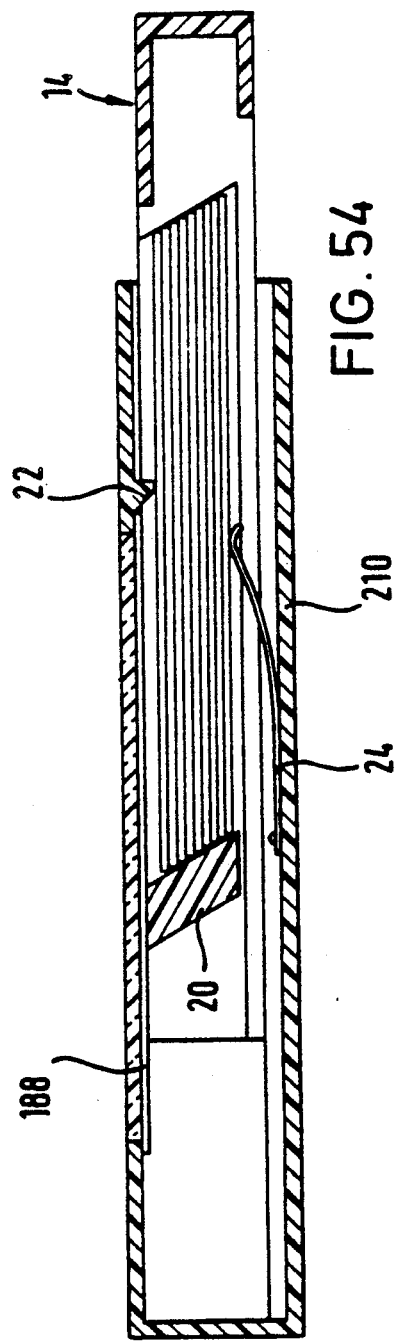

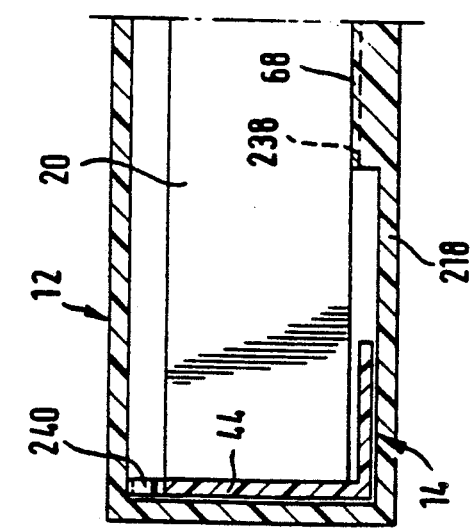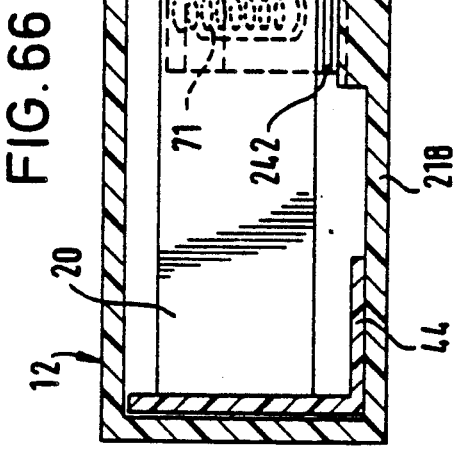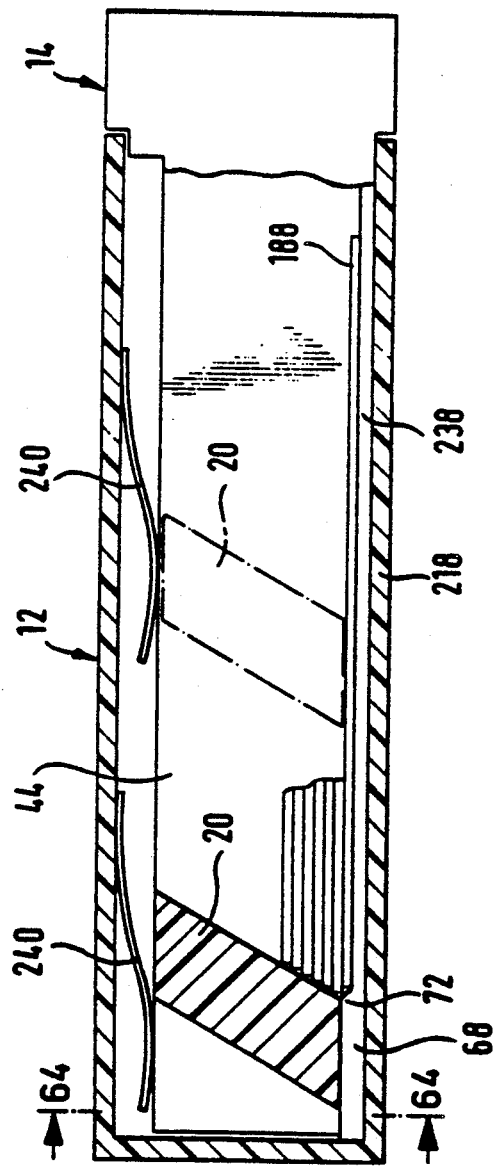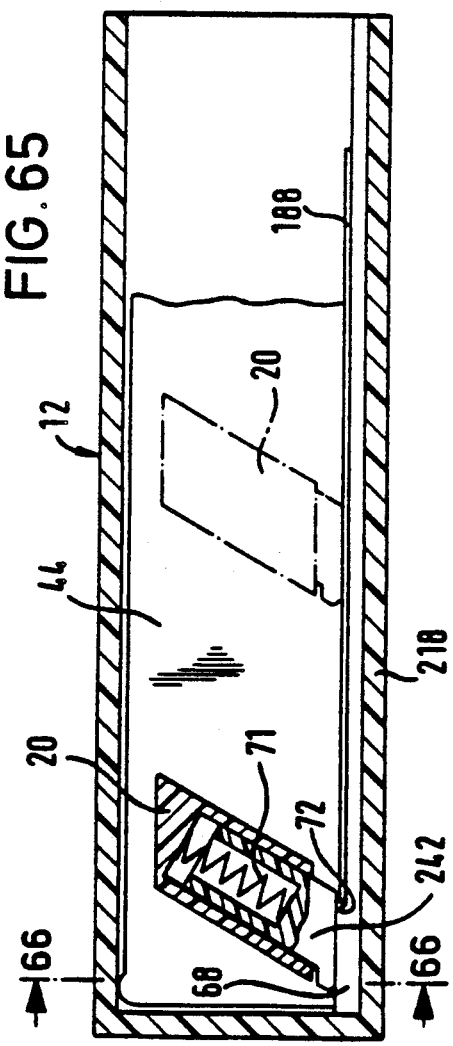

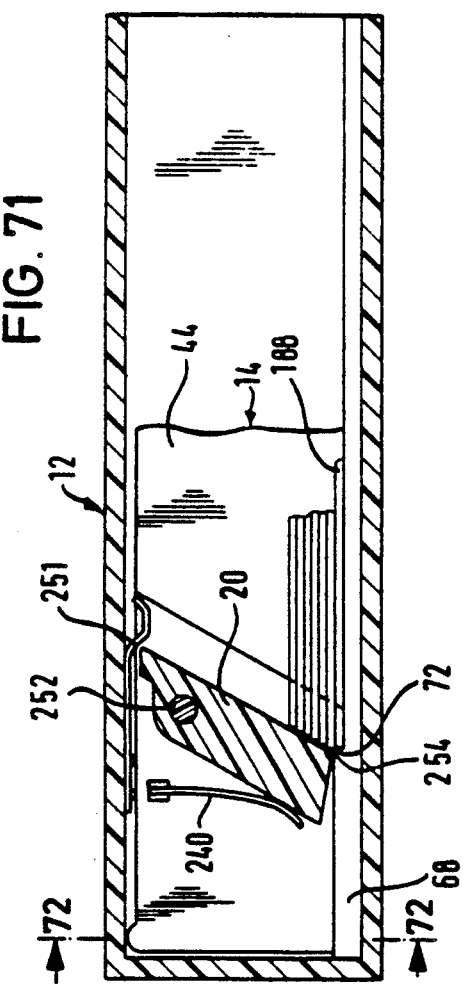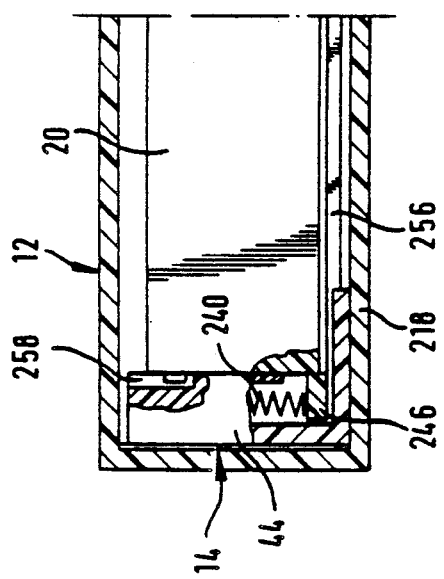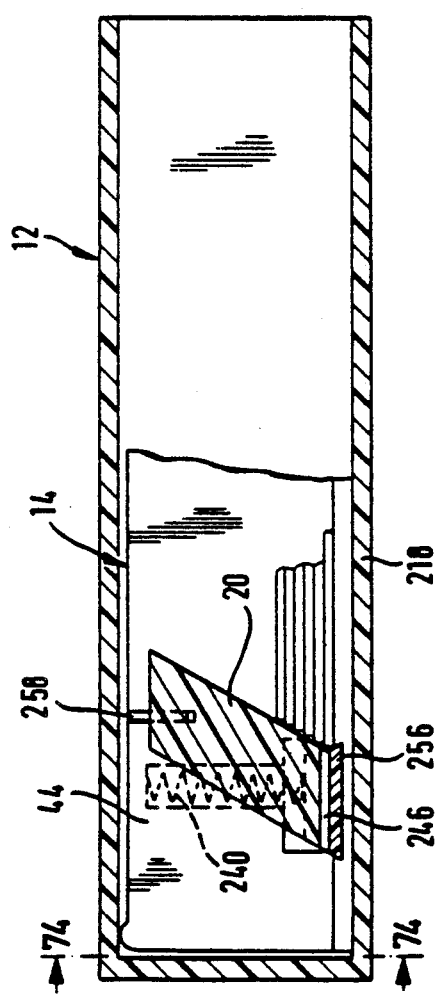

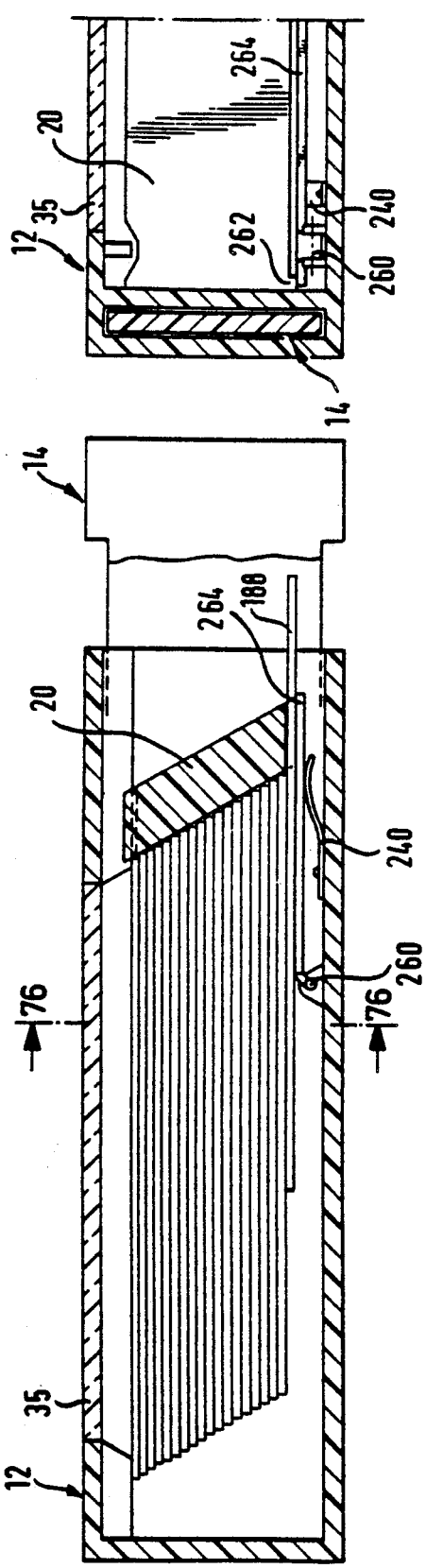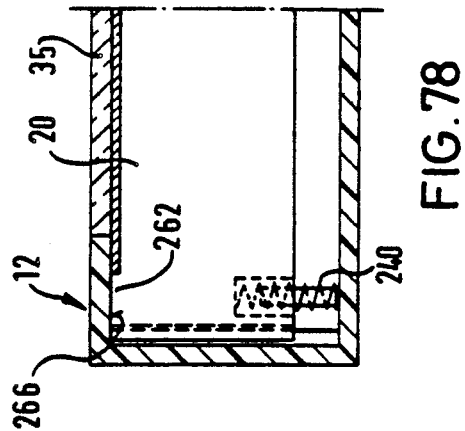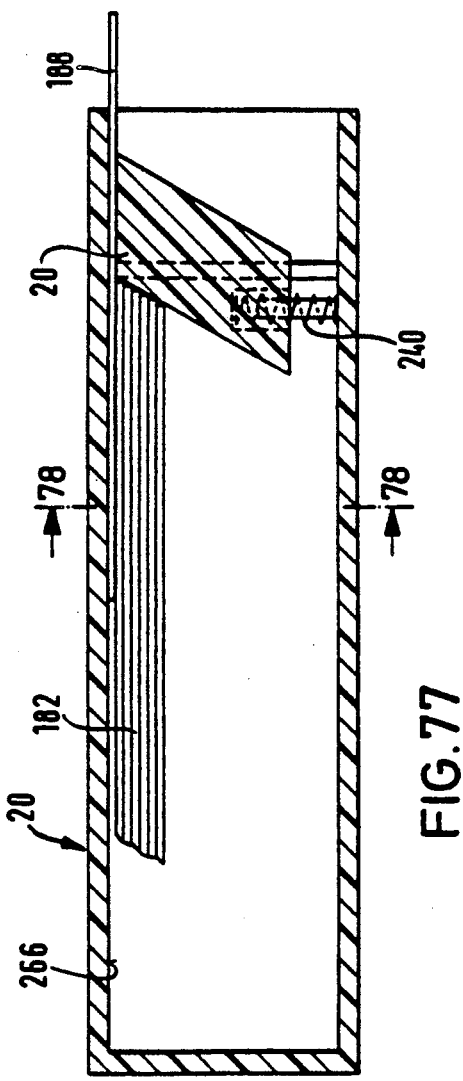

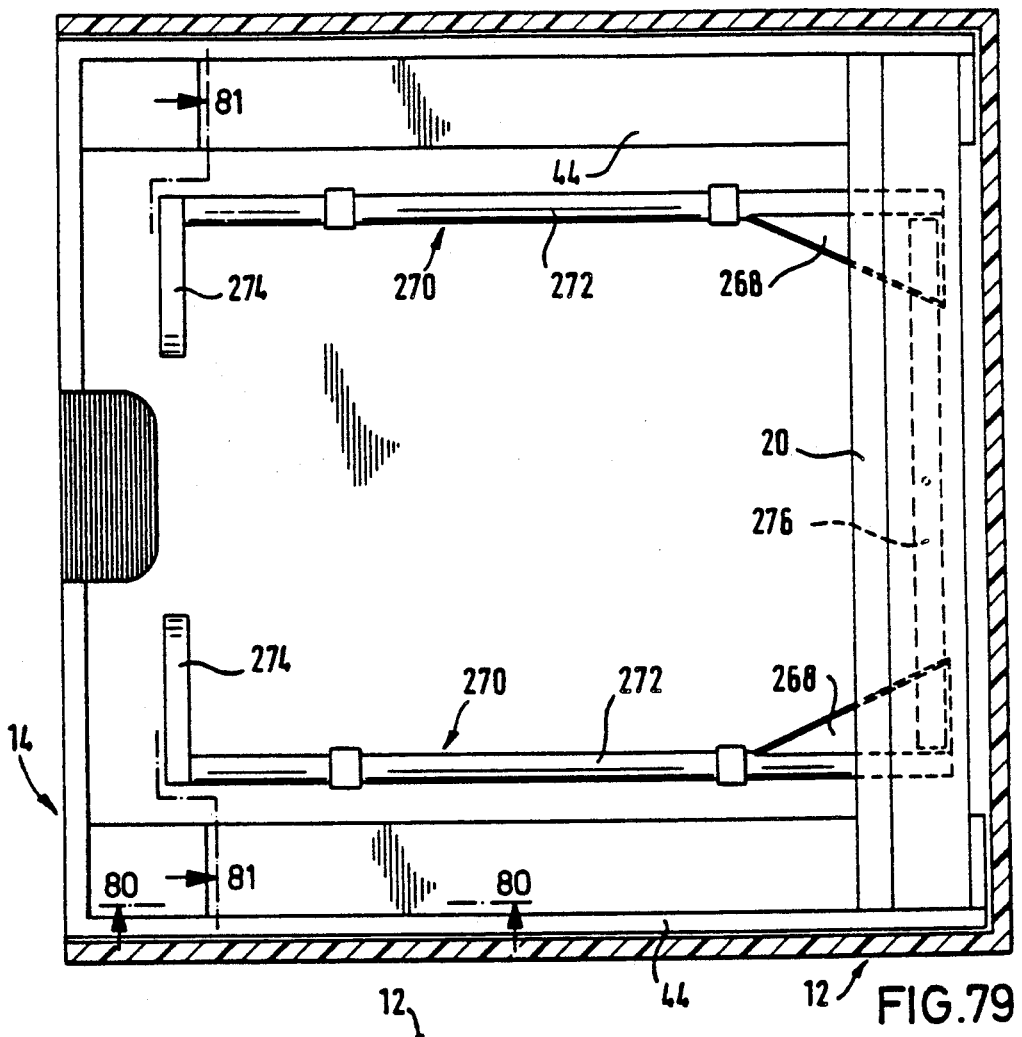
FIG. 79
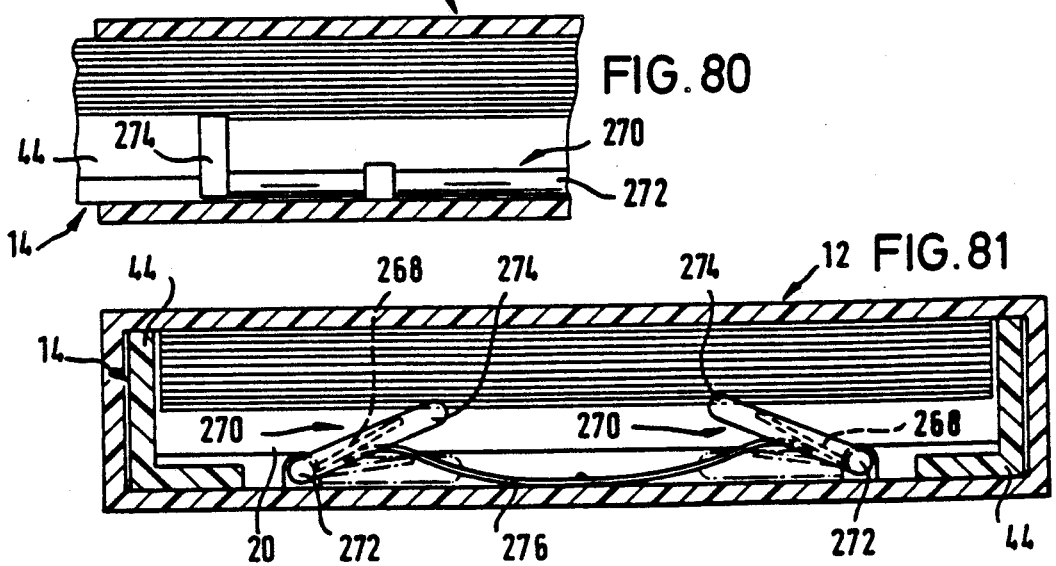
FIG. 80
FIG. 81

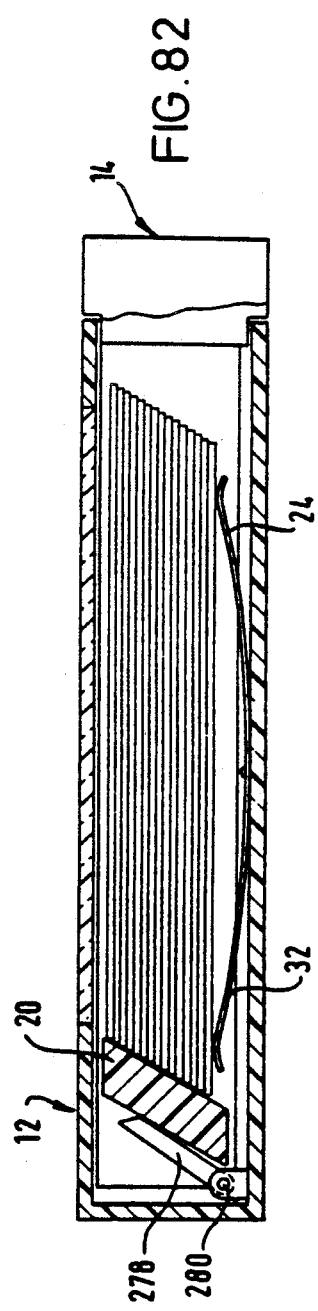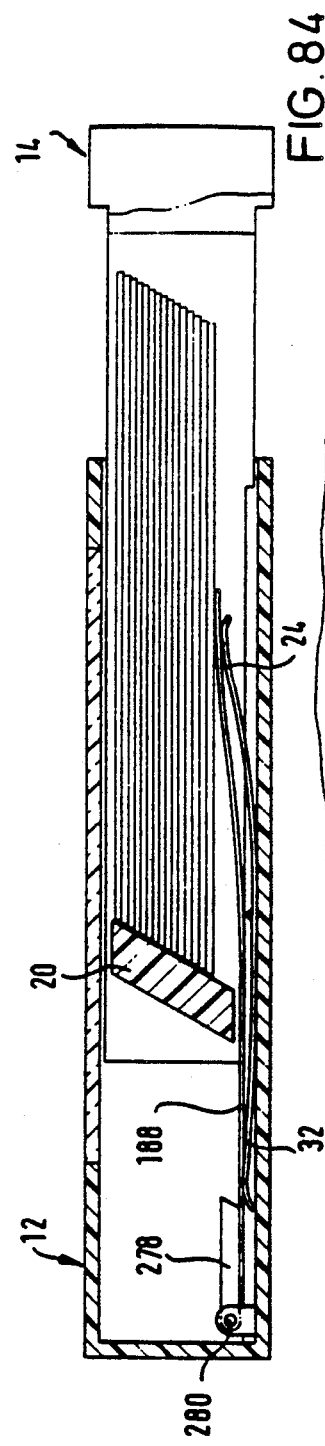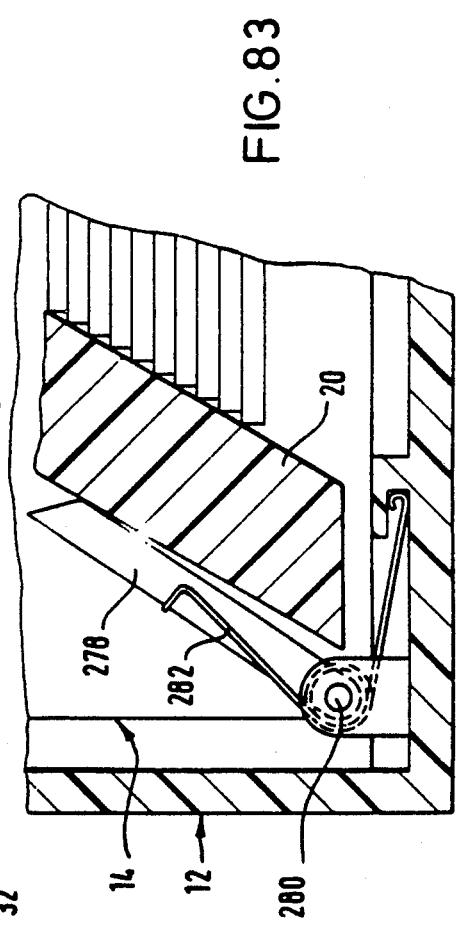

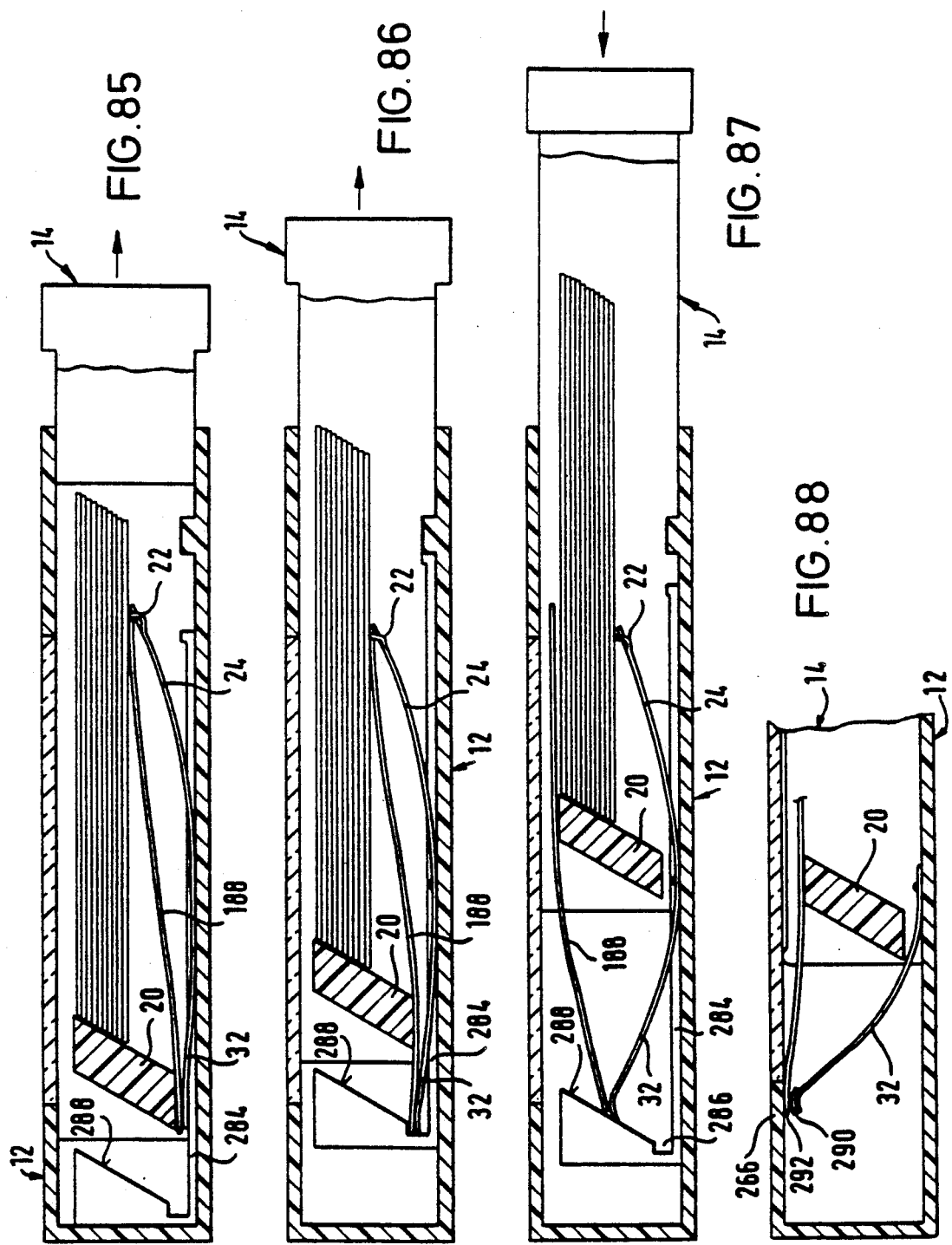

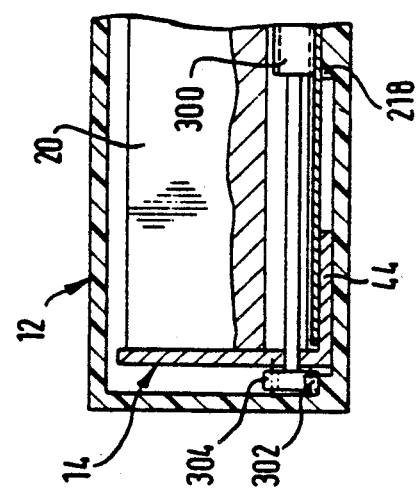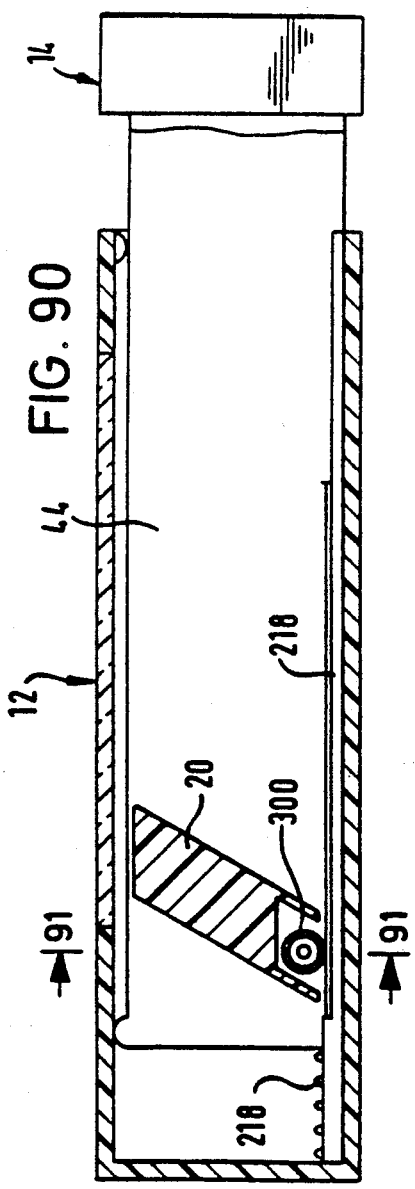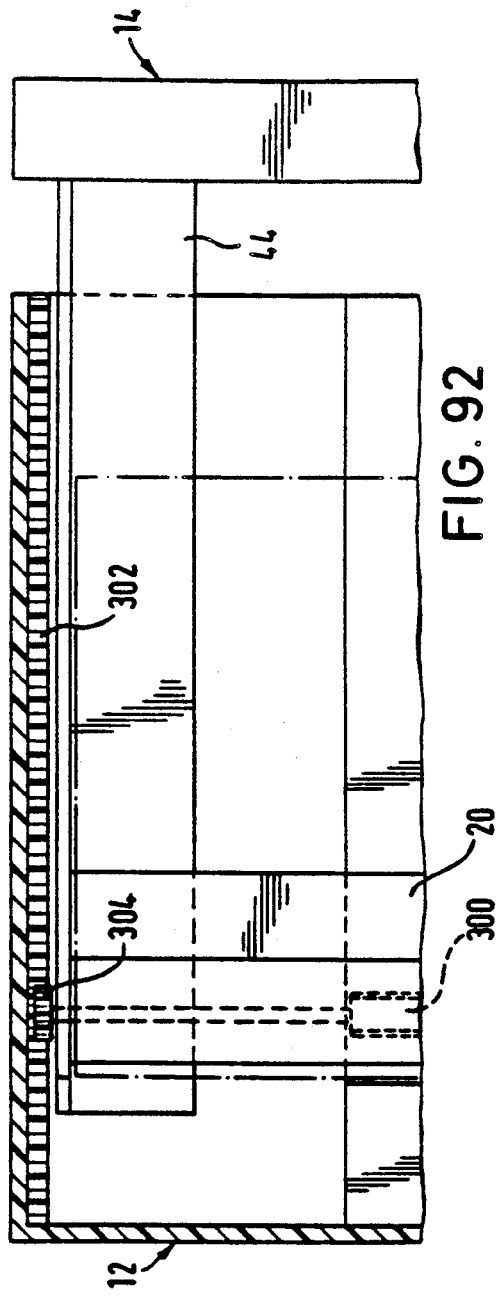

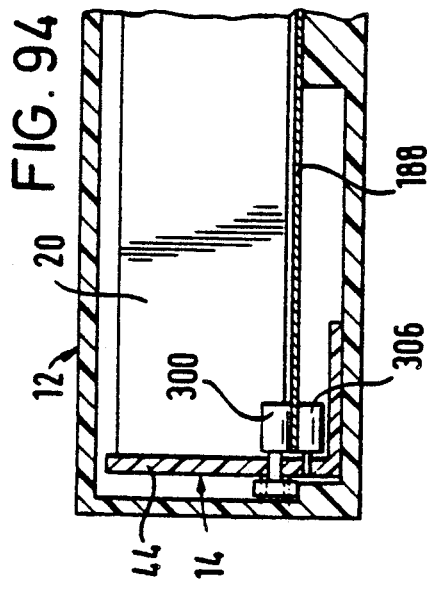
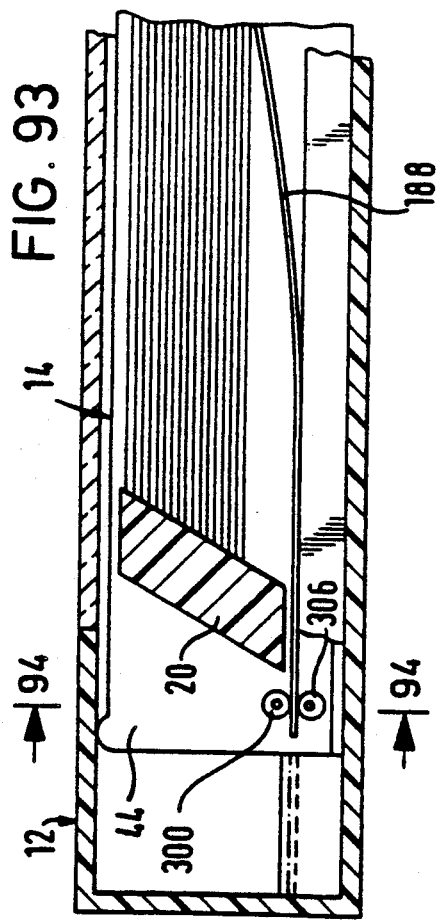
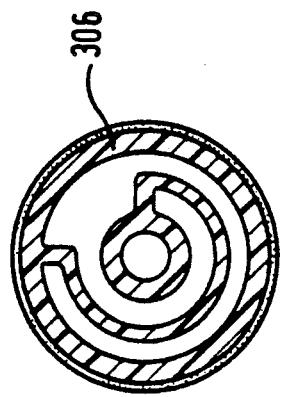

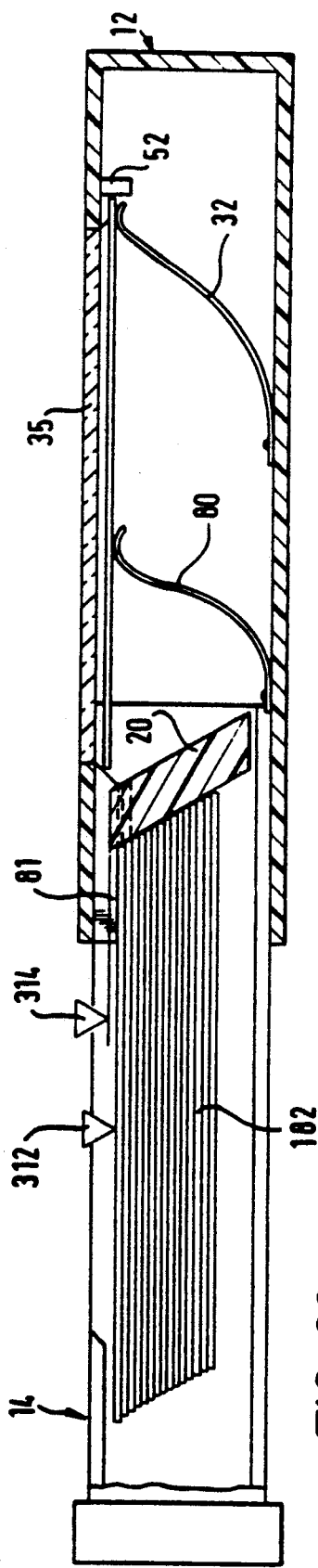
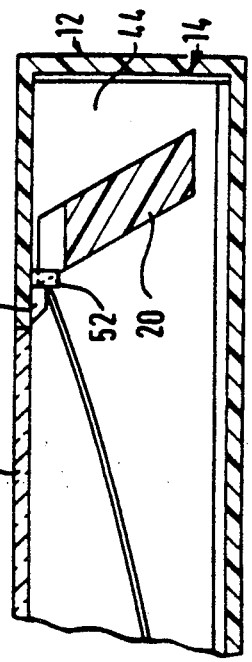
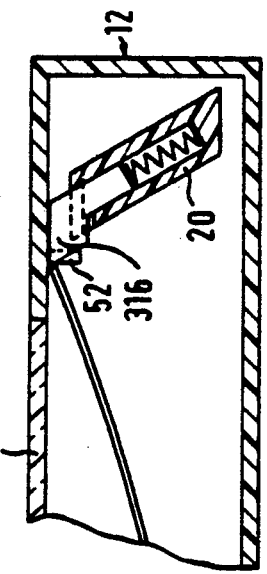
FIG. 98
FIG. 99
FIG. 100

FIG. 119
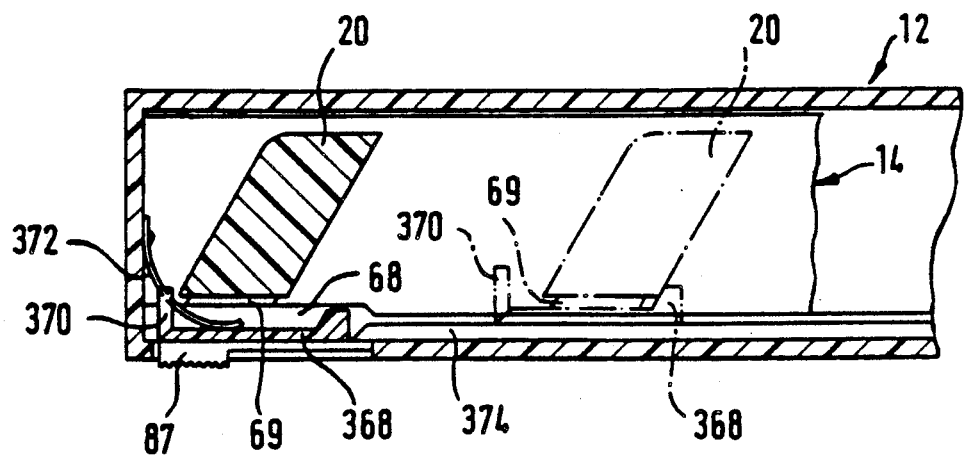
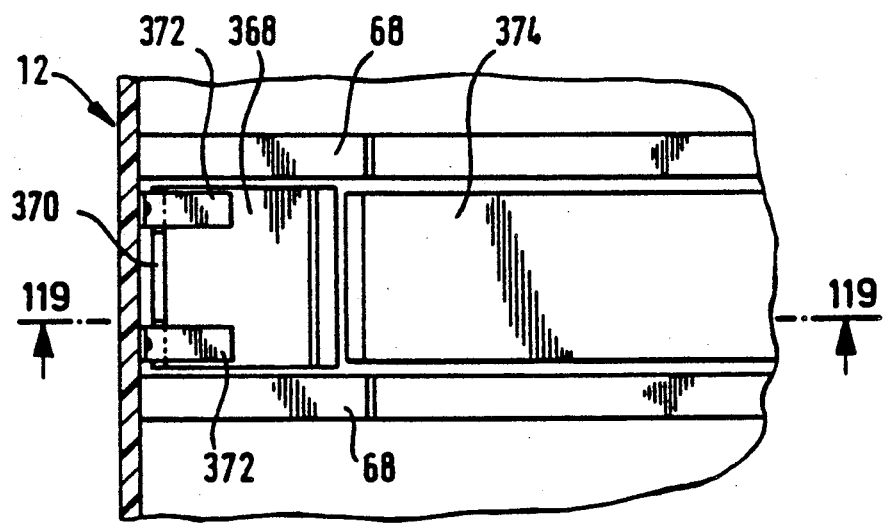
FIG. 120

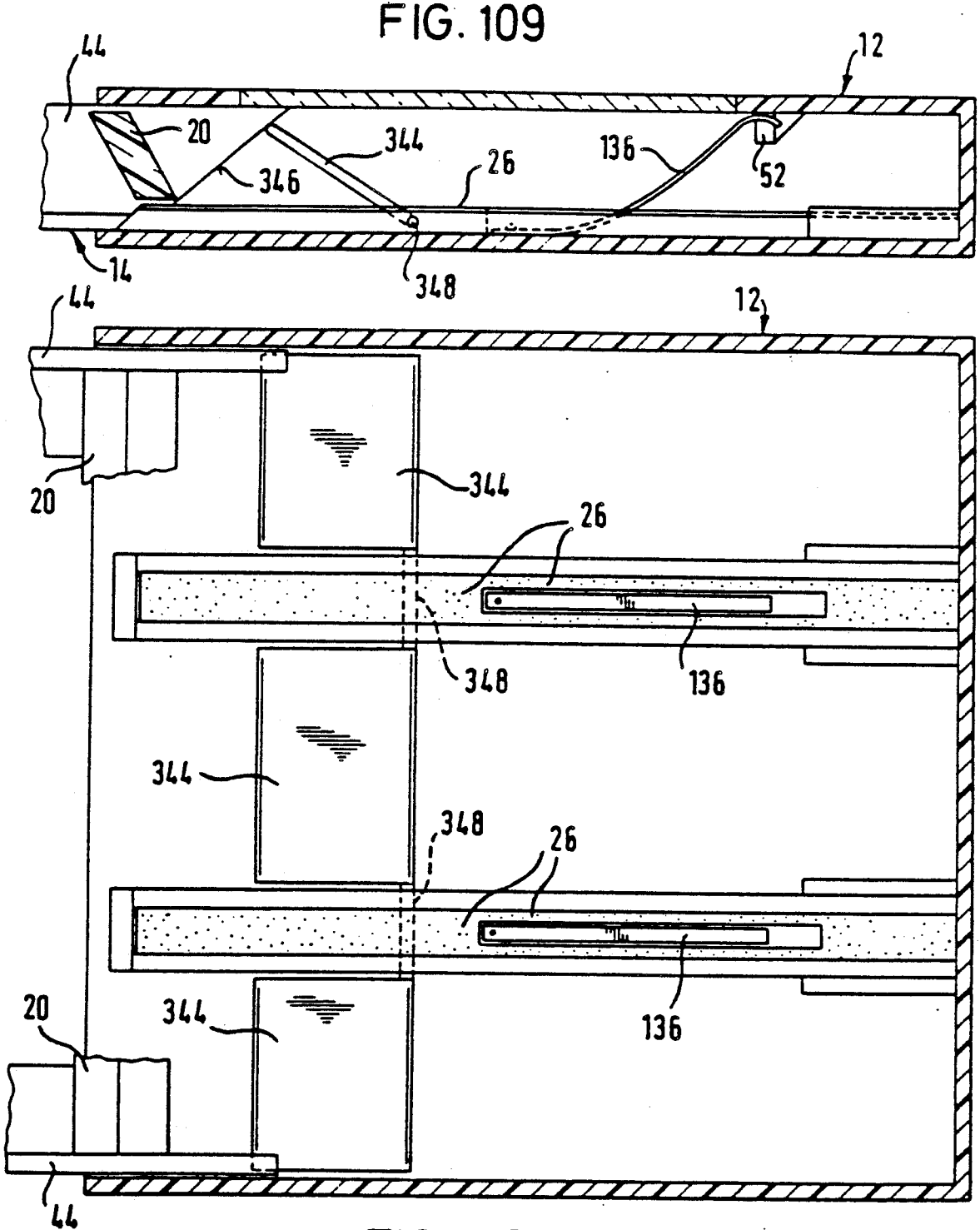

DEVICE FOR THE CYCLIC REARRANGEMENT OF A PILE OF RECTANGULAR OR SQUARE SHEETS

This is a continuation of application Ser. No. 890,023 filed July 11, 1986, entitled "Device for the Cyclic Rearrangement of a Pile of Rectangular or Square Sheets" now U.S. Pat. No. 4,787,162.

BACKGROUND OF THE INVENTION

The invention relates to a device for the cyclic rearrangement of a pile of rectangular or square sheets, or a so-called "picture-changer".

Picture changers are known from U.S. Pat. Nos. 4,238,898, 4,238,899, 4,241,528, 4,241,529 4,245,417, 4,251,802 and 4,376,348. These specifications are all based on the principle that a pile of pictures, especially photographic prints, is held by two frame parts that are movable relative to one another, one of which may have a viewing window. During each complete cycle of movement of the frame parts, that is, pulling them fully away from each other and sliding them fully back together again, one picture is removed from one end of the pile and returned to the other end of the pile again. The picture changers have the following components for this:

A feeding means feeds pictures to a separating means; the separating means detaches an individual picture from the pile; a retaining means holds the individual picture separated from the pile in one of the frame parts whilst the remainder of the pile is held in the other frame part; a guide means guides the separated individual picture such that it goes onto the other end of the remainder of the pile.

One difficult problem associated with picture changers is that in some circumstances very high forces are needed in order for two sheets that are clinging together to be separated from one another. Provided that these are relatively thick sheets, for instance cards, it is possible to engage the edge that is at the rear in the direction of movement of the individual sheet with a strong hook and to "push" the sheet without, on the one hand, the hook slipping off or, on the other hand, a plurality of sheets being transported with it. As soon as thinner sheets are involved, however, this becomes problematic. A hook bent at 90° can in fact slip off an obliquely cut sheet edge and so that this edge is sufficiently straight for it to be gripped by such a hook the entire pile has to be flattened out by applying considerable pressure. The pressure applied for this purpose in turn multiplies the difficulties, because the sheets, which by nature tend to cling together, whether because of static charge in a dry atmosphere or because of sticking in a humid atmosphere, only cling together that much more tightly. Even if this were acceptable, however, such a "changer" operating with a strong spring bias would be awkward to manipulate. This difficulty occurs especially in a case of an application which were it not for this difficulty would be a preferred application, that is the application of picture-changers to photographic prints. Photographic prints are only approximately 0.2 mm thick, and a changer is intended to function both with a pile of, for example, 30 or more photographs, and with only a few photographs, in an extreme case two photographs.

It is the aim of the invention to design a picture changer in such a manner that cyclic rearrangement is possible even where sheets with unpredictably curled edges clinging firmly together are involved, without a very considerable pressure having to be exerted on the pile in the direction of its thickness.

SUMMARY OF THE INVENTION

According to a further aspect of the invention, a device for the cyclic rearrangement of a pile of rectangular or square sheets, especially a pile of photographic prints, is provided with a first and a second frame part which may be moved relative to one another and parallel to the main plane of the pile, and with means that, on movement of the frame parts backwards and forwards, remove an individual sheet from one end of the pile and add it to the other end of the pile again, these means comprising:
  (a) a separating means for separating the individual sheet from the pile,
  (b) a feeding means for feeding sheets to the separating means,
  (c) retaining means for holding the individual sheet in the first frame part and the remainder of the pile in the other frame part, and
  (d) a guide means for guiding the separated individual sheet for the purpose of returning it to the other end of the remainder of the pile, wherein the feeding means on the first frame part has a contact face lying, as a result of spring bias, adjacent the rear edge (viewed in the direction of movement) of the pile at the end from which a sheet is to be separated, by means of which contact face a force exerted from the pile, parallel to the plane of the pile, on the contact face may be converted into a yielding movement transversely thereto against the spring bias. Accordingly, the feeding means also comprises an element acting on the rear edge of the sheet to be separated, but this is not a hook bent at right angles but an inclined face operating "gently". This inclined face lies against the edge of the pile with such a (spring-biased) force that the force component acting in the direction of displacement of the individual sheet is sufficiently great to allow this individual sheet to be separated by the separating means but is not large enough for the sheets, lying further inside the pile, the movement of which sheets is blocked at the separating means, to be pushed through by the separating means. It is clear that the inclination and size of the inclined face and the spring bias should be correspondingly matched to one another.

The subsidiary claims define advantageous further developments of the subject of the invention.

According to another aspect of the invention, provision is made for the feeding means to include a transporter which may be brought, under bias from a spring arrangement, to rest against the rear transverse edge (in the direction of movement) of the sheet to be separated, the spring arrangement carrying the transporter itself and being capable of being deflected transversely to the main plane of the pile. This means that a transporter, which, for example, may have a fairly acutely angled edge that positions itself behind the sheet edge, automatically adapts to the thickness of the pile, and, amazingly, arrangements providing relatively moderate spring bias are sufficient, provided that this spring is arranged on the same side of the pile as the transporter itself.

In conjunction with the invention, the separating means, the retaining means and the guide means, and also further secondary components of the device may have different forms, to which reference will be made in each case in the following description of examples of execution.

BRIEF DESCRIPTION OF THE DRAWINGS

FIGS. 1 to 10 illustrate a first complete example of execution, wherein

FIG. 1 is a partially cut-away plan view of the device, pulled partially open,

FIG. 2 is a section along line 2—2 of FIG. 1,

FIG. 3 is a section along line 3—3 of FIG. 1,

FIG. 4 is a section along line 4—4 of FIG. 1,

FIG. 5 is an analogous section through only one frame part,

FIG. 6 is a section along line 6—6 of FIG. 1,

FIG. 7 is a partial section through the separator bar,

FIG. 8 is a partial front view of the separator bar,

FIG. 9 is an enlarged partial view of a subassembly from FIG. 1,

FIG. 10 is a plan view of the subassembly shown in FIG. 9.

Analogously to FIG. 9, but in two operating positions, FIGS. 11 and 12 illustrate a subassembly of alternative design.

FIGS. 13 to 33 relate to a second example of execution, wherein

FIG. 13 is a plan view, similar to FIG. 1, but in the left half of the Figure the frame parts are pushed together and in the right half they have been pulled apart, FIG. 14 is a longitudinal section along line 14—14 of FIG. 13, FIG. 15 is a cross-section along line 15—15 of FIG. 13, FIG. 16 shows in plan view, and FIGS. 17 and 18 show in section, a detail of the frame parts, FIG. 19 is a longitudinal section and FIG. 20 a plan view of a further detail, FIGS. 21 and 22 show, analogously to FIGS. 19 and 20 respectively, an alternative construction of the same functional subassembly, FIGS. 23 to 25 show in simplified longitudinal section the sequence of a separating operation, FIG. 26 shows in perspective and FIG. 27 shows in partial plan view a further detail of the device, FIGS. 28 and 29 show a further detail substantially schematicized, FIG. 30 shows a partial perspective view and FIG. 31 shows in side view a further detail, and FIG. 32 shows in side view and FIG. 33 in plan view a subassembly inserted in the housing frame part.

The following Figures show either substantially schematicized illustrations or detailed views to illustrate differences; as regards the details not shown in each case, the reader can refer to the embodiments of FIGS. 1 to 10 and 13 to 33 which have been explained in detail.

FIGS. 42 to 46 show a further example of execution, FIGS. 42 and 44 to 46 showing the sequence of the first half-cycle of the change and FIG. 43 showing the transporter on an enlarged scale. FIGS. 47 to 52 show, in a similar form to FIGS. 42 to 46, a further example of execution. FIGS. 53 and 54 show an alternative feeding means in two operating positions in schematicized longitudinal section.

Figure 55:
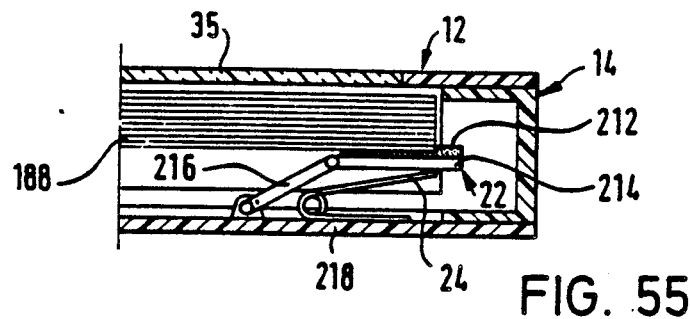
Figure 56:
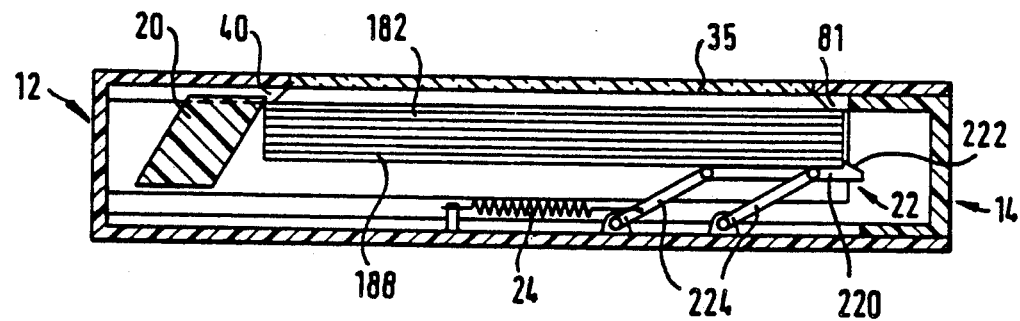
Figure 57:
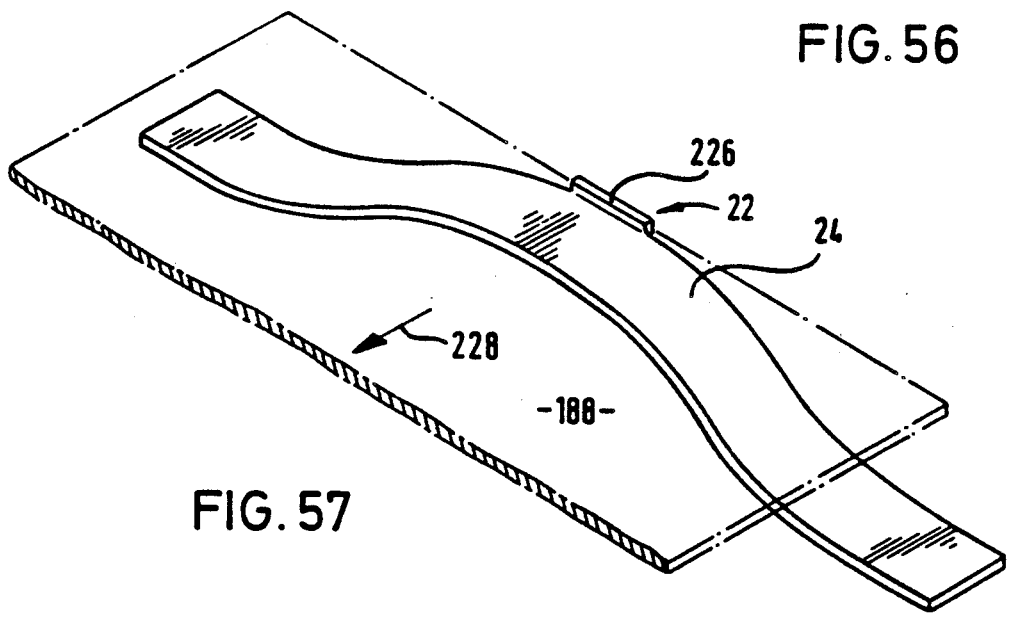

FIGS. 55 to 57 each show a further alternative feeding means.

FIGS. 58 to 62 illustrate schematically how a correctly functioning feeding means is possible despite sheets of pictures of varying length.

The Figures then following illustrate alternatives to the functional subassemblies provided in the first two fully described examples of execution, wherein FIGS. 63 to 78 show alternative separating means, FIGS. 79 to 96 show alternative retaining means, and FIGS. 97 to 113 show alternative guiding means.

Finally, FIGS. 114 to 123 show alternative ways of removing all sheets or pictures from the device.

DESCRIPTION OF THE PREFERRED EMBODIMENTS

FIGS. 1 to 10 relate to a first embodiment which is described in detail hereinafter with all components co-operating.

FIG. 1 shows in a plan view, partially cut away, a device according to the invention. The first frame part is designed as a housing 12, the second frame part is a slider member 14 which can be pulled out of the housing for a distance limited by stop members 16 on the slider member and complementary stop members 18 on the housing and pushed back in again. The separating means is formed by a separator bar 20. The feeding means is embodied by hook like members 22 which are located on leaf-spring type spring arms 24. The retaining means for holding the remainder of the pile in the slider member is likewise formed by the separator bar, whilst the separated individual picture is held in the housing by the co-operation of rails arranged fixedly in the housing and provided with a retentive coating 26, with rollers 28 that hold the individual picture firmly against the rails and are caused to rotate as a result of contact with the rails. Finally, the guide means is embodied by pairs of leaf springs 30 and spring arms 32, the spring arms 32 being formed integrally with the spring arms 24.

In the inserted state of the slider member 14, the spring arms 24 and 32 press the pile of sheets (not shown in FIG. 1) against a viewing window, the inner border of which is denoted by 34. The sheet which is then uppermost in the pile, in a specific case a photographic print, is intended to lie as flat as possible; to that end, at its periphery it is supported in a plane that is defined by lateral ribs 36, by the underside of a slidable catch 38 and, at the opposite end, by ribs 40 moulded on the housing.

FIG. 1 shows the partially withdrawn position of the slider member 14. In the inserted state, the separator bar lies on the other side of these ribs 40; however, because it projects further towards the window 35 which corresponds to the height of these ribs, it has recesses 42 so that the ribs are able to pass through.

The edges of the pile are supported laterally, (that is, parallel to the withdrawal direction) by side pieces 44 of the slider member. At the front, that is, on the side of the slider member that is furthest away from the housing when the slider member is withdrawn, the edges are supported by the stop face 46 of a centrally arranged grip part 48 that the user may grip and by lateral stop faces 50 on the slider member. At the opposite end, the edges of the photographs are supported against stop members 52 moulded on the housing, for the passage of which the separator bar likewise has recesses 54 that are substantially deeper than those for the ribs 40.

The rib 36 extends further into the interior of the slider member than the height that is defined by the top edge 55 of the side pieces of the slider member so that the photographs are unable to slide out laterally over the side pieces of the slider member. An analogous action occurs between the separator bar on the one hand, the ribs 40 on the other.

The grip part 48 has a top part 56, arranged on the window side of the housing, and a bottom part 57 which is wider than the top part; the top wall 58 of the housing surrounding the window in the manner of a frame has a cut-out 59 in the region of the top part, whilst the opposing housing wall is recessed at 60 in a complementary manner for the bottom part 57. Accordingly, in its closed state the device has a closed, substantially rectangular outline without any protruding parts.

The housing and the slider member are injection-moulded plastics parts. The slider member is a one-piece element, comprising side-pieces, separator bar, grip part and a front wall 61 joining the grip part to the side pieces, which are of L-shaped cross-section.

The housing is composed of three parts: the bottom shell 62 providing the floor 63, the frame-like upper shell 64 with the window aperture, and the window 35 set into this. The housing is reinforced in the direction of the slider member movement in that the struts between the top and bottom wall are constructed as double supports, as shown in FIG. 6. The housing parts can be welded together, or a snap-fit connection may be provided.

Around its main surface the window has a narrow border 66 that protrudes slightly outwards, so that it is somewhat proud in respect of the frame surrounding it. A recess that is complementary with the outline of this border on the outside of the opposite bottom wall is denoted by the numeral 67 and permits several housings to be stacked one on top of the other.

When the slider member is withdrawn from the housing, it is gripped using one hand at the top and bottom parts of the grip, whilst the other hand holds the housing. The hook-like members 22 engage the front edges of the photographs lying on the spring arm ends, that is the edges furthest away from the separator bar, as a result of which a certain number of photographs, depending on the height of the hook-like members, is fed to the separating means. This is basically formed as a through-slot which is defined, firstly by (in the embodiment) two lands 68 moulded on the base of the housing on the inside and, secondly, by the underside of shoes 69 that oppose the lands, the shoes being inserted into the separator bar and shown in FIG. 7 in section and in FIG. 8 in front view.

Each land 68 is associated with a respective shoe 69 and the land/shoe arrangements are located on both sides of the plane of symmetry 70 of the device. The shoes are guided longitudinally in the separator bar, are supported on a knife-edge-like bearing and biassed by an inserted wire spring 71. Each shoe additionally accommodates a small roller that is rotatable about an axis at right angles to the withdrawal direction and the small roller 28 projects slightly from the shoe.

FIG. 3 shows the position of the lands 68 which protrude by fully the thickness of a photographic print further above the level of the base of the housing than the surface of the retentive coating 26. In the rest or closed position of the slider member, the lowermost portion of the shoes is spaced somewhat from the edge 72 of the land, and the surface of the separator bar facing towards the pile is sloped, somewhat like a wedge, such that, as the separator runs onto the edge of the pile, the photographs, on the opposite edge of which the hook-like members 22 are acting, "migrate" downwards along the oblique face towards the edge 72 of the lands facing them. There is sufficient room between the shoes 69 and the retentive coating 26 for the leading edge of a single photograph alone (the lower-most in the pile) to be able to enter the slot forming between the shoes 69 and the retentive coatings 26, for as long as this slot is held open by the land 68 as will be explained. All the other photographs transported with the hook-like member 22 come up against the separator itself or against the shoes thereof with the result that the hook-like members slip off the end edge of the photographs.

When the rear edges (in the withdrawal direction) of the shoes 69 have passed the edge 72 of the lands 68, the shoes drop under the action of the wire spring 71, the rollers 28 positioning themselves on the individual photograph that has been separated in this manner and pressing it onto the associated retentive coatings so that it is firmly held in the housing, that is, the first frame part. The remainder of the pile is transported by the separator together with the slider member to the outside until the slider member has been fully withdrawn.

Care should be taken therein that the separator bar also runs over the spring arms 32. So that they do not stress the separated picture from below during the passage of their ends acting on the pile, during a certain phase of the withdrawal movement they are pressed mechanically towards the housing floor. Spring-depresser members 73 moulded on the slider member side pieces 44 are used for this purpose; these spring-depresser members pass over projections 74 extending laterally from the spring arms and hold the arms corresponding to their length for a part of the withdrawal movement. Further spring-depresser members 75 on the slider member side pieces run onto the spring arms 24 at the enlarged portion 76 as soon as the individual photograph has been safely held between the retentive coating and the rollers, and press these arms likewise away from the viewing window so that further photographs can be introduced and others removed without hindrance.

On the side of the separator furthest from the pile the spring arms 32 are released again after travelling a short distance so that they again act from beneath the separated photograph and guide its trailing edge gradually towards the window. Finally, this edge positions itself under the influence of the springs against the upper side of the housing. Because the free ends of the spring arms are rounded, but this edge shall on the other hand be firmly held at the position it has reached, a short portion of the spring arms is additionally of linear formation, denoted by 77 in FIG. 4. The rounded spring arm end finds space in a recess on the inside of the housing top wall, denoted by 78 in FIG. 5.

The two hook like members 22, the two shoes 69, the retentive coatings 26 and the spring arms 32 are all in each case arranged symmetrically with respect to the central plane of the device as a whole, and the two hook-like members 22 lie as exactly as possible on a line that is at right angles to this plane of symmetry. This means that the photograph to be changed then goes through the change-over operation without becoming twisted even when it is not guided by the slider member side pieces because it has dimensions smaller than its nominal ones. The dimensional tolerances of photographs are in fact, with the same nominal size, different in the transverse and longitudinal direction: since the processing firms work with photographic paper from rolls of very accurately defined width and then cut the photographic paper up into different lengths, it is preferable to have the closer toleranced dimension of the photograph in a direction appropriate to that in which the slider member moves.

The complete separated individual picture, which until now has been described as being held only at its one edge, is lifted towards the window. For this, the leaf springs 30 already mentioned having forwardly-positioned arms 79 and rearwardly-positioned arms 80 are used, these arms holding and supporting the individual photograph, as seen clearly from FIG. 5, in such a manner that it is able to return to the pile again as the slider member is pushed back in. In the closed state of the device and during the withdrawal movement of the slider member, at least during the initial part thereof, the spring arms 79, 80 are pressed by the side pieces of the slider member into complementary grooves in the housing floor, which may be seen in FIG. 6.

At the start of the return movement of the slider member, the individual photograph is held by the spring arms 32 in front of the stop members 52 moulded on the housing and is supported in the direction of the separator bar at four points by the spring arms 79, 80. The other transverse edge of the photograph facing towards the separator bar may hang down; the side of the separator facing it is, however, sloped, somewhat like a wedge, so that the edge is raised gradually as the separator bar runs onto it. Between the top edge of the separator bar and the top wall of the housing there is a gap which is generously dimensioned for the passage of the photograph. The risk of the photograph striking against the edges facing it of the remainder of the pile transported by the slider member is countered by the top wall of the housing having holding-down lugs 81 on its inside which hold the pile below the level of the top side of the separator. These holding-down lugs are aligned with the ribs 40 so that they pass through the complementary recesses 42, 54 of the separator bar.

The slidable catch 38 is mounted so as to slide in the grip part and is biassed by a spring towards the housing, as readily recognisable from FIG. 3. As the slider member is inserted, the free edge 82 of the slidable catch strikes against a stop member 83 provided in the housing, as a result of which the slidable catch is pushed back into the grip part and does not project into the space visible through the housing window. Once the slider member has been pulled out, however, the slidable catch prevents the photographs lying in the slider member from falling out. To change the photographs, the slidable catch can be pushed back manually, which is facilitated by the finger-engageable edge 84. The photographs may be pushed out from the underside of the slider member by getting hold of them between the side pieces, or they may be grasped from above next to the grip part.

In the case of the procedure described so far, the separated photograph always remains behind in the housing. It is not possible, or only possible with difficulty, to remove this from the device. In order to be able to remove the pile even when this consists of one picture only, a special arrangement is therefore provided.

A control bar 85 is slideably mounted in the housing, held by retainers 86 moulded on the housing. The bar carries an actuating or control key 87 which passes through the rear wall 88 of the housing and projects slightly beyond the outline of the change-over device. By applying pressure with the finger to the key, the bar runs on wedge-like guide members 89 on the housing floor and is thereby lifted towards the window. The width of the bar fits exactly into a complementary recess 90 in the separator and blocks, for the entire withdrawal movement of the slider member, the through-slot of the separating means, so that every picture located in the device has to be transported out with the slider member. Close to the outer end position of the slider member, its separator bar runs over an upwardly-projecting part 91 of the bar which yields resiliently downwards; if the slider member is now pushed back in, the separator bar first pushes the bar back into its initial position, before it can be freely guided back with the upwardly-projecting part 91 being deflected again.

As mentioned above, the photographs are intended to be held by the means described at a distance from the window pane so that during the change-over operations it does not come into contact with the surface of the picture, causing scratch damage to occur. There is still this danger, however, because the photographs are not always flat, but generally speaking are bowed either in the longitudinal or in the transverse direction. In the case of bowing in the longitudinal direction, the ribs 36 effective for the entire withdrawal movement are sufficient. In the other case, however, the slideable catch is effective but the opposite portion of the separator bar would hardly be able to absorb the considerable stresses which occur in a relatively thick pile of similarly bowed photographs.

For this reason the following measures are taken in addition:

Beneath the stop faces 50 the front wall of the slider member therefore has, near the side pieces 44, inclined faces 92 which are substantially parallel to the separator slope lying opposite. The photographs thus lie so that they are staggered obliquely between separator and inclined faces, so that most of the stresses in the pile are distributed over the entire surface of the separator. In addition, in the centre of the separator bar a projection 93 is provided which takes up the residual stress of those photographs which are supported against the stop faces 50 perpendicular to its edge.

Once the user has begun to carry out the changeover movement, this must be completed in order to bring the device back into the initial position. The slider member cannot therefore be pulled out halfway and then pushed in again.

This is effected by means of a mechanism which is shown in detail in FIGS. 9 and 10. Moulded onto the housing there is a toothed rack 94 with which a pinion 95 meshes, the pinion being integrally-formed with its shaft 96. The shaft fits in a slot 97 running parallel to the rack in the side piece 44 of the slider member, in which slot it is pressed and held by means of a small leaf spring 98, moulded onto the pinion, and resting against the housing.

The slot 97 is divided by means of a rib 99 into two parts, in which the shaft 96 has only a little lateral play. Finally, moulded onto the slider member on both sides of the slot there are locking lugs 100, 101 which lie in the plane of the toothed circumference of the pinion and the points of the lugs are engageable with the latter.

This mechanism operates in the following manner:

Let it be assumed that the pinion is in the position shown in FIG. 9 and that when the slider member moves in the direction of the arrow 102 the pinion rotates in the direction of the arrow 103. Owing to the friction of the small spring 98 on the housing wall the pinion is thereby held near the centre of the slot with its shaft resting against the rib 99. The result is a spacing, although this is small, between the circle defined by the tips of the teeth of the pinion and the point of the lug 101. If an attempt is now made to move the slider member in the opposite direction, the pinion is displaced to the outer end of the slot and its further movement immediately blocked by the point of the lug 101. At the end of the travel of the slider member, however, the toothed circumference of the pinion meets a stop sector 104 and, with the small spring 98 being deformed, is lifted over the rib 99, so that now rotation only in the opposite direction is enabled.

It is important to note that over the greater part of the withdrawal travel of the slider member the retaining means is indeed embodied by the rollers 28 in conjunction with the retentive coatings 26, but over the last part of the travel, shortly before the end position is reached, the spring arms 32, by firmly holding the individual photograph, also act as an "extension" of the retaining means.

As is apparent from the preceding explanation, each rearranged sheet is never released during the whole changeover cycle, but is held at at least two points and thus secured against rotation. It is thus constantly under control, in this case with means symmetrical to the axis.

The limbs of the slider member side pieces which are parallel to the pile and on which the separated sheet supports itself during rearrangement, should be at the most at such a distance from each other that a short photograph, which rests with one edge just against a limb of a side piece perpendicular thereto, is still held by the opposite side piece on the other edge.

As mentioned above, the device has the viewing window in the upper shell of the housing. The dimension of the window is then at the most so great in the direction transverse to the direction of movement that the shortest possible photograph, even if it is lying off-centre, does not present itself with its edge in the field of view. The same applies to the ribs 36 and just the same considerations apply to the spring arms 79 and 80 and especially to all components engaging with the sheet surfaces.

The construction of the spring system which is described above and illustrated, formed by the springs, cut in one piece and arranged symmetrically in pairs, with the spring arms 24 and 32, fulfils a total of five functions. Firstly, the hook-like members 22 moulded on them form the feeding means, the hook-like members finally taking along only one sheet into the separating means. Secondly, both arms together—or more accurately, the four arms of the two springs—form a bias system with which the pile is neatly pressed against the window when the device is at rest. Thirdly, the arm 32, after it has been passed over by the separator, serves to convey the individual sheet to the housing top wall and there, fourthly, hold it firmly. Fifthly, and finally, the arms 32 are arranged close enough to the retentive coatings 26 to be able, as a result of their bias force, to displace or peel off from the retentive coating any individual sheet which might adhere to the latter owing to a static charge. It is to be noted that the arm 32 is so shaped and arranged that it can be passed over by the separator bar without any disturbance to smooth operation.

FIGS. 11 and 12 show an alternative form of the blocking means according to FIGS. 9 and 10. Of the frame parts, in each case only sections 12 and 14 lying opposite each other are indicated. In one of the frame parts, in this case the frame part 14, a jamming-action roller 108 is rotatable about a journal 106, which is, however, fitted eccentrically. The roller carries opposite its greatest radius a pin 110 over which there is engaged a leaf spring 112 attached to the frame part 14. During movement in the direction of the arrow in FIG. 11 the jamming-action roller can yield, but in the opposite direction it jams the two frame parts. When the frame parts are in the end positions the jamming-action roller meets in each case a recess 114 in the other frame part and can therefore, when the push/pull direction is reversed, pivot freely through approximately 90°, until the pin 110 rests against the spring 112 again.

The two blocking devices described above act in the manner of a free-wheel and they only switch over the direction of free-wheeling when the two frame parts are in the end positions relative to each other. It may happen, however, that a user would like to rectify a faulty operation, perhaps because a pile of photographic prints has shifted during insertion. It is then desirable to be able to displace the frame parts relative to each other in both directions without blocking, at least from certain positions. For this reason a different type of construction of the blocking device is provided in the preferred example of execution described below.

Figure 13:
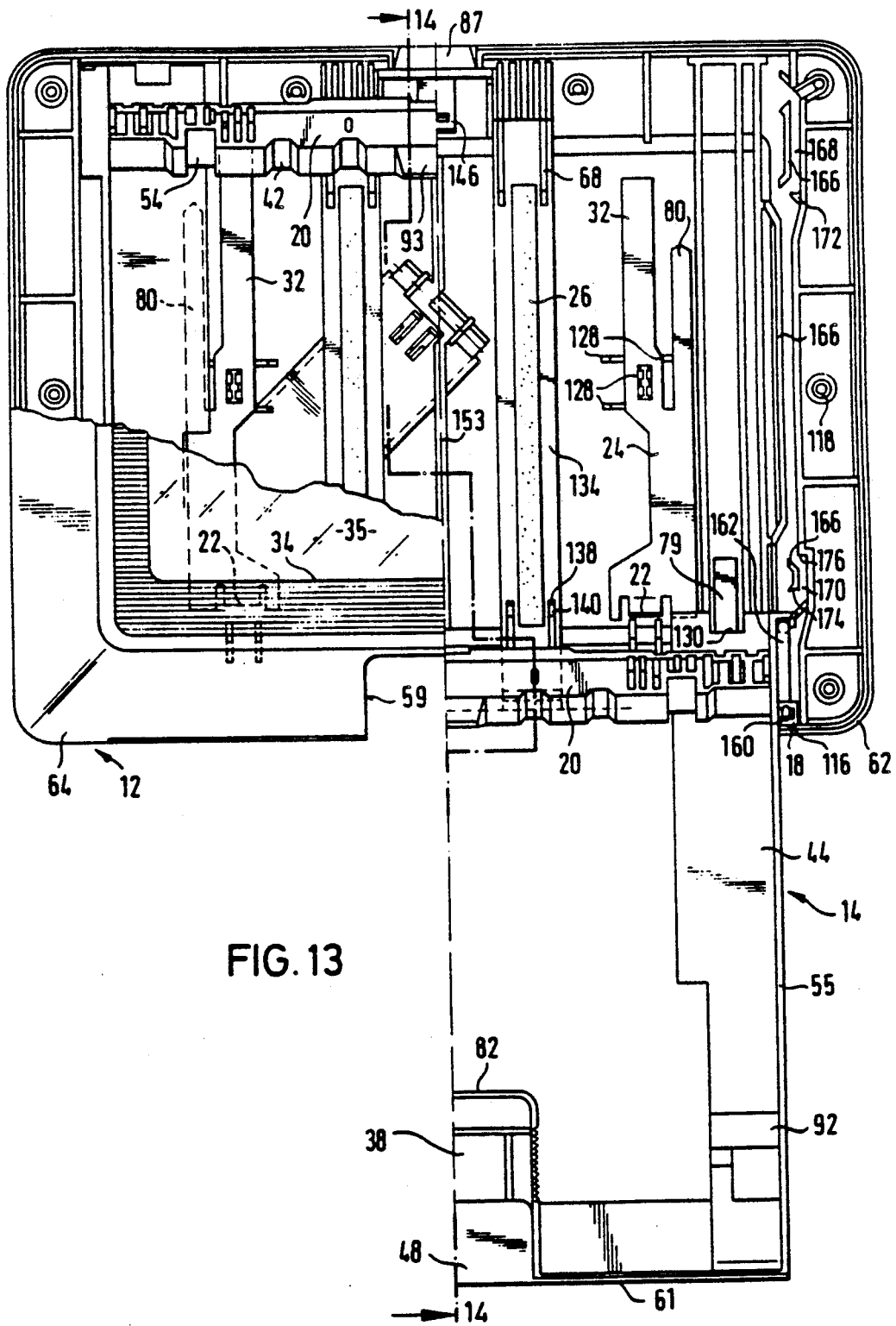

In FIGS. 13 to 15, the embodiment is illustrated in its totality. The slider member 14 is housed in the housing 12 so that it can slide; the housing 12 forms the first frame part, and the slider member 14 the second. The withdrawal travel is limited by means of a bearing eye 116 which is moulded onto one of the side pieces 44 of the slider member and runs onto a stop member 18 in the housing. The housing is screwed together from an upper shell 64 and a bottom shell 62, the outer rims of which engage in an interlocking manner with each other, in the region between the side pieces 44 of the slider member and the outer edges of the housing which are parallel thereto. For this purpose, the bottom shell has in each case moulded-on guide sleeves 118 for screw shanks 120 and also recesses 122 on the outside for screw heads 124, while the upper shell carries for this purpose coaxially moulded-on bushings 126 in which the screws cut their own thread. The window 35 is clipped into the upper shell 64 and the parts of the upper shell lying beneath its outer border areas are not visible, owing to the fact that these areas of the window are frosted. In FIG. 13 the outline of the central transparent portion of the window is marked by 34.

With regard to operation, there are few differences compared with the example of execution according to FIGS. 1 to 10, so that it is sufficient to explain only the significant deviations.

In this case the spring arms 24, 32 and 80 are combined into a stamped and bent part, positioned by means of projections 128 and fixed by crimping without the application of heat. The spring arms 79, however, are separate components which as shown in FIGS. 16 to 18 are positioned on the bottom shell by means of moulded-on projections and fixed by crimping without the application of heat. In order that this spring arm arrangement can raise up the separated picture as early as possible, the corresponding side piece 44 of the slider member has recesses 130. Secure holding of the separated picture is ensured during this phase of the changeover cycle by means of the spring arms 80, which bear the extreme edge of the picture remote from the slider member upwards like a bracket.

Figure 19:
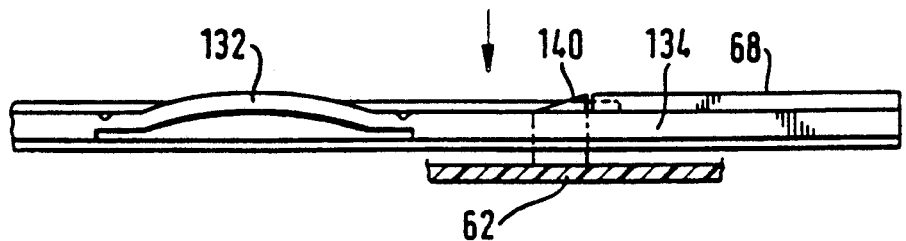
Figure 20:
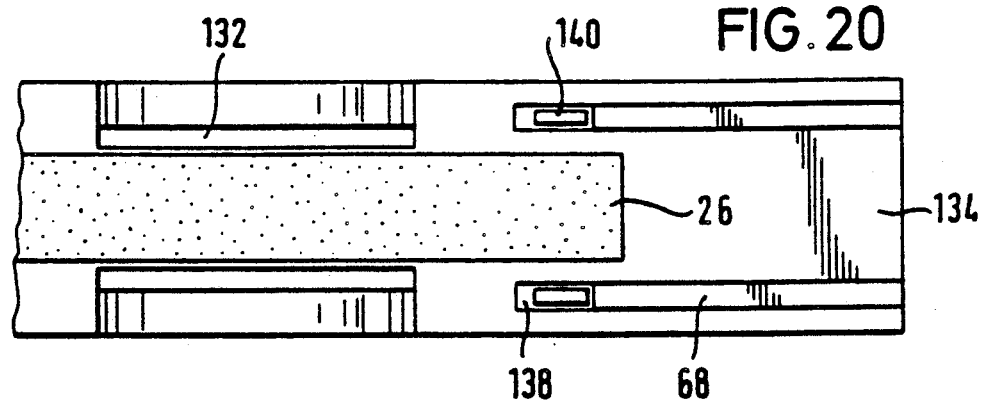
Figure 21:
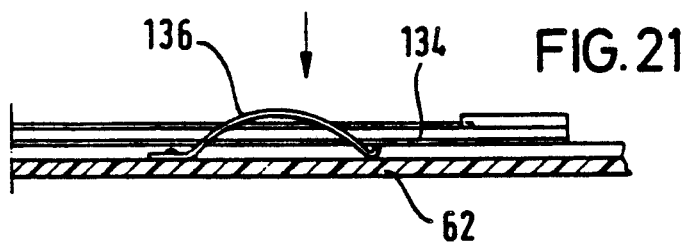
Figure 22:
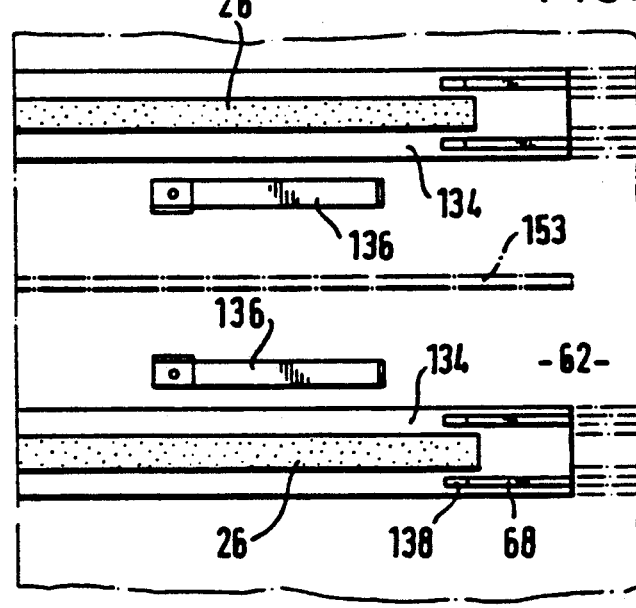

In certain circumstances, the retentive coating 26 may hold the separated picture so firmly that the force of the spring arms 79 is not sufficient to lift up the edge of the picture facing towards the slider member. FIGS. 19 and 20 show a first possibility for additionally pushing this edge away from the retentive coating: the two strips of retentive coating are each arranged on a separately produced bar 134. On each side of the strip 26, the bar has moulded-on resilient bridge portions 132 which, after the separator bar 20 has passed over them spring, out upwards and lift the edge of the picture. Alternatively, as shown in FIGS. 21 and 22, separate metal leaf springs 136 may be provided.

Figure 32:
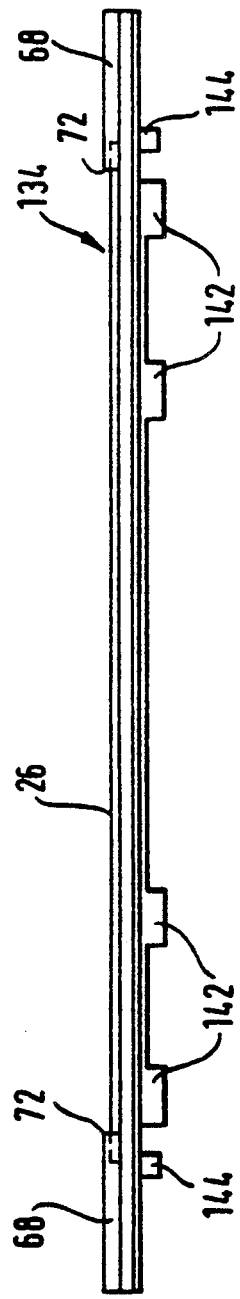
Figure 33:
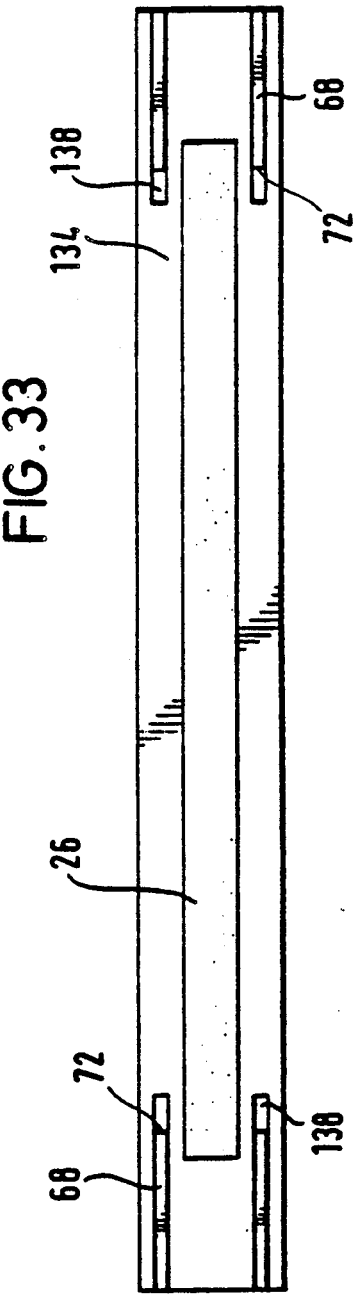

The shape of the bars 134 can be seen from FIGS. 32 and 33. It is to be appreciated that they are mirror-symmetrical in shape and therefore have lands 68 at both ends with edges 72. The reason for this is that when the bars are to be coated automatically with the retentive coating, no sorting is necessary. In addition, apertures 138 must of course be provided, through which project guide or wedge-like projections 140 for the separator bar which are moulded onto the bottom shell of the housing on the end at which it is gripped by the user. The bars are fixed in the bottom shell by pressing the lugs 142 into corresponding channels in the bottom shell of the housing, and they are accurately positioned by means of one of the two pins 144, namely by means of the pin remote from the grip part of the slider member, while the other pin has associated with it a slot in the housing.

The bars 134 at the same time form the guide for the control key 87 arranged in the plane of symmetry, the shape, arrangement and operation of which is illustrated schematically in FIGS. 23 to 25. FIG. 23 shows the operating position, that is to say, in this position of the control key 87 the normal changeover operation occurs. The control key 87 carries a projection 146 which points towards the separator bar 20 and has an incision 148, to complement which there is a double-faced projection 150 on the underside of the separator bar 20. If the control key 87 is now pressed while the slider member is held firmly, its projection 146 springs out in a downward direction until the double-faced projection 150 locks into the incision 148 (FIG. 24, left). The locking lug 152 projecting downwards from the projection 146 now blocks the separating means for the edge of the bottom picture in the pile, so that when the slider member is pulled, the hook-like members 22 slide away from the edge of this picture also when the separator bar together with the control key 87 acts on the edge of the pile nearest to it and takes the pile along with it (FIG. 24, centre). A rib 153 there prevents the disengagement of the projection 146 which runs along on the rib 153. Near the outer end position of the slider member 14, the locking lug 152 meets a recess 154 in the rib 153, while the control key guide lugs 158 run onto a stop member 156. The projection can accordingly spring out downwards when the slider member is pulled further, and thus release itself from the separator (FIG. 24, right). When the slider member 14 is pushed in again, the control key is freely movable, so that the double-faced projection easily pushes the key in front of itself, until the key has reached its end position again (FIG. 25).

With reference to FIGS. 9 to 12, two types of construction of blocking means for the change of direction were described. In the present example of execution, blocking means are also provided, but they act only in the "critical" phases of the changeover cycle.

In the bearing eye 116 of the slider member 14 there is pivotably arranged about a journal 160 a control pawl 162 which is guided by a control projection 164 along channels which are defined by guide rails 166 formed on the bottom shell 62, so that the control projection 164 has to follow the path marked by arrows in FIG. 27 during insertion and withdrawal. During the greater part of the changeover cycle the direction of movement may be reversed without hindrance, but not when the control projection 164 is in the channel section 168 during insertion, or in the channel section 170 during the withdrawal. In the first case, if it should be desired to pull the slider member out again shortly before its inner end position, the control projection would run onto the stop member 172; in the latter case if, therefore, the slider member is pushed in again shortly before reaching the outer end position, the control projection hits either the stop member 174 or the stop edge 176. It should be noted that the journal 160 is seated in the bearing eye with a degree of friction such as to allow the control pawl to follow the guide bars without any noticeable hindrance, but not to be able to swing freely.

FIGS. 28 and 29 show the shape of the co-operating parts of the separator bar and of the bars 134 with a retentive coating. In the rest position (FIG. 28), thus with the slider member 14 completely pushed in, the shoes 69 sit laterally on the bars, while the pressing rollers 28 project into a recess behind the retentive coating so that their bearings are relieved of their loading and no deformation can occur because of cold flow. At the beginning of the changeover cycle (FIG. 29), the rollers then run first onto a land 178 and are thus lifted up to the level of the surfaces lying in front of the retentive coating 26, while the shoes are on the level of the land 68. The difference in level between 68 and 178 is of operational significance, since it is matched to the thickness of the pictures; both levels are on the same injection-moulded part, so that the tolerancing is extremely good, and there is no problem regarding the running of the rollers 28 onto the edge of the picture.

FIG. 30 shows the end of the spring arm 24 with the transporter in the form of hook-like member 22. Extending on both sides of the transporter there are also projections 180 which are intended to rest against the picture from below and thus prevent the occurrence of the situation indicated by broken lines in FIG. 31, namely when a severely bowed picture fits so deeply into the hook-like member 22 that the latter can no longer slide away from the edge. This possibility must however be offered, so that the whole pile may be removed by means of the control key 87.

FIGS. 34 to 57 show the method of operation of the feeding means, and alternative forms and details thereof.

Figure 34:
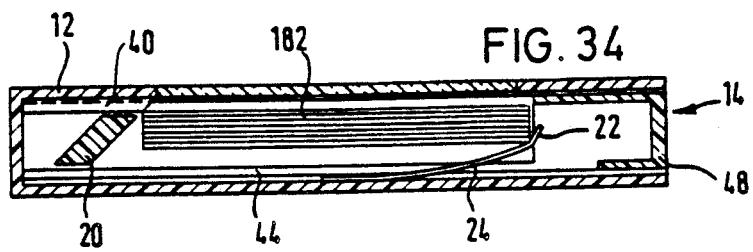
FIGS. 34 to 41 illustrate in longitudinal section a schematic view of the sequence of operation of the feed, wherein FIGS. 37, 39 and 41 each show an enlarged cut-out portion of the neighbouring Figure.
Figure 41:
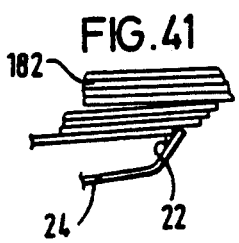

FIGS. 34 and 41 firstly illustrate the principle. In FIG. 34 the first frame part can be seen in the form of the substantially rectangular housing 12 in which the slider member 14 is arranged to slide as the second frame part. The separating means is indicated only symbolically as a separator bar 20. The pile of sheets of like format is indicated by 182.

The slider member 14 comprises a grip part 48, against which rests the front edge of the pile, seen in the direction of movement, and also the two longitudinal side pieces 44 near the separator bar. Between the longitudinal side pieces the members of the feeding means project upwards from the base of the housing 12. The two leaf springs 24 are fixed by one end to the housing; the other end has the inclined face 22 resting against the edge of the pile (see also FIGS. 37, 41). The inclined face is accordingly structurally combined with the bias spring in the springs 24.

Figure 35:
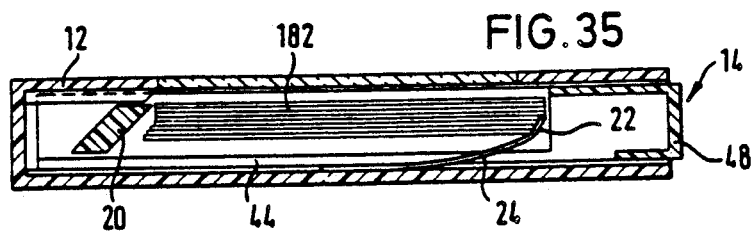
Figure 36:
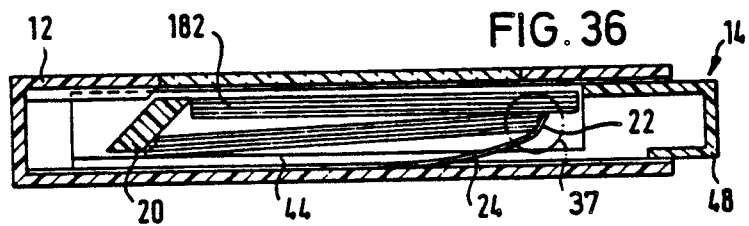
Figure 37:
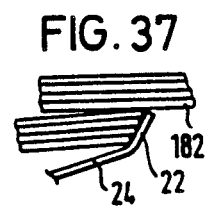
Figure 38:
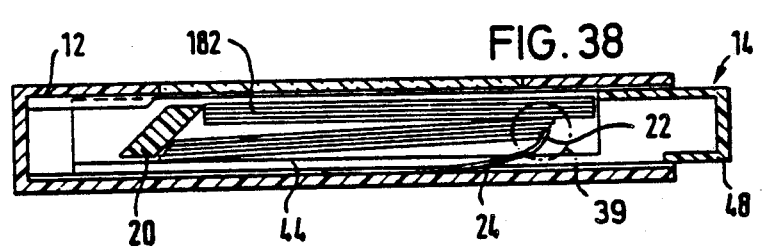
Figure 39:
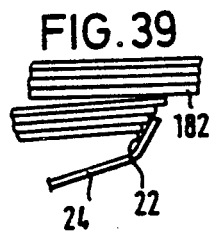
Figure 40:
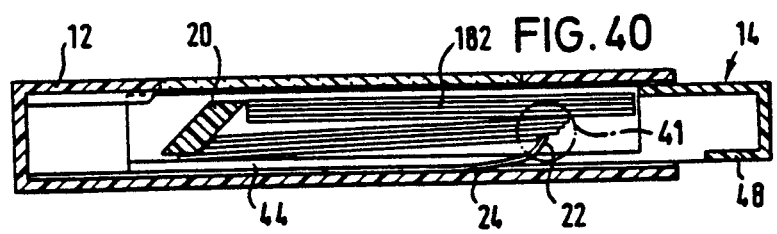

If the slider member is now pulled out of the housing, as shown in FIGS. 34 to 41 for the start of the changeover cycle, the inclined face 22, which in the rest state according to FIG. 34 still projects in the region of the grip part 48, then comes to rest against the edge of the pile (FIG. 35). When the slider member is pulled further out of the housing, the topmost sheets in the pile, which are therefore shown as a block, go along with the slider member, while the sheets lying within the field of action of the inclined face are held back until the separator bar 20 meets their opposite edge (FIG. 36).

Pressure is now exerted on the sheets from both edges inwards, on the one hand from the separator bar, and on the other hand from the inclined face of the feeding means. The inclined face can however yield downwards as a result of the resiliency of the springs 24, so that the inclined face slides away on the edges of the sheets lying above the lowest sheet, one edge after the other. On the other hand, only a substantially lower retaining force, or none at all, acts on the lowest sheet from the separator bar, so that with the inclined position of the inclined face 22 and the bias of the springs 24 correctly matched, the force applied by the component of the spring bias which acts in the longitudinal direction of the sheets is sufficient to push the lowest sheet through beneath the separator bar. The adhesive force acting between adjacent sheets, which is an important consideration in the design of the system, is also overcome here.

FIGS. 42 to 46 show in an extensively schematicised view a form of execution in which the feeding means not only assumes that function but in addition also brings the sheet separated from the remainder of the pile into contact with the first frame part, and therefore represents a component of the retaining means.

The frame parts 12 and 14 correspond to a great extent to the construction according to FIGS. 34 to 41. The difference is that on the side of the separator bar 20 facing towards the floor of the housing apertures 184 are provided which allow the passage of a tab 22 moulded on the free end of the leaf springs 24. The tab has the inclined face on the side facing towards the pile, while the spring sections on both sides of it provide for symmetrical supporting. The springs 24 have a backward-facing second free end 186 with a rounded end, and the two lateral auxiliary springs 79 are provided on the floor of the slider member, but beneath the side pieces of the slider member.

This form of execution operates in the following manner:

When the slider member is pulled out, the lowest sheet is presented to the separator bar 20 in just the same way as in the case of the form of execution according to FIGS. 34 to 41. At the same time the spring ends 186 are pressed downwards by the separator bar. After the separator bar has passed over them, they can release themselves from tension and thereby lift up by its rear edge the sheet pushed through under the separator bar. This sheet is indicated by 188. The withdrawal travel of the slider member is so calculated that the spring ends near the tab 22 are still held pressed down by the separator bar while the side pieces release the auxiliary springs 79, so that the latter can also lift up the front edge of the sheet, since this has been carried along by the tab 22 to a position in front of the separator bar (cf. FIG. 46); this edge can therein be lifted up between the side pieces of the slider member and, when the slider member is pushed back, can slide away over the separator bar, with the other edge of the sheet supporting itself against the stop bar 52.

FIGS. 47 to 52 represent a further alternative form.

The transporter from FIG. 48 corresponds to the form of execution according to FIG. 43 with regard to the method of operation, but manufacture from spring steel is made possible, since sharp angling has been avoided. Here again, the inclined face of the feeding means at the same time forms part of the retaining means for the separated sheet. In this case the end of the leaf-spring 24 with the inclined faces is pressed down at the end of the withdrawal travel not by the separator bar but by spring-depresser members 75 which are moulded on the side pieces 44 of the slider member and spring inwards from the side, and which run onto the areas 76 of the leaf springs. On the other free ends of the leaf springs, laterally extending projections 200 are provided onto which a small auxiliary spring-depresser member 202 fitted further inside runs just when the lowest sheet is presented, so that the braking force acting on the latter when it is pushed through is reduced.

In the floor of the housing a recess 204 is provided in which a control key 87 can slide for a short distance. The control key carries a fork-like stamped part 206, only one half of which is shown in FIG. 49. In the rest position, as shown, this member has no function. But if the stamped part is displaced to the right in FIGS. 47, 49 and 50 by means of the control key, the free end of the leaf spring is bridged over the integral inclined surface 22, so that feeding to the separator 20 no longer takes place when the slider member is pulled, and the separator bar now transports all the sheets outwards.

In the examples of execution just described it should be noted that the leaf springs 24 not only perform the functions described, but in addition also act as a pressing arrangement by which, if the sheets are for example photographic prints, the topmost photograph in the pile is pressed against a viewing pane provided in the housing.

In FIGS. 47 to 52 there can also be seen projections 208 which are moulded onto the floor of the housing and to a certain extent lie as a protective barrier in front of the free ends of the leaf springs 24 with the bent portions 22, so that when a pile of sheets is changed, one or more sheets cannot be pushed under these bent portions accidentally.

FIGS. 53 and 54 show diagrammatically that the arrangement according to the invention can also work according to the principle of operational reversal in such a way that the inclined face 22 is for example integrally-moulded rigidly onto the first frame part—which in this case is in the form of a housing—while the spring bias is produced by means of a leaf spring 24 fastened to the opposite wall 210. FIG. 53 shows the rest state and FIG. 54 the start of the withdrawal travel of the other frame part in the form of a slider member, the individual sheet 188 being already separated.

Finally, it should be noted that in the forms of execution described there is an interaction between the bias of the leaf springs which increases with the thickness of the pile and the angle of inclination of the inclined face which alters as well, in such a way that, seen from the separating means, substantially the same conditions obtain independently of the thickness of the pile, that is to say, the retaining force acting on the lowest sheet is substantially independent of the number of sheets in the pile.

The possibility also exists of already preparing the next change while the two frame parts are being pushed together in that the transporter, moved by way of a mechanism, executes an advance movement and thereby already conveys the next sheet to be separated to the separating means, while the preceding one is still returning to the other end of the pile.

FIGS. 55, 56 and 57 finally show further arrangements of the apparatus according to the invention.

In FIG. 55 the transporter 22 comprises a compressible layer 212 on a carrier plate 214 which is connected by means of links 216 to the floor 218 of one of the frame parts. A coiled torsion spring 24 with projecting ends presses the transporter against the rear edge of the sheet 188 which is to be separated.

According to FIG. 56, the transporter 22 is in the form of a plate 220 which engages with an upwardly projecting edge 222 behind the rear edge of the sheet 188 which is to be separated. The bias arrangement comprises a helical tension spring 24 which is anchored to a fixed point and engages with a parallelogram linkage mechanism 224 to which the transporter plate is linked. In this way the transporter is held independently of the thickness of the pile parallel to its principal plane.

According to FIG. 57, the transporter 22 is a projection 226, protruding from a leaf spring 24 which extends transversely to the direction of movement of the sheet being separated 188 symbolised by means of the arrow 228; here again, the transporter is substantially always in the same working position with respect to the edge of the sheet, independently of the number of sheets in the pile.

FIGS. 58 to 62 illustrate the measures which may be taken in order to guarantee feeding even where the pile contains sheets with considerable differences in dimensions in the direction of the changeover movement.

Figure 58:
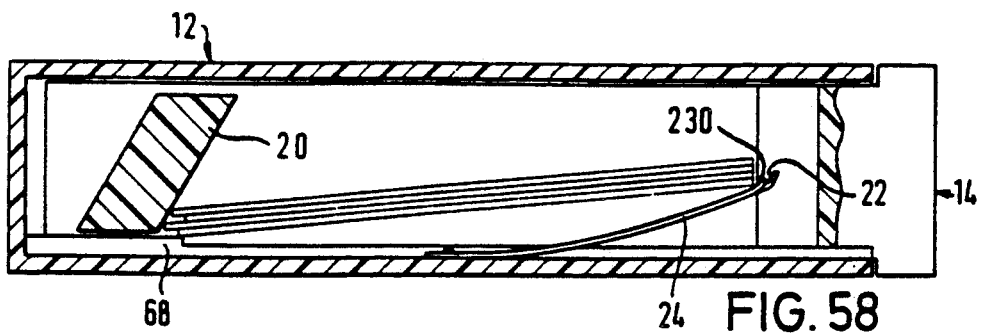
Figure 60:
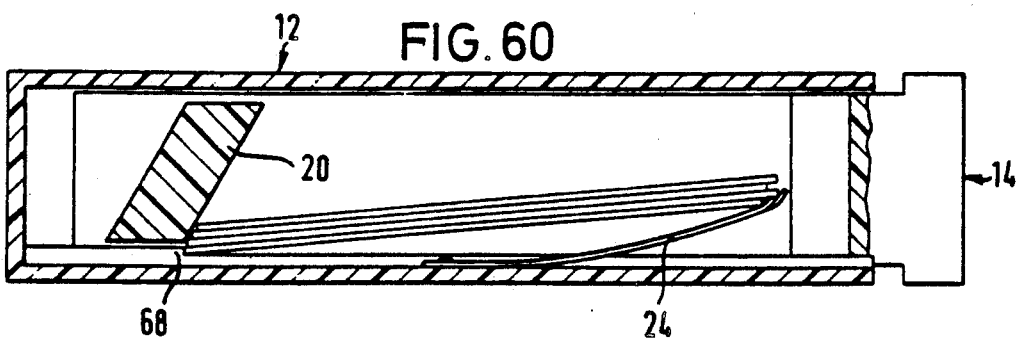
Figure 59:
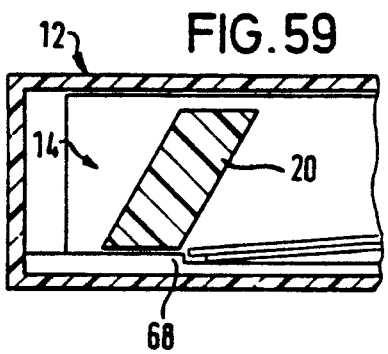
Figure 61:
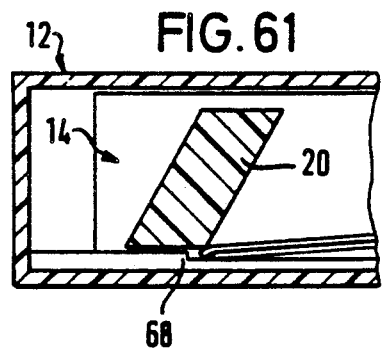
Figure 62:
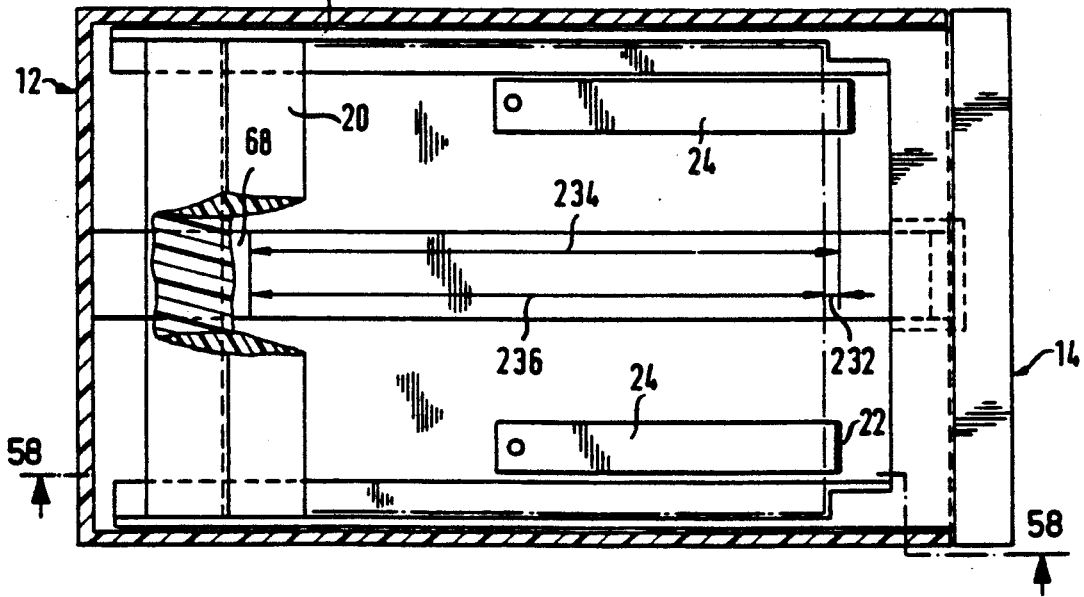

FIG. 58 shows in longitudinal section the situation after a changeover cycle. A stop member provided on the slider member 14 has aligned the edges of the sheets remote from the separator 20 so that their ends projecting to different extents out of the pile—or standing back in the latter—form the configuration indicated in FIG. 58. The case of a longer sheet lying over a shorter sheet is shown separately again in FIG. 59, and FIG. 61 illustrates schematically what could happen if provision was not made for compensation: the second lowest sheet places itself with its free projecting edge over the end edge of the lowest sheet, and when the separator bar 20 runs on, the situation shown in FIG. 61 occurs, in which the changeover operation is disturbed (double sheet changeover). In order to prevent this, means are provided in order first of all to align the edges of the sheets somewhat on the side of the pile facing towards the separator bar. For this purpose there is firstly provided an "idle movement" of the separator bar 20 until it runs over the land 68. During this movement, therefore, no separation occurs. Nevertheless, the extreme edges of the sheets remote from the separator bar are already supported by a first contact face 230 during this idle movement travel. Sheets which are oversize are pressed back by the separator bar and spring away from the contact face 230; sheets which are undersize still remain on the first contact face. The sheets which have sprung away from the latter, however, are apprehended by a second contact face 22 which is provided at a distance 232 behind the first which corresponds to the maximum permissible difference in lengths of the sheets. In FIG. 62 the shortest sheet is symbolised by the arrow 234, and the longest by the arrow 236. When the separator bar has passed through its idle movement, the shorter sheets are therefore supported by the first contact face and the longer sheets by the second contact face, so that approximately the situation shown in FIG. 60 is produced in the region of the edges of the sheets facing towards the separator bar. It is sufficient here for the length compensation to be only approximate, so that the sheets are no longer flexible enough to allow the situation in FIG. 61 to occur.

In the examples of execution according to FIGS. 1 to 10 and 13 to 33, the separating means are in principle similar to one another. But within the framework of the invention other types of construction of separating means may also be provided as long as it is ensured that they comprise a first and a second separating member which, biased resiliently towards each other, define a through gap which for the entry of the sheet being separated has an inside width greater than the thickness of one sheet and less than the thickness of two sheets. During the changeover cycle this inside width is either maintained or is reduced to the thickness of the sheet being separated in each case. In the examples of execution according to FIGS. 1 to 10, and 13 to 33, one separating member is formed by the lands 68 and the other by the shoes 69, which are biased by means of the spring 71.

FIGS. 63 to 78 show alternative separating means.

It is common to all the embodiments shown here that the through gap for the entry of the sheet being separated is fixed by means of a mechanical stop member to the defined value of the passage spacing. During the further course of the changeover cycle, the passage spacing may either be also maintained by means of a system of stop members, or the gap may close resiliently over the separated sheet, so that the latter itself defines the passage spacing.

FIG. 63 shows a photograph changer in a schematic longitudinal sectional view, and FIG. 64 is a corresponding partial transverse section. The first frame part is in the form of a housing 12 on which a first, stationary separating member is moulded in the form of a rib 238 which is located on the floor 218 of the housing. The second separating member is formed by a separator bar 20 which is moulded on a slider member 14 displaceable relative to the housing and forming the second frame part. The slider member 14 is pressed in the direction of the floor of the housing, and thus in the direction of the ribs 238, over its entire withdrawal travel distance by a system of leaf springs 240 which is mounted in the housing.

When the slider member is completely pushed in, however, the separator bar meets a land 68 which is higher by a good photograph-thickness than the rib 238 with which the spacing of the gap is defined. After the edge 72 of the land 68 has been passed, the springs 240 press the separator bar 20 as far as the surface of the separated sheet 188 which faces towards it. In FIG. 64 can also be seen the side pieces 44 of the slider member, between which the separator bar extends and on which it is integrally formed.

The embodiment according to FIG. 65 (longitudinal section) and FIG. 66 (partial transverse section) differs from that described previously in that not the whole slider member 14 but only a part 242 of the separator bar 20 is pressed in the direction of the floor of the housing 218 by a spring arrangement 71 housed in the separator bar itself, while the slider member is supported in this direction. The operation is otherwise the same.

Figure 68:
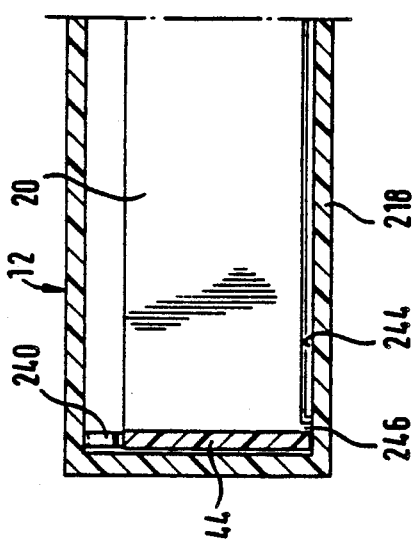
Figure 70:
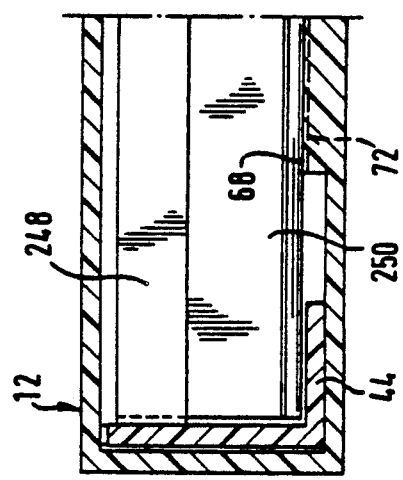
Figure 67:
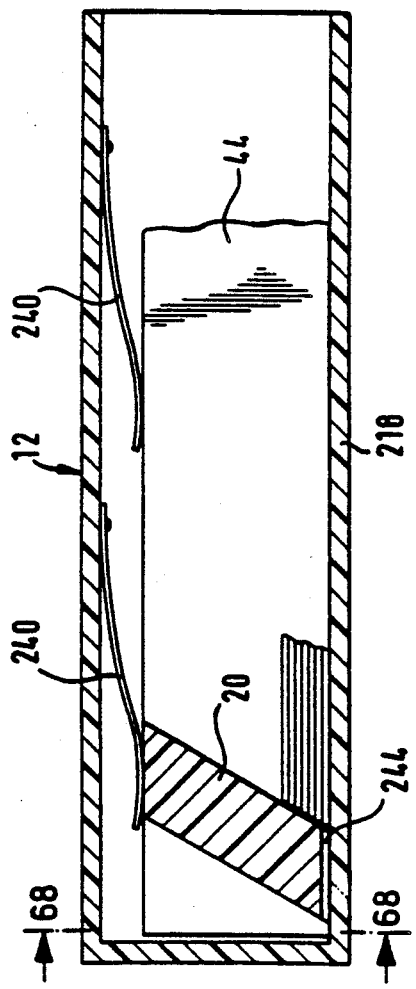

The embodiment according to FIG. 67 (longitudinal section) and FIG. 68 (transverse section) differs from that according to FIGS. 63 and 64 in that although in this case the slider member is in fact pressed by the system of leaf springs 240 in the direction of the floor of the housing 218, no land is provided on the housing; instead there are moulded onto the separator bar 20, on both sides of the gap 244 for the passage of the sheets, shoes 246 which are supported on the floor 218 of the housing and thus constantly keep the spacing of the gap at the desired value.

Figure 69:
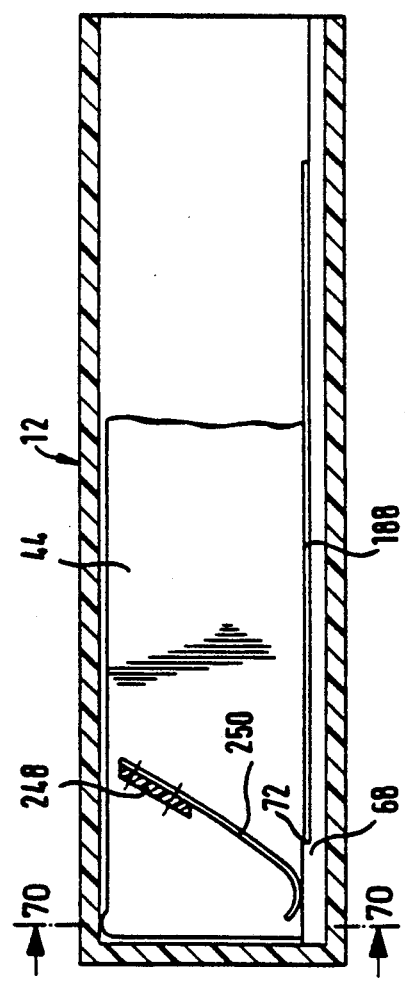

The embodiment according to FIGS. 69 (longitudinal section) and 70 (partial transverse section) is a modification of the embodiment in FIGS. 65 and 66. Between the side pieces 44 of the slider member a fixing device 248 is provided which holds a stationary end of a resilient leaf spring 250 clamped in by its wide side. The rounded end of the leaf spring touches the land 68 and, after the edge 72 of the latter has been passed, moves onto the separated sheet 188.

The embodiment according to FIG. 71 (longitudinal section) and FIG. 72 (partial transverse section) also has a separating member which can be resiliently deflected relative to the slider member 14 and is in the form of a separator bar 20 which is pivotable about a shaft 252 in the side pieces 44 of the slider member, but is held by means of a spring arrangement 240 with its edge 254 resting against the part situated opposite, that is to say, firstly on the land 68 and then, after its edge 72 has been passed, on the separated sheet 188.

The embodiment according to FIG. 73 (longitudinal section) and FIG. 74 (partial transverse section) comprises as the first frame part a housing 12, and as the second frame part a slider member 14. Between the side pieces 44 of the slider member a foot plate 256 is inserted which forms a first separating member. The second separating member is a separator bar 20 which is biased relative to the slider member in the direction of the floor 218 of the housing by a spring arrangement 240, is guided on rails 258, and has stop shoes 246 on its lower end on both sides of the sheet which is to be separated.

FIGS. 75 (longitudinal section) and 76 (partial transverse section) show an embodiment in which the first frame part is formed by a slider member 14 which can slide backwards and forwards relative to a housing 12 as the second frame part. It is to be understood that here again, as with all other embodiments, the maximum travel of the slider member is limited by means of stop members, which are not however shown, for the sake of clarity. Formed in one piece with the housing 12 as the first separating member there is a separator bar 20 opposite which a second separating member is provided in the form of a plate 264 with an articulated mounting (link 260) which plate is pressed by a spring 240 against lateral support projections 262 of the separator bar. The plate 264 can therefore absorb manufacturing tolerances, while the gap height is fixed by means of the height of the projections 262, which is practically invariable.

FIGS. 77 (longitudinal section) and 78 (partial transverse section) show an embodiment in which the housing 12 forms the second frame part and a slider member (not shown) forms the first frame part. A separator bar 20 is guided on the housing so that it can slide transversely with respect to the principal plane of the pile and is biased by means of a spring arrangement 240. With its support projections 262 it defines the gap height, which is defined on the other side by means of the top wall 266 of the housing.

In the examples of execution according to FIGS. 1 to 10 and 13 to 33, retaining means are provided which are similar to one another and are based on the same principle, and by means of which the separated sheet is held on the first frame part. In conjunction with the feeding means according to the present invention, however, retaining means of different form may be used which are illustrated in FIGS. 79 to 96 and explained below.

FIG. 79 is a partial longitudinal section, FIG. 80 is a horizontal section, and FIG. 81 is a transverse section through the corresponding planes of the device.

The first frame part is in the form of a housing 12, and the second is in the form of a slider member 14. The separating means in the form of the separator 20 bridges the side pieces 44 of the slider member transversely. In the rest state, shown in FIG. 80, the separator presses on the wing-like actuators 268 of two links 270 which are pivotable about axes extending parallel to the withdrawal direction and indicated by 272. On the ends of the axes remote from the wing-like actuators 268 there are arms 274 which point towards each other. The links are biased by means of a leaf spring 276 in such a way that the arms 274 tend to pivot in the direction of the inserted pile of sheets.

When the slider member has travelled over a distance which is sufficient to push the individual picture through under the through gap of the separator by means of the transporter (not shown), the separator gradually releases the wing-like actuators 268 and the arms 274 come to rest from below against what is now the bottom sheet of the remainder of the pile and behind the edge of the sheet which has remained behind in the housing, so that the latter reliably remains behind in the housing while the separator transports the remainder of the pile out of the housing. The bias of the springs lifting the arms 274 may be so great that their free ends not only rest against the remainder of the pile but also raise the latter a little; thus the individual sheet cannot slide away from the arms. When the slider member is in the end position, the separator can just press the arms 274 downwards against the spring force, since it has a correspondingly inclined shape and acts like a wedge or cam. During the return travel, the remainder of the pile returns with the separator and the slider member and comes to rest on the arms. Only when the separator slides onto the wings are the arms moved over into the initial position again.

FIGS. 82 and 84 show in a longitudinal sectional view the rest state and the partially withdrawn state of an apparatus according to the invention in which the first frame part is formed by a housing 12 and the second by a slider member 14. A spring arrangement 24/32 and the separator bar 20 as separating means can be seen.

At the start of the withdrawal travel of the slider member, the feeding means guides the lowest sheet 188 in the housing through beneath the separator bar, behind which a pivotable jaw member 278 is arranged to rotate about a pivot 289. A spring 282 biases the jaw member 278 into the position shown in FIG. 84, as can be seen from the enlarged view according to FIG. 83. The separator bar, with the slider member pushed in, has moved the jaw member into the inactive position as a result of a camming effect when running on. The jaw member may be released automatically on withdrawal, but this is not shown in detail.

FIGS. 85, 86 and 87 show in a schematicised longitudinal section three phases of the withdrawal travel in another embodiment. The feeding of the sheet to be separated is effected by means of the transporter, namely the hook-like member 22, which is arranged on the spring arm 24. Housing, slider member and separator bar correspond to the embodiments described previously. The slider member 14 acting as the second frame part, after a certain withdrawal distance, couples itself to a member 284 which is arranged so that it can move longitudinally in the housing 12 forming the first frame part. A recess 286 is provided in the member 284 beneath a guide face 288.

As soon as the transporter, as a result of a first stroke of the slider member, has pushed the leading edge of the sheet 188 being separated through beneath the separator 20, the slider member, now coupled to the member 284, also begins to carry the latter along with it in the withdrawal direction with the result that this edge of the separated sheet goes into the recess 286 and is there firmly clamped by the arm 32 of the spring arrangement. This spring arm forms a jaw member of a pincer-like arrangement, and the edge surface of the recess situated on the other side of the clamped edge of the sheet forms the other jaw member of the pincer-like arrangement. This state persists until the rear edge of the separated sheet is freed from the separator. If the slider member is now pushed in again, it takes the member 284 back inwards with it into the housing, and the recess leaves the withdrawn sheet, so that the free arm 32 of the spring arrangement allows the edge of the sheet supported by it to slide smoothly upwards along the guide face 288.

FIG. 88 shows in an extensively schematicised partial longitudinal sectional view an embodiment in which the separator bar 20 mounted on the slider member 14, as a result of the slider member being pulled out of the housing 12, gradually releases the leaf spring 32 mounted on the latter, so that its free end, provided with a retentive coating 290, comes to rest against the edge 292 of the sheet and presses the latter against the top wall 266 of the housing, which then forms the other jaw member in conjunction with the first jaw member formed by the spring.

The pincer-like arrangements described are only some of a multiplicity of possible embodiments; thus, instead of gripping the leading edge of the sheet it would also be possible to engage on one or both sides with similar pincer-like arrangements, or the width and not the thickness of the sheet could be held between the jaw members.

Figure 89:
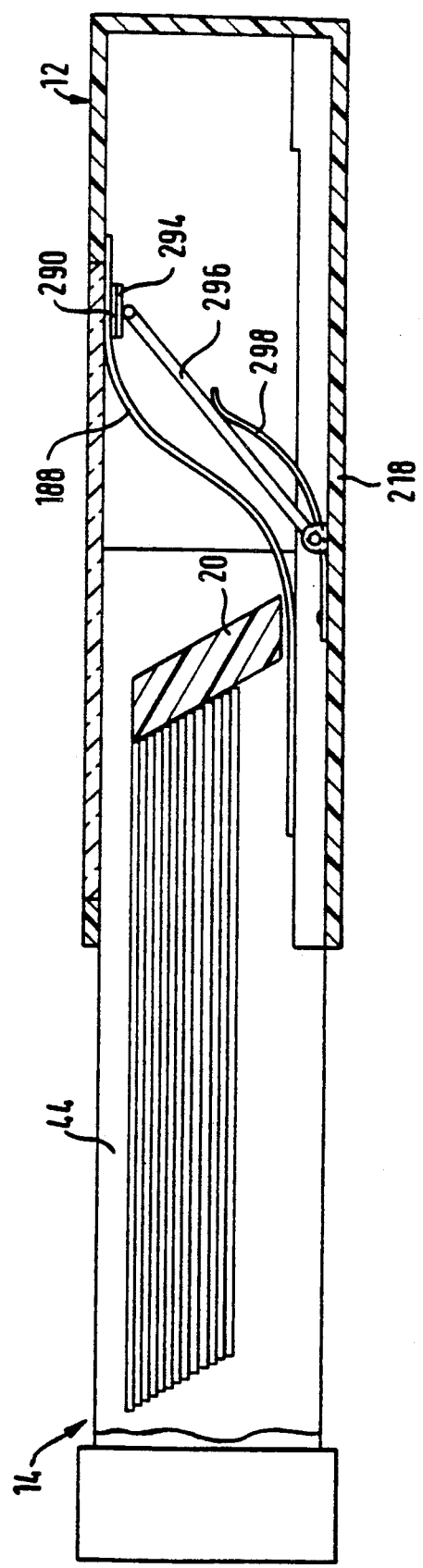

FIG. 89 shows a modification of the pincer-like arrangement according to FIG. 88: the retentive coating 290 is on a pressing arrangement, consisting of a plate 294 which carries the retentive coating and is articulated on the end of a link 296. The link is connected to the floor 218 of the housing. A spring 298 presses the retentive coating against the separated picture.

FIGS. 90 to 92 relate to another type of retaining means for the picture which is to be separated.

FIG. 90 shows in a schematicised longitudinal sectional view a device according to the invention, FIG. 91 is a partial transverse section corresponding to this Figure, and FIG. 92 shows a partial horizontal section.

While in the complete example of execution described in detail under FIGS. 1 to 10 the retaining means comprised a first clamping member in the form of a roller running with the separator bar, a second clamping member in the form of the retentive coating attached so that it was stationary on the first frame part (housing), and a spring arrangement in the form of the spring pressing the shoe against the retentive coating, in this case the clamping members are so constructed in operational reversal that the retentive coating is provided on the periphery of a roller 300 which by way of a toothed rack 302 and a pinion 304 connected to the roller is driven so as to rotate when the slider member 14 which forms the second frame part is withdrawn. The roller has a diameter equal to the effective circle of the pinion, so that it rolls on the individual sheet at a peripheral speed which is equal to the withdrawal speed of the slider member. The individual sheet is therein pressed against the floor 218 of the first frame part in the form of the housing 12 and is held firmly in the latter.

The device according to FIGS. 93 to 95 shows a further embodiment of the retaining means according to the invention. The individual sheet 188 arrives behind the separator bar 20 in the working gap between two rollers 300, 306, at least one of which is driven in the same manner as that described in FIGS. 90 to 92. The other roller may also be driven directly by the first, or driven along by means of friction. The pressing force is produced by the fact that one of the rollers, preferably the one which is not driven, is of resiliently compressible construction, and its shaft is placed somewhat nearer to the other roller than would actually correspond to the diameter. The cross-section through such a resilient roller is shown in FIG. 95, and it can be seen that blind recesses extend round the hub in a meandering arrangement so that there is always sufficient springiness available.

The second roller 306 accordingly assumes in this case the role of the clamping member which is arranged like a rail in the first frame part in FIGS. 1 to 10 and 13 to 33, for which purpose the roller is rotatably mounted not on the first but on the second frame part holding the pile.

Figure 96:
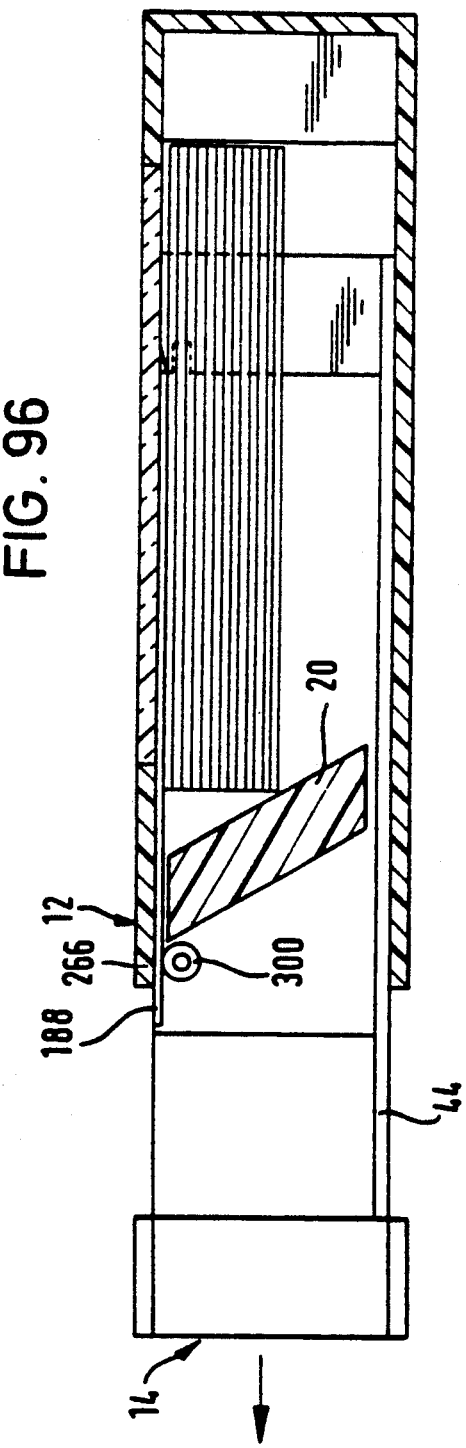

FIG. 96 shows a roller 300 which is rotatably mounted in the housing 12, forming the second frame part in this case, which roller is driven by way of a toothed rack (not shown), mounted in the side pieces 44 of the slider member, and a pinion (not shown) connected to the roller, the drive being at a peripheral speed which is equal to the withdrawal speed of the slider member. In this way, the separated picture 188 is apprehended behind the separator bar 20, pressed against the top wall 266 of the housing, along which it slides, and released in the outer end position of the slider member. It is to be understood that as feeding means one of the arrangements shown in FIGS. 1 to 57 is provided in each case, without this being also illustrated each time.

Just as the separating means and the retaining means may be constructed in a very different manner in order to co-operate with the feeding means according to the invention, the guide means may also deviate from the arrangement according to FIGS. 1 to 10 and 13 to 33. This is made clear below with reference to FIGS. 97 to 113.

In the examples of execution described previously, the guide means was only marginally discussed with regard to its various aspects. But for photographic prints it also causes certain complications. Since in certain circumstances the separated sheet may be fairly severely bowed, it has proved to be expedient, or even unavoidable, to observe certain precautionary measures when designing the guide means. Thus the separated photograph must again be guided to the other end of the pile through a through gap of the separating means, even if this through gap is much less critical then the separating gap. In principle, all constructions which can be used for feeding may also be adapted for the return of the individual sheet. In general, however, it is sufficient to push the photograph out by its rear edge, it being also held firmly if required. Some embodiments are briefly described below.

With regard to the return through gap mentioned, care should be taken to ensure that the remainder of the pile does not block this through gap; this risk is present especially with piles of severely bowed photographic prints. It was explained above with reference to FIGS. 1 to 8 that for this purpose holding-down projections may be provided on the first frame part. In their place, however, there may also be provided on the first or second frame part a member which acts through the return gap and which is withdrawn again after the changeover cycle has ended.

In addition, provision should also be made for the return gap to be blocked at the start of the changeover cycle, so that a sheet is not withdrawn from both ends of the pile. It was explained above with reference to FIGS. 1 to 8, that comb-like projections engaging with one another (the projections being on the separator bar on the one hand, and on the first frame part on the other hand) may be used for this purpose; in their place, however, a controlled blocking means projecting out from the separator bar may also be provided for example.

Figure 97:
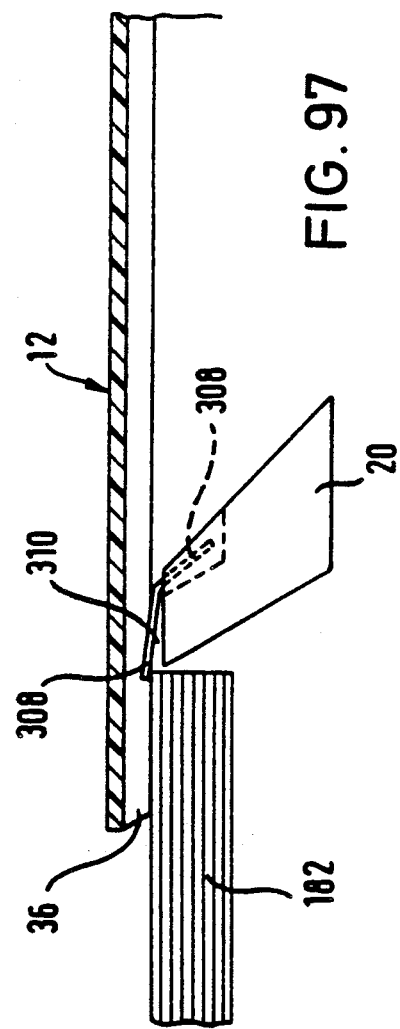

FIG. 97 shows in a schematicised longitudinal sectional view a type of construction which both holds down the remainder of the pile for the insertion of the separated sheet and also blocks the return gap during the start of the changeover cycle: In the separator bar 20 provided as separating means, a thin, resilient plate-like part 308 is arranged which engages, between holding-down members 36, on a top wall of the first frame part. The free end of the plate-like part at the same time presses on the sheet of the remainder of the pile 182 which faces towards it. The plate is supported in the second frame part so that it is displaceable for a short distance in the direction of movement of the frames, so that at the start of the next changeover cycle it can deflect towards the left (in FIG. 97), but at the same time still blocks the gap 310 so that the sheet returned last is pressed onto the remainder of the pile by the holding-down member before the plate-like part is moved in again.

FIG. 98 shows in a schematicised sectional view the preferred means: the spring 32 holds the rear edge of the sheet in front of the slider member stop member 52, the spring 80 supports the sheet approximately centrally, and behind the separator bar 20 the remainder of the pile 182 is held on a level according to the arrow 312, by the holding-down members 81 acting on it. The arrow 314 defines the level of that edge of the separator bar over which the individual sheet passes and which is in an inter-engaging engagement with the holding-down members.

FIG. 99 shows in a schematic partial sectional side view a construction which serves to prevent a sheet also arriving incorrectly in the gap during the separating phase of the changeover cycle at the through gap for the return of the sheet. In this case, this requires the ribs 40, which engage (somewhat like the teeth of a comb) in recesses in the separator bar 20.

Alternatively, in FIG. 100 blocking members 316 moving out of the separator bar are shown which free the through gap (either by spring action as the result of running on an actuating means or by positive displacement) only when a sheet edge is present in the return phase (this may be thought of as a "non-return valve principle").

The following Figures relate to means to ensure the sheet returns itself. As mentioned, the individual sheet is preferably pushed through the gap with its rear edge resting against a stop member. When the sheet is bowed round a radius of curvature which is approximately perpendicular to the direction of movement, there is a risk that the sheet will not be pushed through the gap but will be squashed up and/or will slide away from the stop member.

In principle, therefore, in the case of the guide means such means are provided which hold the individual sheet as securely as possible in front of the "pushing" stop member, and/or means which compensate for or reduce any bowing of the photographs.

Figure 101:
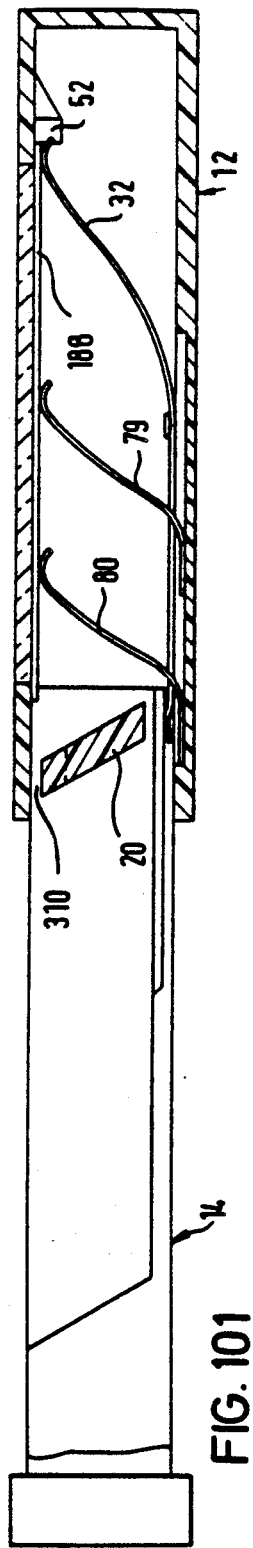

FIG. 101 shows these means just in principle in a schematicised longitudinal section: a first leaf spring 32 holds the individual sheet 188 in front of the "pushing" stop member 52, and further leaf springs 79, 80 press the sheet as flat as possible against the top wall of the housing 12 (first frame part), in order to present the leading edge of the individual sheet fairly accurately in front of the through gap 310. Reliability will be so much the greater, the longer the leaf springs engage with the individual sheet during the sheet return, before these springs are passed over by the separator bar 20 of the separating means. The side of the separator bar which faces towards the individual sheet 188 is preferably inclined in such a way that a leading edge of the individual sheet which is bowed downwards in front of it can "climb up" along the incline as a result of the camming effect of the latter. But if this sheet edge is forcibly presented to the return gap by other means, the corresponding surface of the separator bar may also be constructed to run perpendicular to the plane of the sheet.

Figure 102:
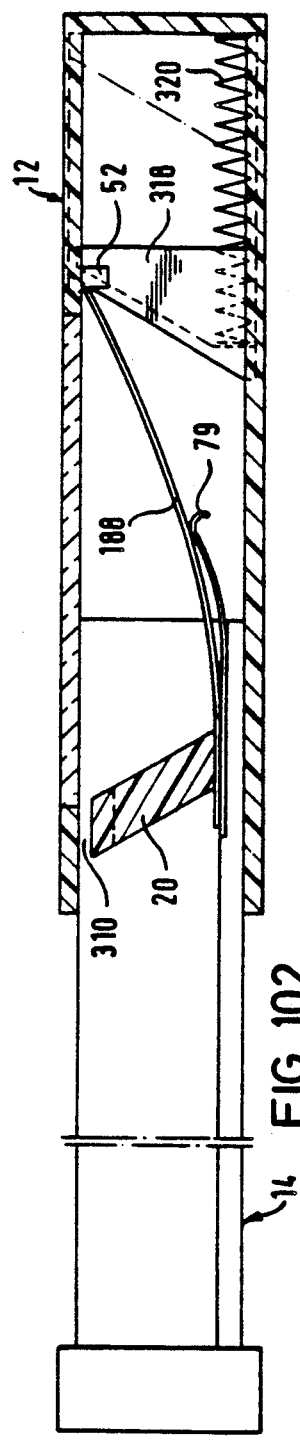
Figure 103:
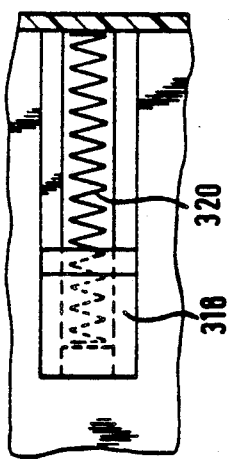
Figure 104:
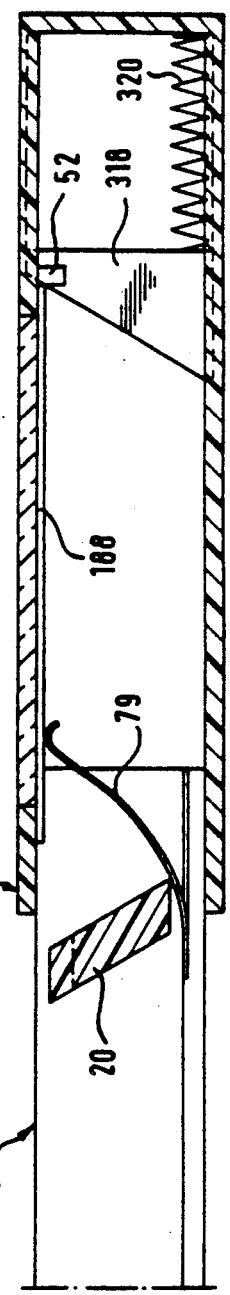

Instead of the leaf spring 32, other means may be used in order to displace the edge of the individual sheet remote from the separator bar against the other housing edge. This is shown in FIG. 102: a guide member 318 has been pushed by a spring 320 beneath this edge of the sheet 188 and has raised it up in front of the pushing stop member 52, still during the first half of the changeover cycle. The other sheet edge is then, after the separator bar 20 has passed, lifted up by a leaf spring 79 in front of the return gap 310. Towards the end of the second phase of the changeover cycle, the separator bar then pushes the guide member 318 back. Instead of the spring 320, the guide member 318 could also, by means of coupling to the second frame part, but with a "phase shift", be moved to and fro by the latter. Instead of the movable guide member, inclined wing-like guide members which are capable of being pivoted in and out could be provided, without any change in the operating principle. FIG. 103 shows schematically a plan view of the guide member 318, and FIG. 104 represents the situation at the point of reversal of the changeover cycle.

Figure 105:
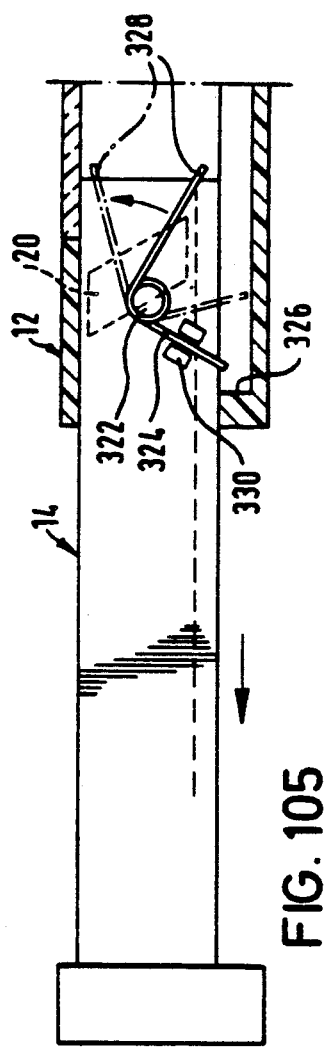

FIG. 105 shows a schematic side view of a mechanism which can be used instead of the lifting spring 79. A wire spring 324 is pivotable with its eye about a pin 322. One of its arms is angled and engages from outside transversely beneath the edge in question of the individual sheet, and the other arm can be moved over by engaging a stop member 326, carries the angled arm 328 along with it, and thus causes the edge of the sheet to be lifted. A limits-defining device 330 is indicated, in order to eliminate uncontrolled movements of the mechanism; the latter is indeed only to be switched over in the two end positions (rest position/point of reversal).

Figure 106:
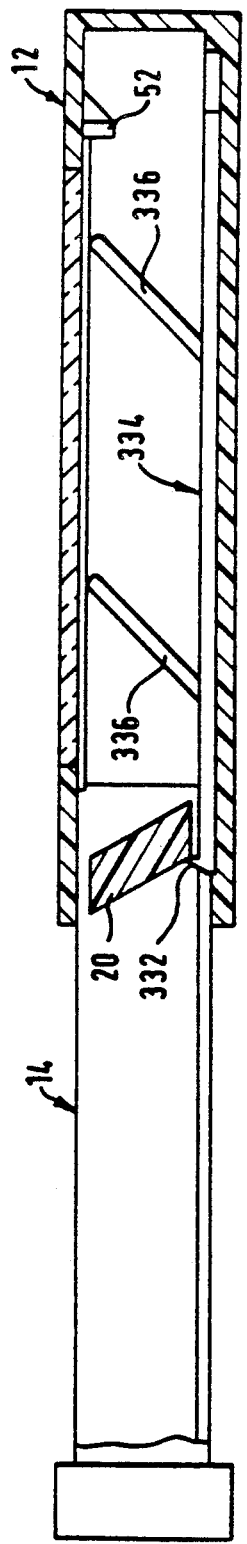
Figure 107:
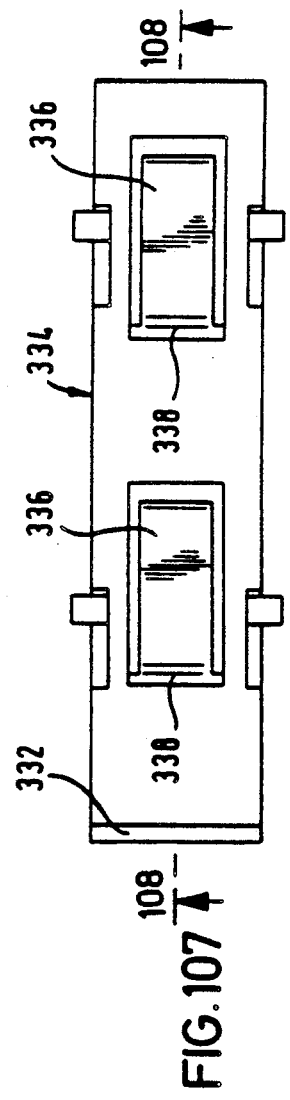
Figure 108:
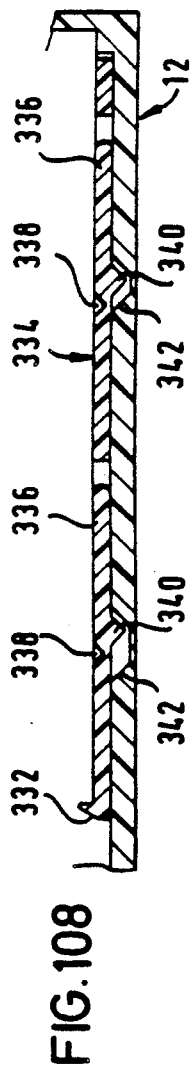

FIGS. 106 to 108 show an alternative form of the lever arrangement as guide means. The separator bar 20, shortly before its reversal position, meets a hook-like transporter 332 of a lever member carrier 334 to which two lever-like members 336 are linked by means of moulded-on pivots 338. By means of the displacement of the lever member carrier, the projections 340 formed on the underside of the lever-like members run onto actuating parts 342 of an actuator so that the lever-like members are raised up. During the return, the separator bar firstly meets the lever-like member nearest to it and presses the entire lever member carrier back for a short distance until the lever-like member is moved over; the other lever-like member, however, stays still, since the actuating parts 342 for the two lever-like members are at a greater distance from each other than the corresponding projections.

The embodiment according to FIGS. 109 and 110 represents an embodiment in which the retaining means for the individual picture comprises retentive coatings 26 in the first frame part. As a result of static charging, as mentioned above, the individual sheet may adhere so firmly to the retentive coatings that considerable forces are required to tear it away from them. It must however be guided onto the side of the frame part remote from the retentive coatings. The springs 136 are therefore provided centrally between two retentive coatings in each case. The edge of the individual sheet facing towards the separator bar 20 is lifted by a lever-like member 344 which is pressed down by means of actuator slopes 346 on the ends of the side pieces 44 of the slider member, while it is lifted up by a spring force (not illustrated). As can be seen from FIG. 110, the lever-like member extends over the entire width of the device, and in particular it also engages with the individual sheet directly adjacent to the retentive coatings. The shaft of the lever-like member is indicated by 348.

Figure 111:
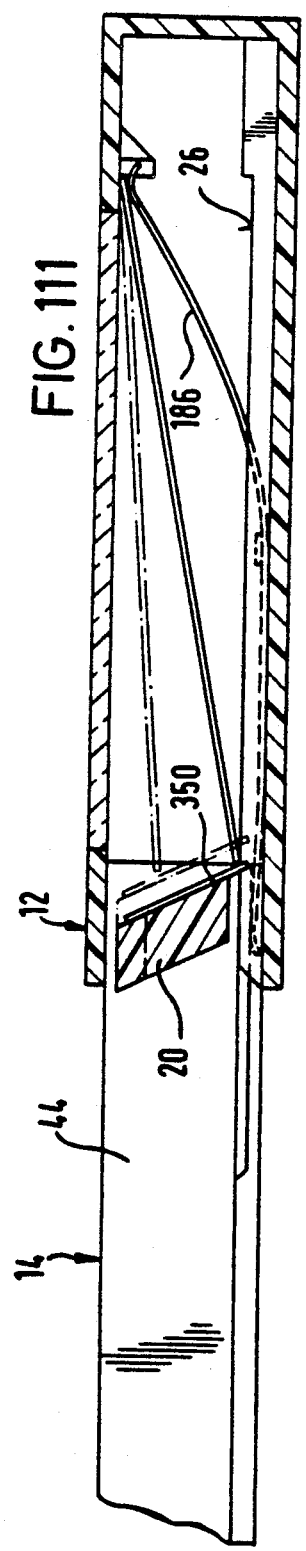
Figure 113:
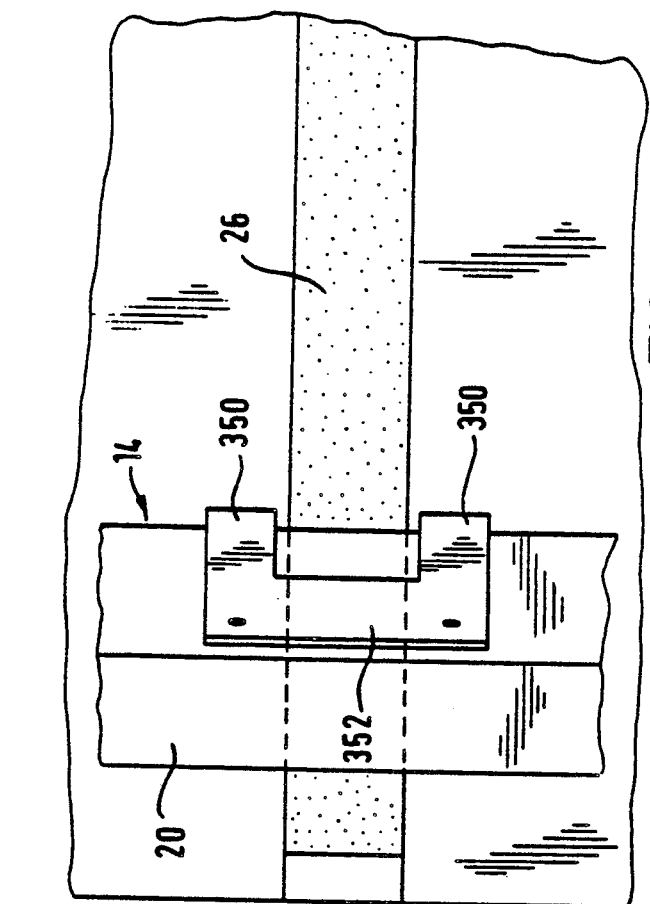
Figure 112:
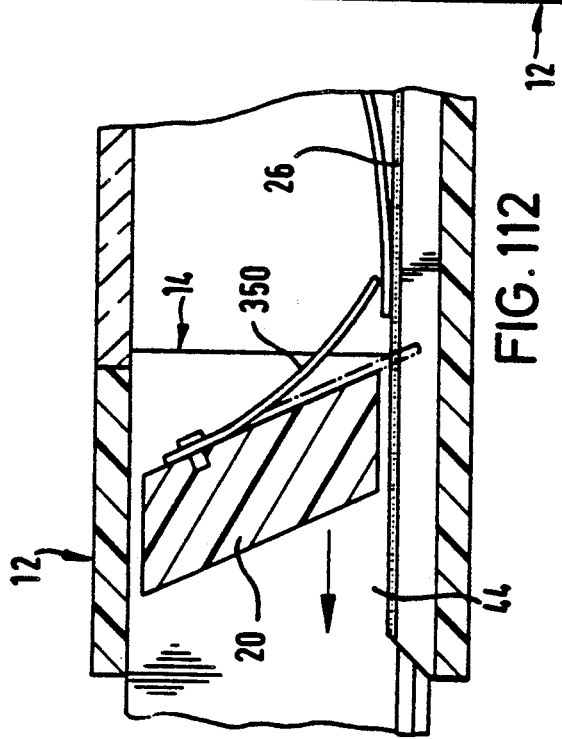

FIGS. 111 to 113 show another alternative form. On the separator bar 20, on both sides of the retentive coating 26, a thin plate-like member 350 is arranged so that it engages resiliently in a corresponding recess near the retentive coating. The two thin plate-like members are connected to each other by means of a bridge member 352. When the individual sheet runs through, each thin plate-like member is lifted up resiliently and snaps back into the recess after the rear edge of the sheet has passed, so that during the return travel the sheet edge in question is pulled away from the retentive coating and the edge has to climb up along the separator bar, since the return path through the other through gap is now securely blocked by means of the thin plate-like members.

Finally, in FIGS. 1 to 10 on the one hand, and FIGS. 13 to 33 on the other hand, means are shown in each case to allow the removal of the entire pile from the device. FIGS. 114 to 123 show alternative forms and also means for this purpose which work differently in principle and these are explained below.

Figure 114:
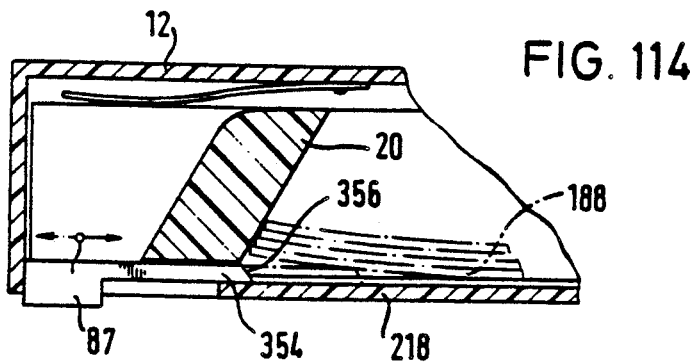

FIG. 114 shows in a partial longitudinal sectional view an embodiment in which the separating means can be blocked at will by manual intervention. It is to be assumed that there is a separating means according to FIGS. 63, 64 but in this case only the separator bar 20 of the slider member is shown. The land 354 is not stationary, as in FIGS. 63 and 64, but is movable in the direction of movement of the slider member, and displacement may be effected manually by means of a control key 87 projecting through the base 218 of the housing. In the position shown by solid lines, this corresponds to FIG. 63 (normal operation). But if the control key is displaced with the land towards the right, the wedge-shaped end 356 engages beneath the edge, facing towards it, of the bottom sheet 188 in the pile and lifts this edge onto the land 354, so that the through gap beneath the separator bar is "closed".

Figure 115:
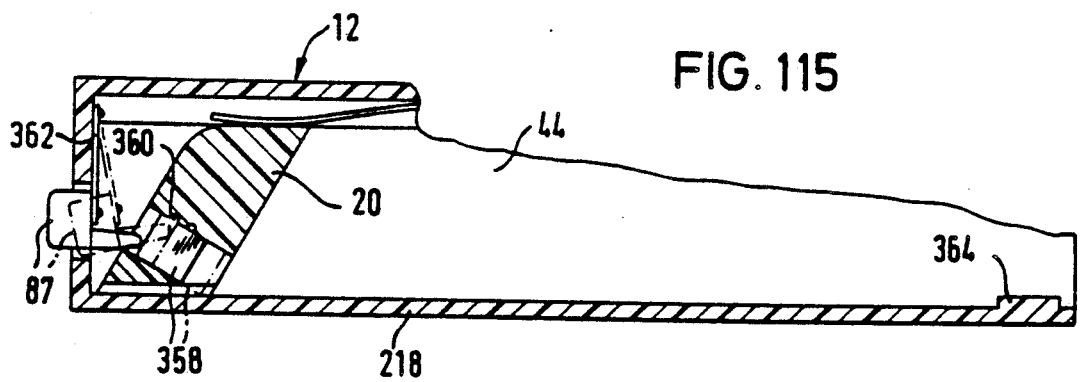

The pile removal function is also manually controllable in the embodiment according to FIG. 115 (partial longitudinal section). It is to be assumed that as initial construction the one according to FIGS. 67 and 68 is provided.

The separator bar 20 has a through-gap in which a blocking member 358 is movably arranged. In the position indicated by solid lines, the changer is switched to the changeover function, and the blocking member engages by means of projections 360 in a corresponding recess in the through-gap. If by means of pressure on a control key 87, which is mounted resiliently on a moulded-on spring 362 and is connected to the housing 12, it is moved into the blocking position shown by means of broken lines, in which it can also be locked by means of projections 360, the through gap for a separated sheet is blocked and all sheets in the pile are transported out. When the blocking member then runs onto a stop member 364 moulded on the base 218 of the housing, it is pushed back again into its rest position, and the changer is switched to the "changeover" function again.

Figure 116:
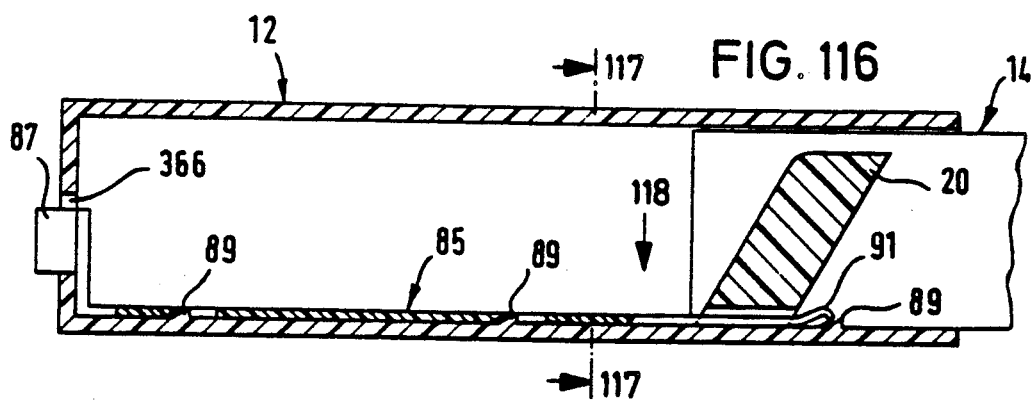
Figure 117:
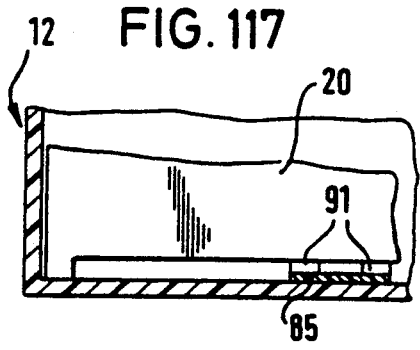
Figure 118:
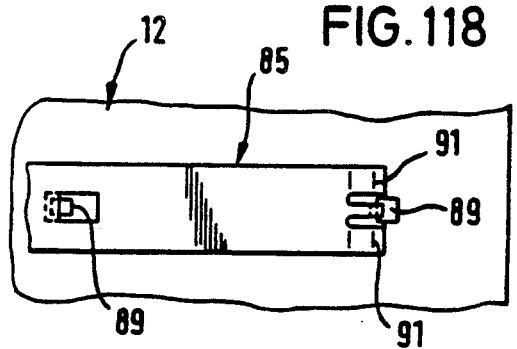

Also in FIG. 116 (partial longitudinal section), FIG. 117 (partial transverse section) and FIG. 118 (partial plan view) provision is made for a manual switchover between "changeover" and "pile removal". In the housing 12, a one-piece component 85 is displaceable in a longitudinal direction by means of pressure on the control key 87, with the rail connected to the control key running up on ramps 89 and, in so doing, lifting the whole component 85; a clearance space 366 for the control key is provided in the housing for this purpose. By means of the lifting of the rail, the latter comes to rest from below against the edge of the separator bar 20 defining the through gap. From this end of the rail lugs 91 also project upwards and these can spring out downwards when the separator bar runs over the lugs, taking the entire pile along with it. If the separator bar is pushed back again, it meets the lugs and thus displaces the whole component 85 into its initial position, so that the path for the separator is also freed again, the gap for the separation of the sheet is open again and thus the changer is again in the "changeover function" position.

FIGS. 119 and 120 show in a partial longitudinal sectional view and in a partial plan view a further embodiment of a separating system that can be switched over for the removal of the pile. It is to be assumed that in principle the type of construction according to FIG. 65, 66 is provided. The land indicated by 68 in FIG. 63, which is also present in fact in FIG. 65, is very narrow, and therefore of double construction. The part 69 which defines the through gap and is arranged resiliently in the separator bar 20, has a recess opposite the gap between the two lands 68. Moulded onto the base 218 of the housing there is a control key 87 which can be pushed in and springs back, and which lifts up a blocking shoe 368 which with its forwardly-extending part blocks the through gap whilst it lies in front of the underside of the separator bar and engages behind the separator bar with a rearwardly-extending part 370. On both sides of the latter projection, small leaf springs 372 press the blocking shoe in the direction of the base of the housing. If the control key 87 is pressed and the blocking shoe is brought into a drive connection with the separator bar, with the separating function being blocked, and the slider member is now pulled, the blocking shoe is simply taken along also. During reinsertion, the small springs 372 then push the shoe into the release position again, where a trough-like recess is provided behind the run-up ramp 374.

In the case of the embodiments dealt with so far, the user must intervene in order to be able to carry out the removal. In the following embodiment the arrangement is such that the slider member which can be pulled out of the housing is the second frame part and therefore brings the remainder of the pile out with it. Only a single sheet remains behind in the housing. If the user now takes out the remainder of the pile, which is now freely accessible to him, and pushes the slider member in again, he can pull the slider member again, and this then brings with it the sheet which remained in the housing. In other words, the changeover mechanism only becomes capable of operation when the device contains at least two sheets.

Figure 121:
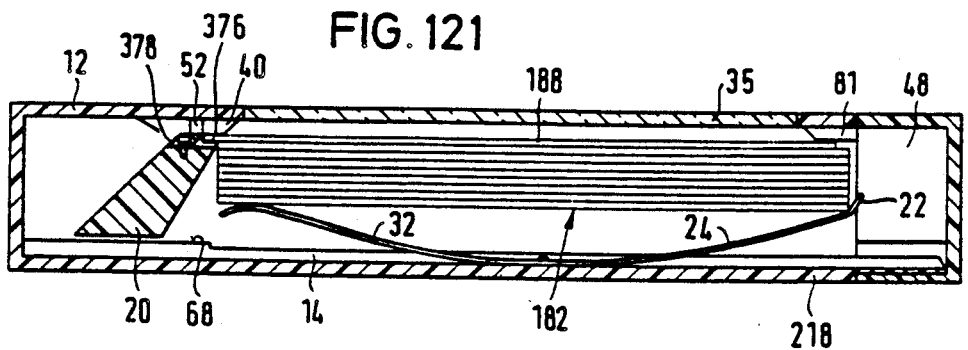
Figure 122:
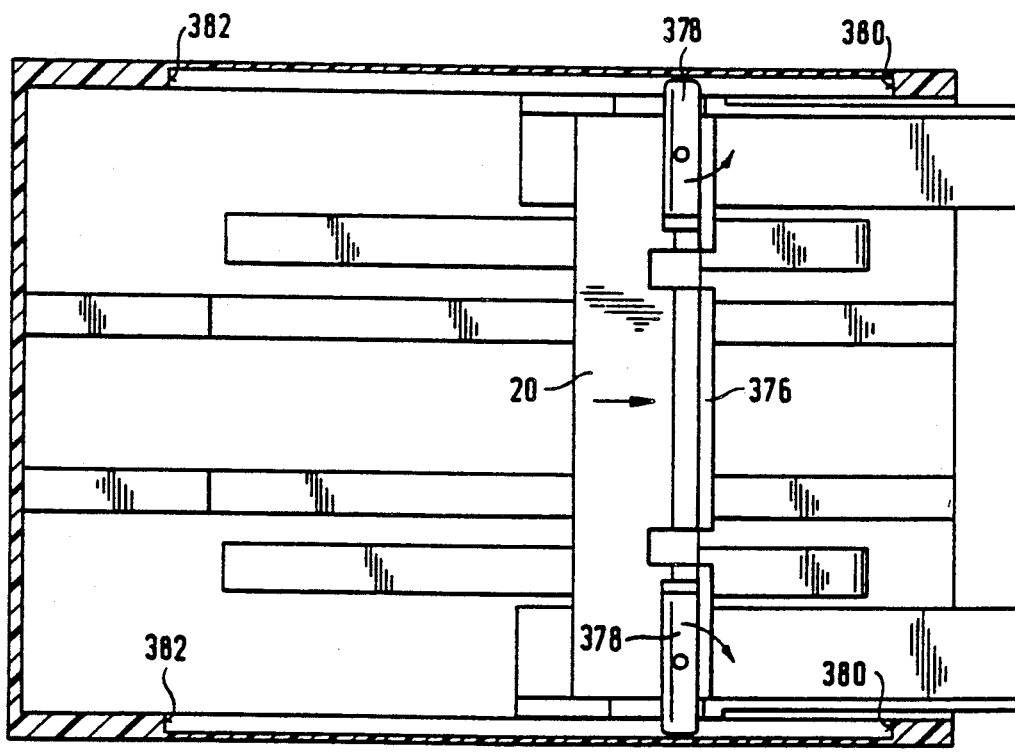

FIG. 121 shows this solution in a schematicised longitudinal sectional view. The stop member 51 pushing back the individual sheet, compared with the example of execution described initially, is arranged at a point such that the individual sheet 188 is not completely flush with the remainder of the pile but remains anchored by its pushed edge on the separator bar 20. For this purpose a special stepped portion is provided which is indicated in FIG. 122 (horizontal partial section) by 376. During the next changeover cycle, however, this sheet is thrown off, in that the two levers 378 rotatably mounted on the separator bar run with their outer lever arms against stop members 380 on the housing, so that their inner arms convey the picture in the direction of the grip part of the slider member. During the return travel, the levers are brought into the initial position again by running onto stop member 382. If therefore there is only the one sheet still in the housing, but the remainder of the pile has already been removed, during re-insertion of the slider member this sheet does in fact come into contact with the feeding means, which is indicated as an inclined hook-like member 22, but cannot run into the separating means (that is to say, cannot pass under the separator bar). The edge therefore slides away from the hook-like member and the slider member carries the sheet out with it.

Figure 123:
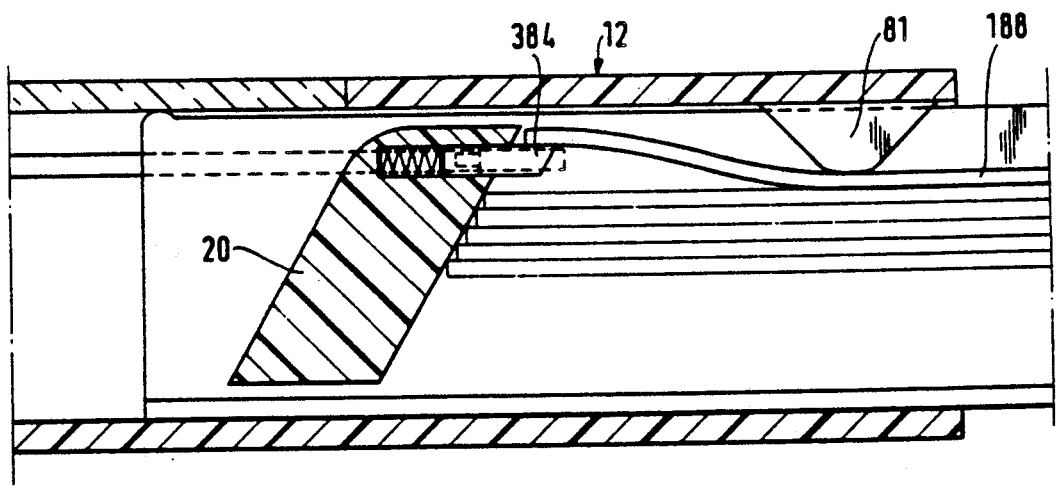

FIG. 123 shows a variation on this principle. The intermediate stepped portion for the sheet 188 is formed by a plate 384 which can be moved out of the separator bar 20 by spring force, but is pushed back in the fully withdrawn position of the slider member by running onto stop members. At the same time, a holding-down bar 81 moulded on the housing 12 ensures that the sheet 188 is pressed below the level of the plate when the latter comes out of the separator again at the start of the insertion operation.

I claim:

1. An apparatus for cyclic rearrangement of a stack of rectangular sheets, the apparatus comprising a first frame part, a second frame part reciprocable relative to said first frame part in a predetermined direction between an inner end position and an outer end position, and means for removing a sheet from a first stack end upon movement of said second frame part from said inner end position to said outer end position and for adding said sheet to a second end of said stack upon movement of said second frame part from said outer end position to said inner end position, said means including:
    separating means for separating an individual sheet from remaining sheets of said stack,
    feeding means for feeding sheets to said separating means, said feeding means being mounted on said first frame part,
    first retaining means for holding said individual sheet in said first frame part,
    second retaining means for holding said remaining sheets in said second frame part, and
    transfer means for transferring said individual sheet after its being separated from said sheets to said second stack end, wherein said feeding means include at least one contact element extending in piling direction of said stack, said contact element engaging, under spring bias, a transverse edge of said individual sheet, said edge being trailing in movement direction of said individual sheet, said contact element engaging said transverse edge with a retaining force to hold said transvere edge against a counter force transmitted to said individual sheet by said second frame part during its movement from said inner end position toward said outer end position, said contact element being deflectable against said spring bias thereby releasing said remaining sheets.

2. The apparatus of claim 1 wherein said contact element includes a hook-like engaging face.

3. The apparatus of claim 2 wherein said engaging face extends in piling direction of said stack with a dimension exceeding a nominal thickness of one sheet.

4. The apparatus of claim 2 wherein said engaging face and a main plane of said sheets define an angle deviating from 90°.

5. The apparatus of claim 4 wherein said angle is variable in response to at least one of the factors:
    number of sheets forming said stack,
    relative position of said frame parts.

6. The apparatus of claim 4 wherein said angle between said plane of said individual sheet and said contact face is between 110° and 135°.

7. The apparatus of claim 2 wherein said contact element engages said transverse edge of said individual sheet in its entirety.

8. The apparatus of claim 2 wherein said engaging face engages said transverse edge at a plurality of sites disposed symmetrically with respect to the center of said edge.

9. The apparatus of claim 2 wherein said engaging face is urged against said stack by means of a spring arrangement supported in said first frame part.

10. The apparatus of claim 9 wherein said spring arrangement forms part of a pressing system which urges said stack against a wall of one of said frame parts when said second frame part is in its inner end position.

11. The apparatus of claim 10 wherein said wall has a display window for exposing a sheet therebeneath.

12. The apparatus of claim 9 wherein said contact face is integrally formed with a pressing system which urges said stack against a display window when said second frame part is in its inner end position.

13. The apparatus of claim 12 wherein said pressing system includes two pressing members disposed symmetrically with respect to a central plane of symmetry extending in said predetermined direction.

14. The apparatus of claim 13 wherein said pressing members extend substantially parallel to said predetermined direction.

15. The apparatus of claim 13 wherein said contact face is located adjacent a pressing member end, each pressing member having a contact face.

16. The apparatus of claim 9 wherein said spring arrangement includes leaf springs.

17. The apparatus of claim 16 wherein said contact face is integrally formed at a free leaf spring end.

18. The apparatus of claim 17 wherein said contact face defines a predetermined angle with said individual sheet irrespective of deflection of said free spring end.

19. The apparatus of claim 17 wherein said leaf springs have a cut-out contact face tab bent by a predetermined angle relative to the remainder of said leaf spring.

20. The apparatus of claim 17 wherein each leaf spring has a second free end, and all free leaf spring ends forming a pressing system which urges said stack against a frame part wall when said second frame part is in its inner position.

21. The apparatus of claim 20 wherein said second free ends form an element of said first retaining means.

22. The apparatus of claim 21 wherein said second frame part includes control means for activation of said feeding means and of said first retaining means.

23. The apparatus of claim 22 wherein said control means include skid members engaging over said springs and urging them away from said stack.

24. The apparatus of claim 22 wherein said second retaining means includes a separator bar extending transverse with respect to said predetermined direction and forming an element of said control means.

25. The apparatus of claim 16 wherein said leaf springs are elastically twistable at the location of said contact element.

26. The apparatus of claim 9 wherein said spring arrangement and contact face are adapted to each other such that with varying spring bias due to varying number of sheets the contact face defines varying angles with said individual sheet.

27. The apparatus of claim 9 wherein said spring arrangement is deactivated when said second frame part is in its outer end position.

28. The apparatus of claim 27 wherein said spring arrangement is deactivated due to its being depressed by said second frame part.

29. The apparatus of claim 27 wherein said feeding means can be deactivated by means of said second frame part so as to allow sheet replenishment.

30. The apparatus of claim 9 wherein said spring arrangement includes a leaf spring extending transverse with respect to said predetermined direction.

31. The apparatus of claim 1 wherein said contact element includes a compressible material.

32. The apparatus of claim 1 wherein said contact element is integral with said first frame part, and said stack being urged in engagement therewith by means of a spring arrangement.

33. The apparatus of claim 32 wherein said spring arrangement includes a spring-supported rigid member carrying said contact element.

34. The apparatus of claim 1 wherein said contact element performs also the function of said first retaining means.

35. The apparatus of claim 34 wherein said contact element remains in engagement with said individual sheet over the stroke of movement of said second frame part from said inner end position toward said outer end position.

36. The apparatus of claim 35 including means returning the contact element beneath said remaining sheets.

37. The apparatus of claim 35 including a supporting element connected to said contact element and depressed by said second retaining means in said outer end position of said second frame part.

38. The apparatus of claim 34 wherein said contact element can be passed by said second retaining means.

39. The apparatus of claim 38 wherein said second retaining means includes a separator bar having recesses for passage of each contact element.

40. The apparatus of claim 1 wherein said first retaining means is distinct from said feeding means and active only after separation of said individual sheet from said stack.

41. The apparatus of claim 40 wherein said feeding means is deactivated in response to reciprocation of said second frame part and after activation of said retaining means.

42. The apparatus of claim 1 wherein said first frame part is a housing and said second frame part is a slider adapted to be withdrawn out of said housing.

43. The apparatus of claim 1 including means for passing leading edges of said remaining sheets across said contact element.

44. The apparatus of claim 1 wherein said contact element is deflectable by said remaining sheets.

45. An apparatus for cyclic rearrangement of a stack of rectangular sheets, the apparatus comprising a first frame part, a second frame part reciprocable relative to said first frame part in a predetermined direction between an inner end position and an outer end position, and means for removing a sheet from a first stack end upon movement of said second frame part from said inner end position to said outer end position and for adding said sheet to a second end of said stack upon movement of said second frame part from said outer end position to said inner end position, said means including:
    separating means for separating an individual sheet from remaining sheets of said stack, feeding means for feeding sheets to said separating means, said feeding means being mounted on said first frame part, first retaining means for holding said individual sheet in said first frame part, second retaining means for holding said remaining sheets in said second frame part, and transfer means for transferring said individual sheet after its being separated from said remaining sheets to said second stack end, wherein said feeding means include at least one contact element extending in piling direction of said stack, said contact element engaging a transverse edge of said individual sheet, said edge being trailing in movement direction of said individual sheet, and the apparatus further comprising means for passing leading edges of said remaining sheets across said contact element.

46. The apparatus of claim 45 wherein said passing means are provided on said contact element.

47. The apparatus of claim 45 or 46 wherein said passing means include an oblique ramp.

48. The apparatus of claim 45 wherein said contact element, include a hook-like engaging face.

49. The apparatus of claim 48 wherein said engaging face extends in piling direction of said stack with a dimension exceeding a nominal thickness of one sheet.

50. The apparatus of claim 48 wherein said engaging face and a main plane of said sheets define an angle deviating from 90°.

51. The apparatus of claim 50 wherein said angle is variable in response to at least one of the factors:
number of sheets forming said stack,
relative position of said frame parts, 52. The apparatus of claim 50 wherein said angle between said plane of said individual sheet and said contact face is between 110° and 135°.

53. The apparatus of claim 48 wherein said contact element engages said transverse edge of said individual sheet in its entirety.

54. The apparatus of claim 48 wherein said engaging face engages said transverse edge at a plurality of sites disposed symmetrically with respect to the center of said edge.

55. The apparatus of claim 48 wherein said engaging face is urged against said stack by means of a spring arrangement supported in said first frame part.

56. The apparatus of claim 55 wherein said spring arrangement forms part of a pressing system which urges said stack against a wall of one of said frame parts when said second frame part is in its inner end position.

57. The apparatus of claim 56 wherein said wall has a display window for exposing a sheet therebeneath.

58. The apparatus of claim 55 wherein said contact face is integrally formed with a pressing system which urges said stack against a display window when said second frame part is in its inner end position.

59. The apparatus of claim 58 wherein said pressing system includes two pressing members disposed symmetrically with respect to a central plane of symmetry extending in said predetermined direction.

60. The apparatus of claim 59 wherein said pressing members extend substantially parallel to said predetermined direction.

61. The apparatus of claim 59 wherein said contact face is located adjacent a pressing member end, each pressing member having a contact face.

62. The apparatus of claim 55 wherein said spring arrangement includes leaf springs.

63. The apparatus of claim 62 wherein said contact face is integrally formed at a free leaf spring end.

64. The apparatus of claim 63 wherein said contact face defines a predetermined angle with said individual sheet irrespective of deflection of said free spring end.

65. The apparatus of claim 63 wherein said leaf springs have a cut-out contact face tab bent by a predetermined angle relative to the remainder of said leaf spring.

66. The apparatus of claim 63 wherein each leaf spring has a second free end, and all free leaf spring ends forming a pressing system which urges said stack against a frame part wall when said second frame part is in its inner position.

67. The apparatus of claim 66 wherein said second free ends form an element of said first retaining means.

68. The apparatus of claim 67 wherein said second frame part includes control means for activation of said feeding means and of said first retaining means.

69. The apparatus of claim 68 wherein said control means include skid members engaging over said springs and urging them away from said stack.

70. The apparatus of claim 68 wherein said second retaining means includes a separator bar extending transverse with respect to said predetermined direction and forming an element of said control means.

71. The apparatus of claim 62 wherein said leaf springs are elastically twistable at the location of said contact element.

72. The apparatus of claim 55 wherein said spring arrangement and contact face are adapted to each other such that with varying spring bias due to varying number of sheets the contact face defines varying angles with said individual sheet.

73. The apparatus of claim 55 wherein said spring arrangement is deactivated when said second frame part is in its outer end position.

74. The apparatus of claim 73 wherein said spring arrangement is deactivated due to its being depressed by said second frame part.

75. The apparatus of claim 73 wherein said feeding means can be deactivated by means of said second frame part so as to allow sheet replenishment.

76. The apparatus of claim 55 wherein said spring arrangement includes a leaf spring extending transverse with respect to said predetermined direction.

77. The apparatus of claim 45 wherein said contact element includes a compressible material.

78. The apparatus of claim 45 wherein said contact element performs also the function of said first retaining means.

79. The apparatus of claim 78 wherein said contact element remains in engagement with said individual sheet over the stroke of movement of said second frame part from said inner end position toward said outer end position.

80. The apparatus of claim 79 including means returning the contact element beneath said remaining sheets.

81. The apparatus of claim 79 including a supporting element connected to said contact element and depressed by said second retaining means in said outer end position of said second frame part.

82. The apparatus of claim 78 wherein said contact element can be passed by said second retaining means.

83. The apparatus of claim 82 wherein said second retaining means includes a separator bar having recesses for passage of, each contact element.

84. The apparatus of claim 45 wherein said first retaining means is distinct from said feeding means and active only after separation of said individual sheet from said stack.

85. The apparatus of claim 84 wherein said feeding means is deactivated in response to reciprocation of said second frame part and after activation of said retaining means.

86. The apparatus of claim 45 wherein said first frame part is a housing and said second frame part is a slider adapted to be withdrawn out of said housing.

87. The apparatus of claim 45 wherein said contact element is integral with said first frame part, and said stack being urged in engagement therewith by means of a spring arrangement.

88. The apparatus of claim 87 wherein said spring arrangement includes a spring-supported rigid member carrying said contact element.

89. An apparatus for cyclic rearrangement of a stack of rectangular sheets, the apparatus comprising a first frame part, a second frame part reciprocable relative to said first frame part in a predetermined direction between an inner end position and an outer end position, and means for removing a sheet from a first stack end upon movement of said second frame part from said inner end position to said outer end position and for adding said sheet to a second end of said stack upon movement of said second frame part from said outer end position to said inner end position, said means including:
separating means for separating an individual sheet from remaining sheets of said stack,
feeding means for feeding sheets to said separating means, said feeding means being mounted on said first frame part and including a contact element carried and held in contact with a transverse edge of said individual sheet by a spring arrangement,
first retaining means for holding said individual sheet in said first frame part,
second retaining means for holding said remaining sheets in said second frame, and
transfer means for transferring said individual sheet after its being separated from said remaining sheets to said second stack end, wherein said contact element extends in piling direction of said stack and engages behind that transverse edge of said individual sheet which is trailing in movement direction of said individual sheet, said contact element being shaped to permit passage of transverse edges of said remaining sheets.

90. The apparatus of claim 89 including means for passing leading edges of said remaining sheets across said contact element.

91. The apparatus of claim 89 wherein said contact element includes a hook-like engaging face.

92. The apparatus of claim 91 wherein said engaging face extends in piling direction of said stack with a dimension exceeding a nominal thickness of one sheet.

93. The apparatus of claim 91 wherein said engaging face and a main plane of said sheets define an angle deviating from 90°.

94. The apparatus of claim 93 wherein said angle is variable in response to at least one of the factors:
number of sheets forming said stack,
relative position of said frame parts, 95. The apparatus of claim 93 wherein said angle between said plane of said individual sheet and said contact face is between 110° and 135°.

96. The apparatus of claim 91 wherein said contact element engages said transverse edge of said individual sheet in its entirety.

97. The apparatus of claim 91 wherein said engaging face engages said transverse edge at a plurality of sites disposed symmetrically with respect to the center of said edge.

98. The apparatus of claim 91 wherein said engaging face is urged against said stack by means of a spring arrangement supported in said first frame part.

99. The apparatus of claim 98 wherein said spring arrangement forms part of a pressing system which urges said stack against a wall of one of said frame parts when said second frame parts is in its inner end position.

100. The apparatus of claim 99 wherein said wall has a display window for exposing a sheet therebeneath.

101. The apparatus of claim 98 wherein said contact face is integrally formed with a pressing system which urges said stack against a display window when said second frame part is in its inner end position.

102. The apparatus of claim 101 wherein said pressing system includes two pressing members disposed symmetrically with respect to a central plane of symmetry extending in said predetermined direction.

103. The apparatus of claim 102 wherein said pressing members extend substantially parallel to said predetermined direction.

104. The apparatus of claim 102 wherein said contact face is located adjacent a pressing member end, each pressing member having a contact face.

105. The apparatus of claim 98 wherein said spring arrangement includes leaf springs.

106. The apparatus of claim 105 wherein said contact face is integrally formed at a free leaf spring end.

107. The apparatus of claim 106 wherein said contact face defines a predetermined angle with said individual sheet irrespective of deflection of said free spring end.

108. The apparatus of claim 106 wherein said leaf springs have a cut-out contact face tab bent by a predetermined angle relative to the remainder of said leaf spring.

109. The apparatus of claim 106 wherein each leaf spring has a second free end, and all free leaf spring ends forming a pressing system which urges said stack against a frame part wall when said second frame part is in its inner position.

110. The apparatus of claim 109 wherein said second free ends form an element of said first retaining means.

111. The apparatus of claim 110 wherein said second frame part includes control means for activation of said feeding means and of said first retaining means.

112. The apparatus of claim 111 wherein said control means include skid members engaging over said springs and urging them away from said stack.

113. The apparatus of claim 111 wherein said second retaining means includes a separator bar extending transverse with respect to said predetermined direction and forming an element of said control means.

114. The apparatus of claim 105 wherein said leaf springs are elastically twistable at the location of said contact element.

115. The apparatus of claim 98 wherein said spring arrangement and contact face are adapted to each other such that with varying spring bias due to varying number of sheets the contact face defines varying angles with said individual sheet.

116. The apparatus of claim 98 wherein said spring arrangement is deactivated when said second frame part is in its outer end position.

117. The apparatus of claim 116 wherein said spring arrangement is deactivated due to its being depressed by said second frame part.

118. The apparatus of claim 116 wherein said feeding means can be deactivated by means of said second frame part so as to allow sheet replenishment.

119. The apparatus of claim 98 wherein said spring arrangement includes a leaf spring extending transverse with respect to said predetermined direction.

120. The apparatus of claim 89 wherein said contact element includes a compressible material.

121. The apparatus of claim 89 wherein said contact element performs also the function of said first retaining means.

122. The apparatus of claim 121 wherein said contact element remains in engagement with said individual sheet over the stroke of movement of said second frame part from said inner end position toward said outer end position.

123. The apparatus of claim 122 including means returning the contact element beneath said remaining sheets.

124. The apparatus of claim 122 including a supporting element connected to said contact element and depressed by said second retaining means in said outer end position of said second frame part.

125. The apparatus of claim 121 wherein said contact element can be passed by said second retaining means.

126. The apparatus of claim 125 wherein said second retaining means includes a separator bar having recesses for passage of each contact element.

127. The apparatus of claim 89 wherein said first retaining means is distinct from said feeding means and active only after separation of said individual sheet from said stack.

128. The apparatus of claim 127 wherein said feeding means is deactivated in response to reciprocation of said second frame part and after activation of said retaining means.

129. The apparatus of claim 89 wherein said first frame part is a housing and said second frame part is a slider adapted to be withdrawn out of said housing.

* * * * *